(12) United States Patent
Russell et al.

(10) Patent No.: US 12,116,018 B2
(45) Date of Patent: Oct. 15, 2024

(54) PERMEABLE SPEED CONSTRAINTS

(71) Applicant: WAYMO LLC, Mountain View, CA (US)

(72) Inventors: Jared Stephen Russell, San Francisco, CA (US); Tobias Kunz, San Francisco, CA (US); Anup Menon, Fremont, CA (US)

(73) Assignee: Waymo LLC, Mountain View, CA (US)

( * ) Notice: Subject to any disclaimer, the term of this patent is extended or adjusted under 35 U.S.C. 154(b) by 143 days.

(21) Appl. No.: 17/558,680

(22) Filed: Dec. 22, 2021

(65) Prior Publication Data

US 2022/0204056 A1 Jun. 30, 2022

Related U.S. Application Data

(60) Provisional application No. 63/131,092, filed on Dec. 28, 2020.

(51) Int. Cl.
*B60W 60/00* (2020.01)

(52) U.S. Cl.
CPC .......... *B60W 60/00276* (2020.02); *B60W 60/00272* (2020.02); *B60W 2554/4041* (2020.02);
(Continued)

(58) Field of Classification Search
CPC ............ G05D 1/021; B60W 60/00276; B60W 60/00272; B60W 2554/4041;
(Continued)

(56) References Cited

U.S. PATENT DOCUMENTS 7,979,174 B2 7/2011 Fregene et al.
8,126,642 B2 2/2012 Trepagnier et al.
(Continued)

FOREIGN PATENT DOCUMENTS

WO WO-2019104054 A1 * 5/2019 .......... B60W 30/162

OTHER PUBLICATIONS

Batkovic, Ivo , et al., "Real-Time Constrained Trajectory Planning and Vehicle Control for Proactive Autonomous Driving With Road Users", arXiv:1903.07743v1, Mar. 18, 2019, pp. 1-7.
(Continued)

*Primary Examiner* — Hussein Elchanti
*Assistant Examiner* — Kenneth M Dunne
(74) *Attorney, Agent, or Firm* — Botos Churchill IP Law

(57) ABSTRACT

The technology relates to planning trajectories for self-driving vehicles in order to transport passengers or cargo from a pickup location to a destination. Trajectory planning includes generating a speed plan for an upcoming portion of the trip in view of one or more constraints. The constraints may be due to proximity to an adjacent vehicle or other road user, and can include projected overlaps between the vehicle and other objects in the vehicle's nearby environment. Certain constraints may be binary or otherwise discontinuous in nature, in which a condition either exists at a given point in time or it does not. Noise in sensor data or prediction models may trigger such binary conditions, which in turn may cause the vehicle to alter the speed plan.

20 Claims, 37 Drawing Sheets

(52) U.S. Cl.
CPC .............. *B60W 2554/4042* (2020.02); *B60W 2554/4043* (2020.02); *B60W 2554/801* (2020.02); *B60W 2554/803* (2020.02); *B60W 2554/804* (2020.02); *B60W 2720/10* (2013.01); *B60W 2720/12* (2013.01)

(58) Field of Classification Search
CPC ..... B60W 2554/804; B60W 2554/803; B60W 2554/4042; B60W 2554/4043; B60W 2554/801; B60W 2720/10; B60W 2720/12

See application file for complete search history.

(56) References Cited

U.S. PATENT DOCUMENTS

| | | | |
|---|---|---|---|
| 8,412,449 | B2 | 4/2013 | Trepagnier et al. |
| 8,676,466 | B2 | 3/2014 | Mudalige |
| 9,074,896 | B2 | 7/2015 | Mathews et al. |
| 9,244,462 | B2 | 1/2016 | Pedersen |
| 9,248,834 | B1 | 2/2016 | Ferguson et al. |
| 9,254,846 | B2 | 2/2016 | Dolgov et al. |
| 10,627,825 | B2 | 4/2020 | Gutmann et al. |
| 10,640,111 | B1 | 5/2020 | Gutmann et al. |
| 10,793,123 | B2 | 10/2020 | Zhou et al. |
| 2017/0261991 | A1* | 9/2017 | Raghu ................... G05D 1/0223 |
| 2017/0267256 | A1* | 9/2017 | Minster .............. G01C 21/3407 |
| 2019/0155292 | A1* | 5/2019 | Gutmann ............. G05D 1/0223 |
| 2019/0291728 | A1* | 9/2019 | Shalev-Shwartz ........................... B60W 30/18154 |
| 2019/0346851 | A1* | 11/2019 | Liu ................. B60W 60/00276 |
| 2020/0086855 | A1* | 3/2020 | Packer ............ B60W 60/00276 |
| 2020/0148204 | A1 | 5/2020 | Kunz |
| 2020/0272161 | A1 | 8/2020 | Gutmann et al. |
| 2020/0301435 | A1* | 9/2020 | Phillips ................ G05D 1/0214 |
| 2021/0188258 | A1* | 6/2021 | Goto ........................ G08G 1/16 |
| 2021/0394791 | A1* | 12/2021 | Zhu .................... B60W 60/0016 |
| 2022/0176995 | A1* | 6/2022 | Subramanian ...... B60W 60/001 |

OTHER PUBLICATIONS

Chen, Jianyu, et al., "Continuous Decision Making for On-road Autonomous Driving under Uncertain and Interactive Environments", 2018 IEEE Intelligent Vehicles Symposium (IV), 2018, pp. 1-9.

Gu, Tianyu, "Improved Trajectory Planning for On Road Self Driving Vehicles via Combined Graph Search, Optimization & Topology Analysis", Electrical and Computer Engineering, Thesis Defense, 2017, pp. 1-46.

Gu, Tianyu, et al., "Tunable and Stable Real-Time Trajectory Planning for Urban Autonomous Driving", 2015 IEEE/RSJ international conference on intelligent robots and systems (IROS). IEEE, 2015, pp. 1-8.

Rodrigues, Maradona, et al., "Adaptive Behaviour Selection for Autonomous Vehicle Through Naturalistic Speed Planning", 2017 IEEE 20th International Conference on Intelligent Transportation Systems (ITSC): Workshop, pp. 38-44.

Vanholme, Benoit, et al., "Manoeuvre-based trajectory planning for highly autonomous vehicles on real road with traffic", 2009 European Control Conference (ECC). IEEE, 2009, pp. 1-6.

Xiao, Wei, et al., "Bridging the Gap between Optimal Trajectory Planning and Safety-Critical Control with Applications to Autonomous Vehicles", arXiv:2008.07632v1, Aug. 17, 2020, pp. 1-15.

Zhang, Yu, et al., "Toward a More Complete, Flexible, and Safer Speed Planning for AutonomousConvex Optimization", Sensors, 2018, pp. 1-29.

\* cited by examiner

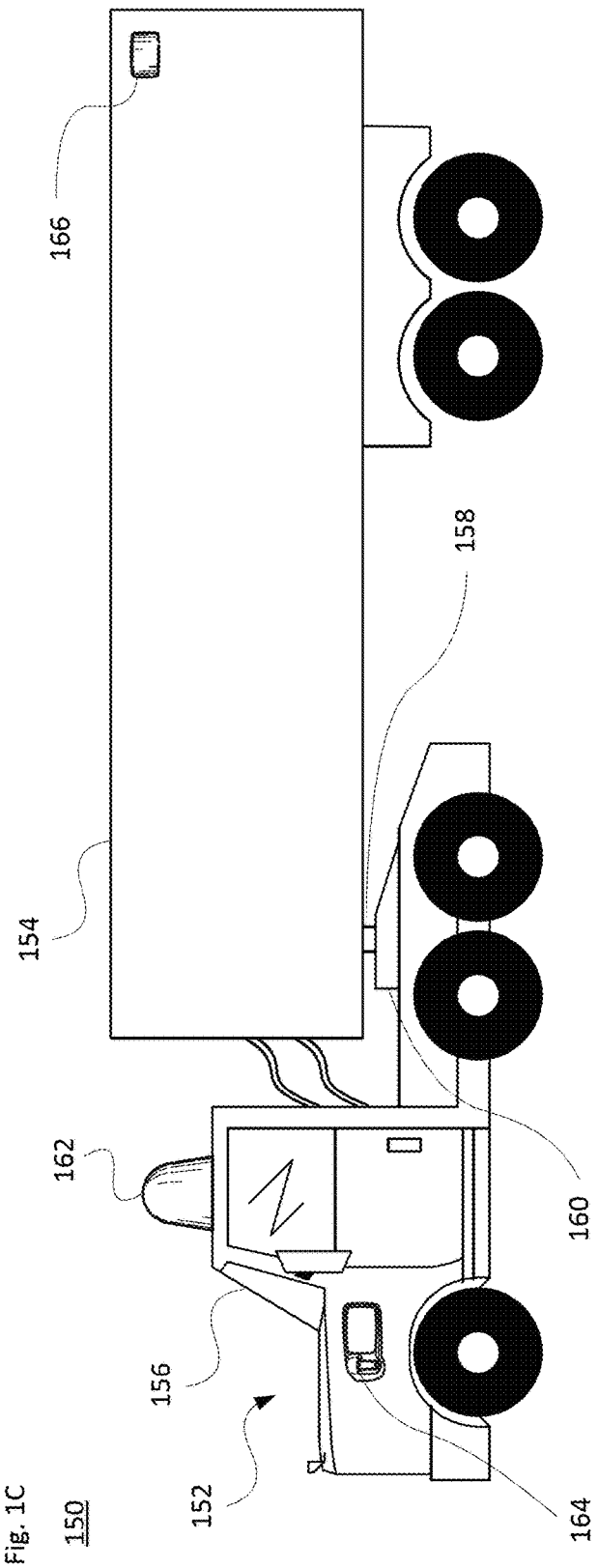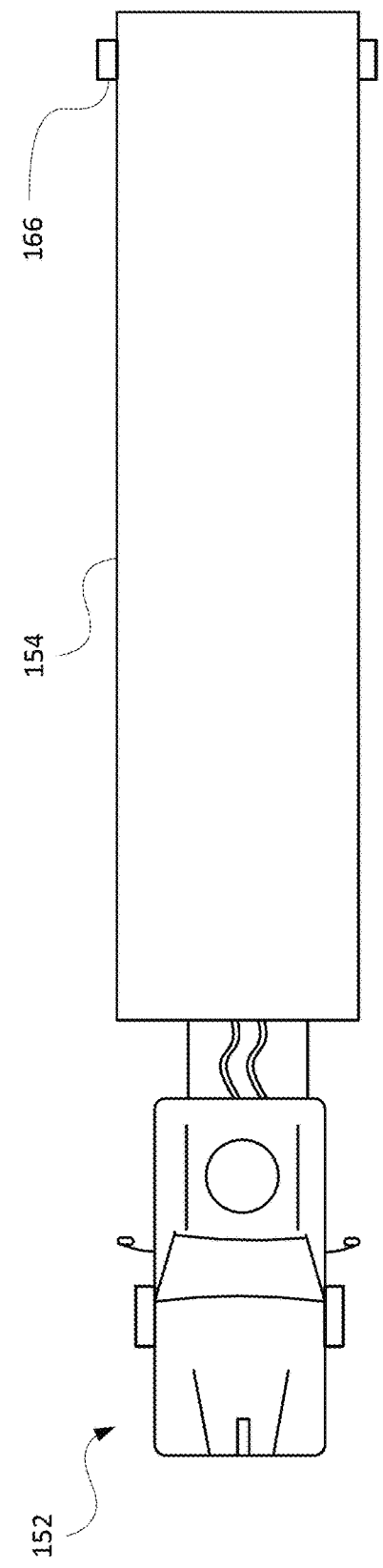

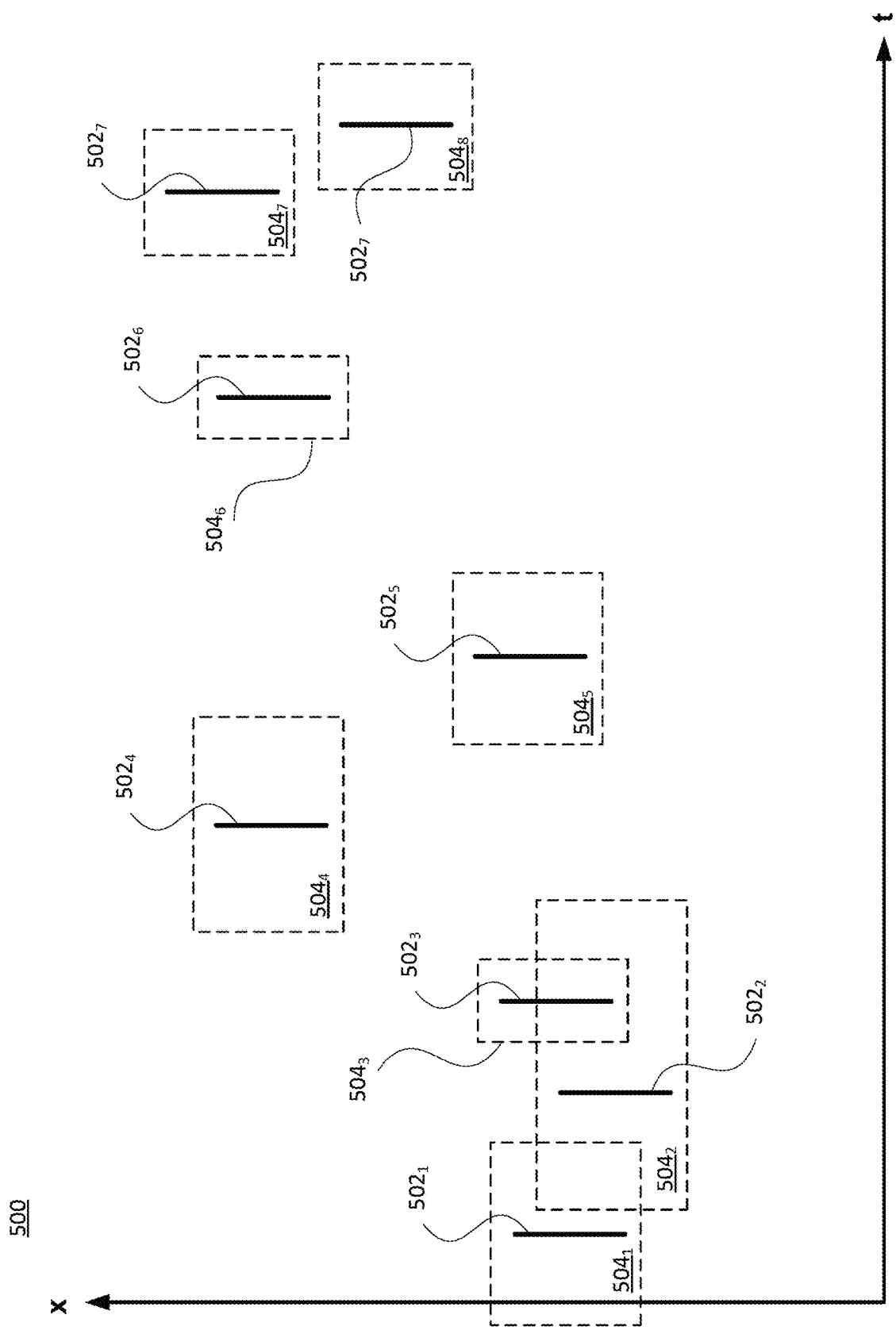

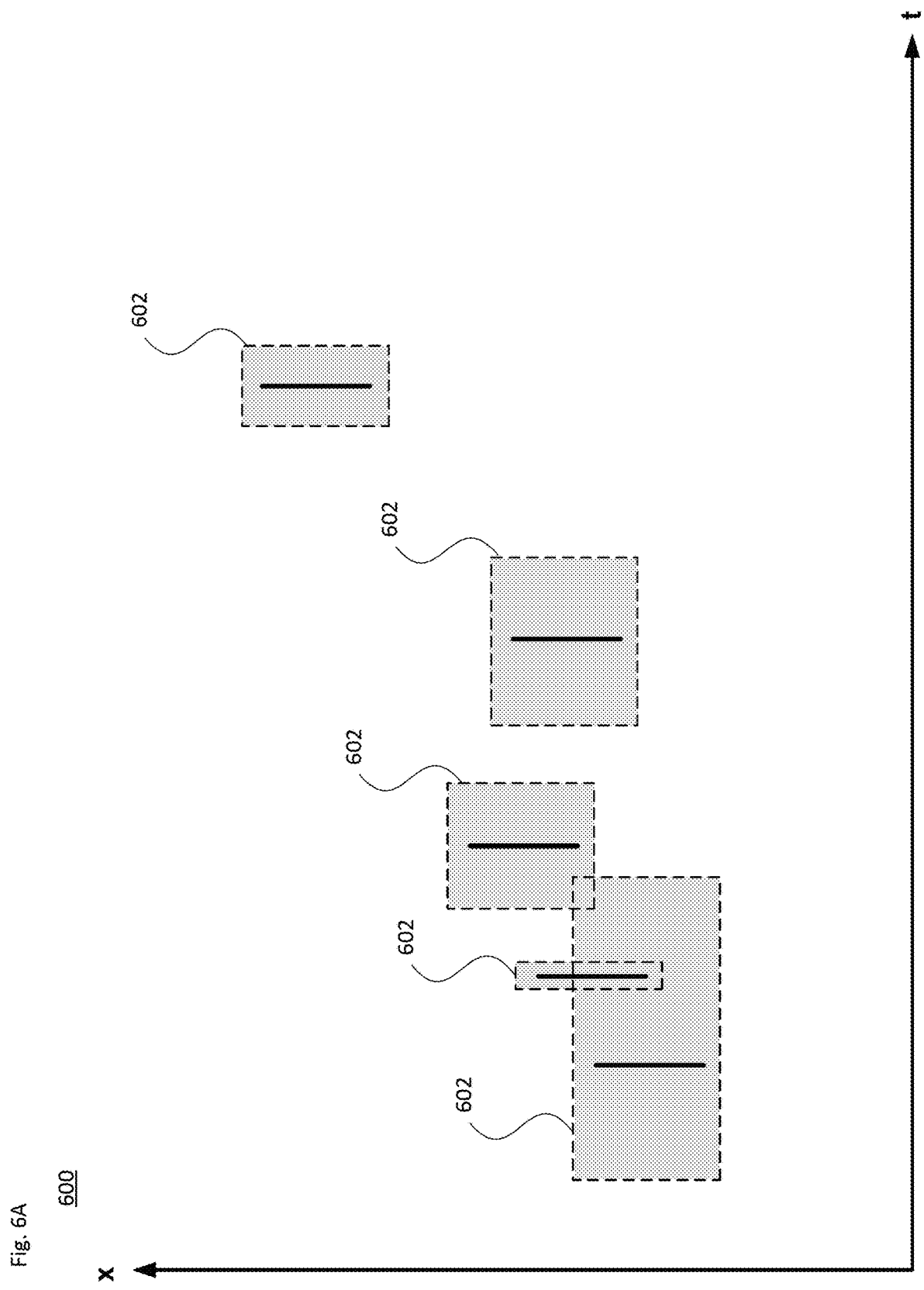

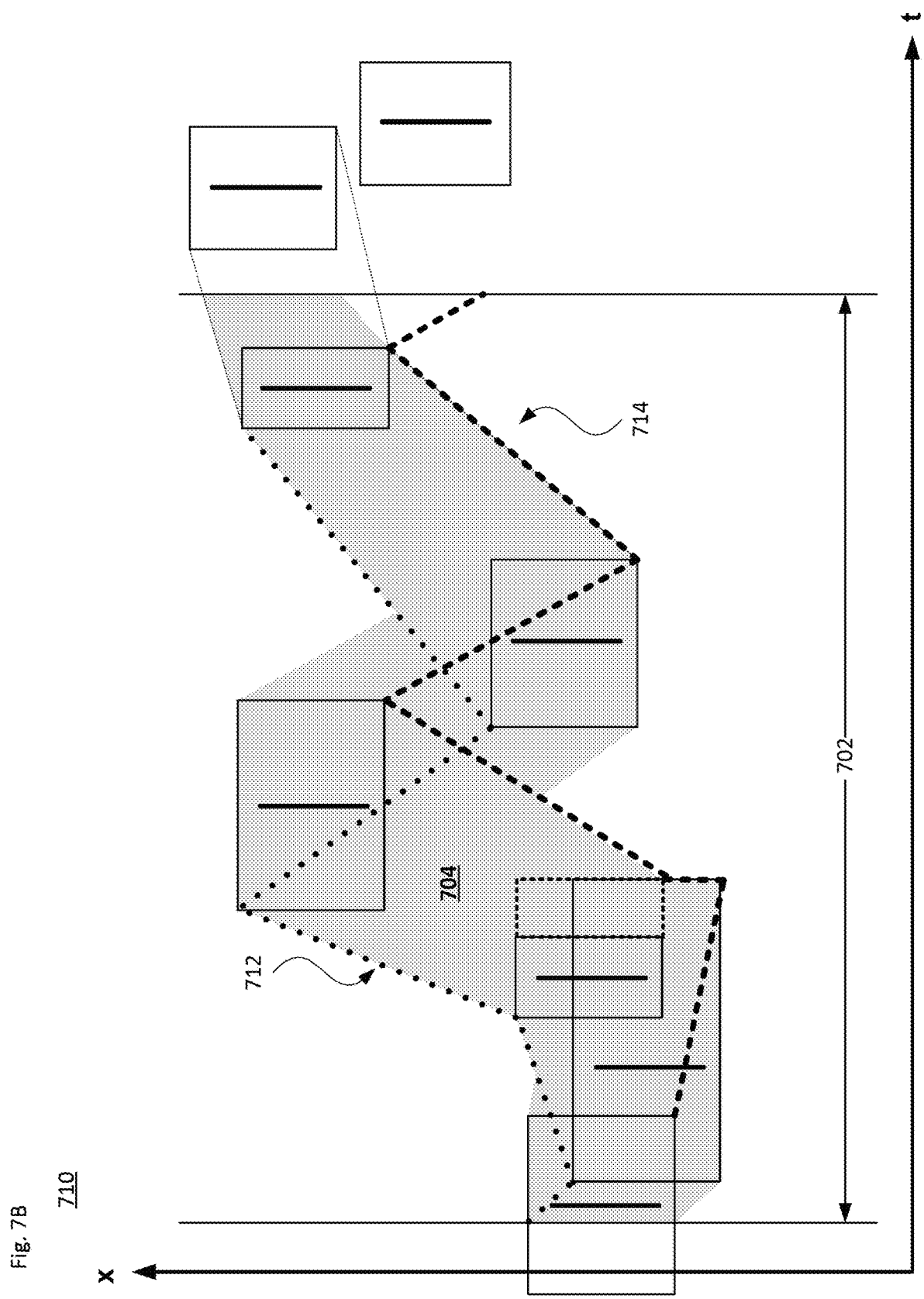

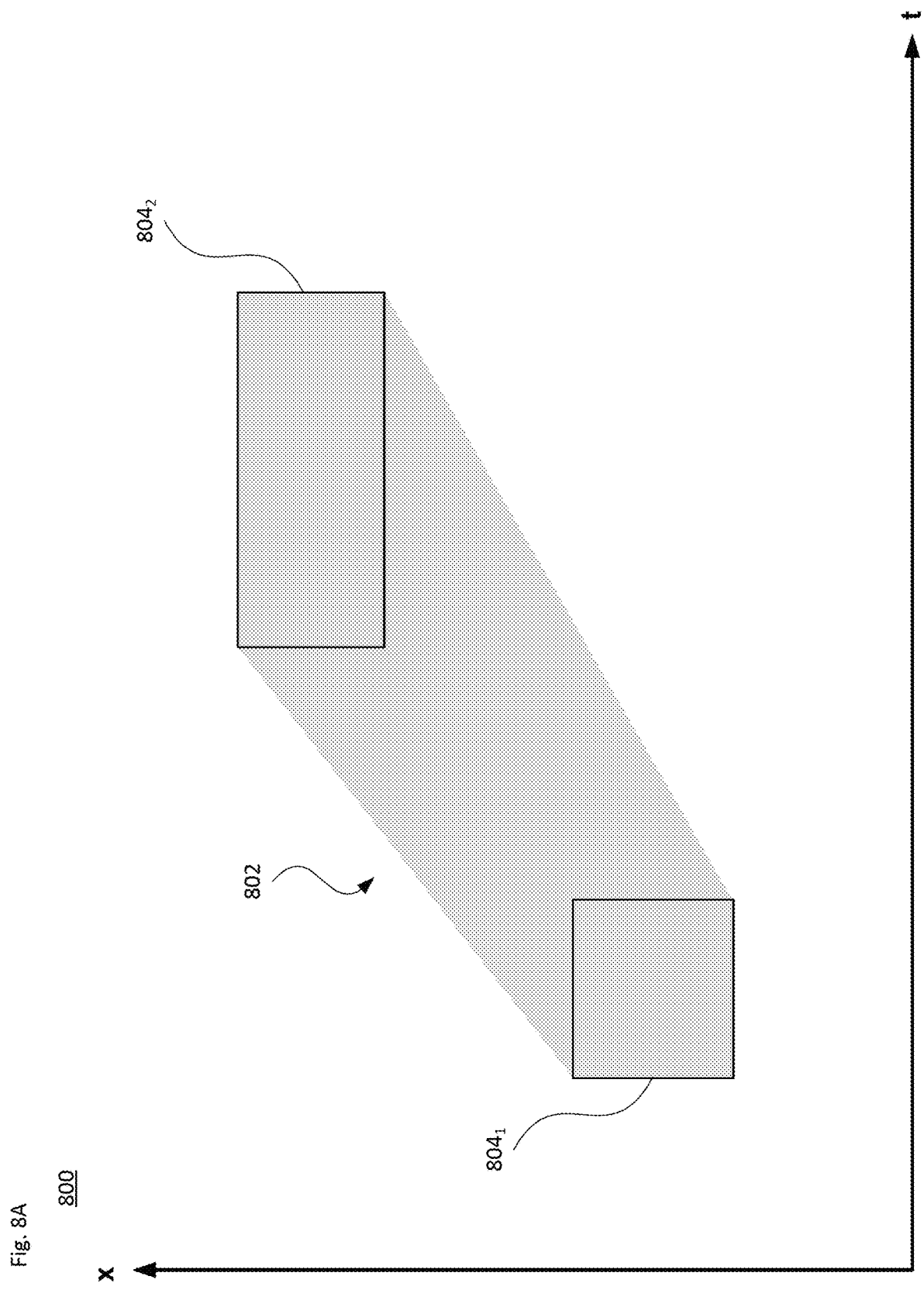

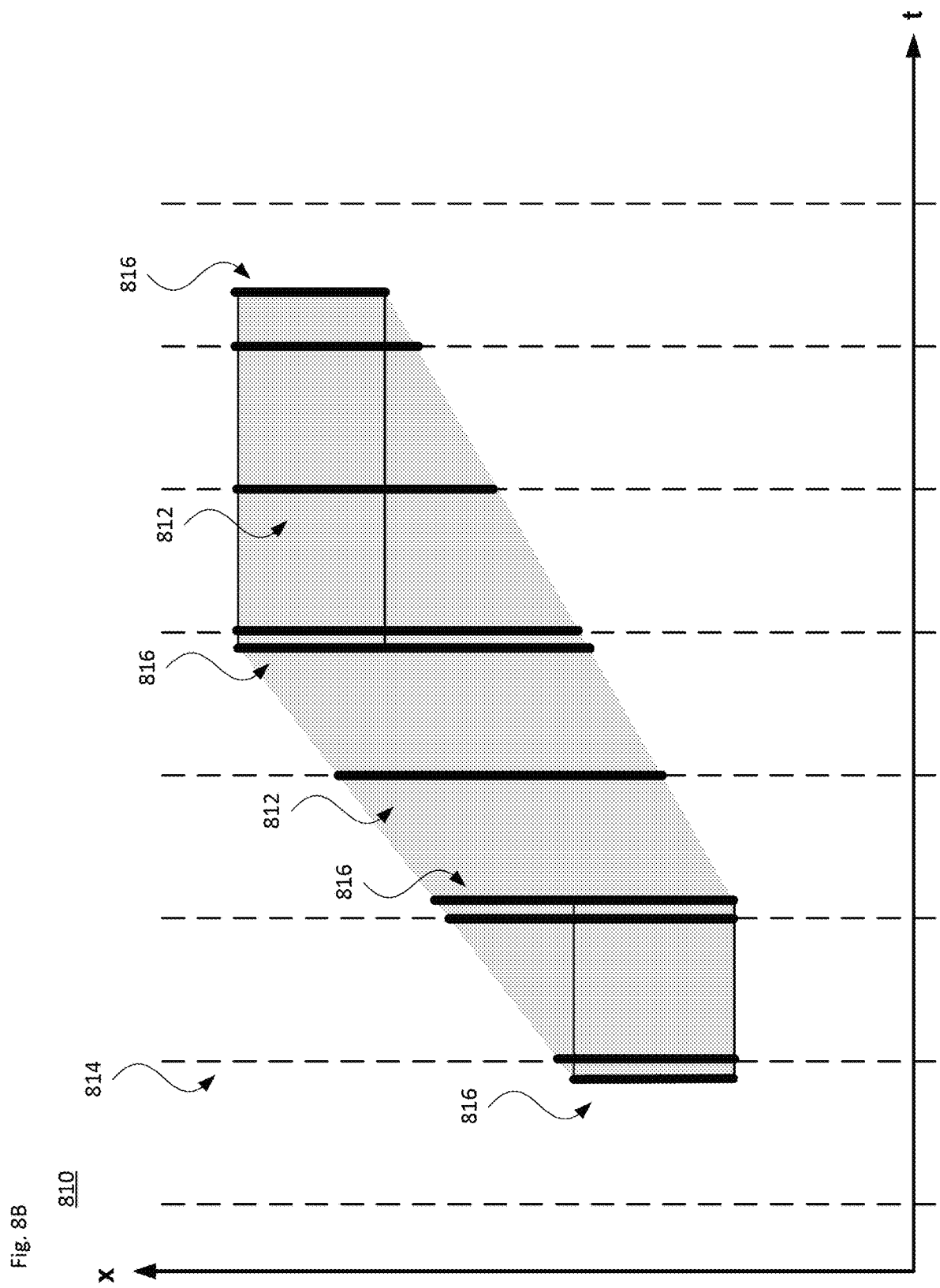

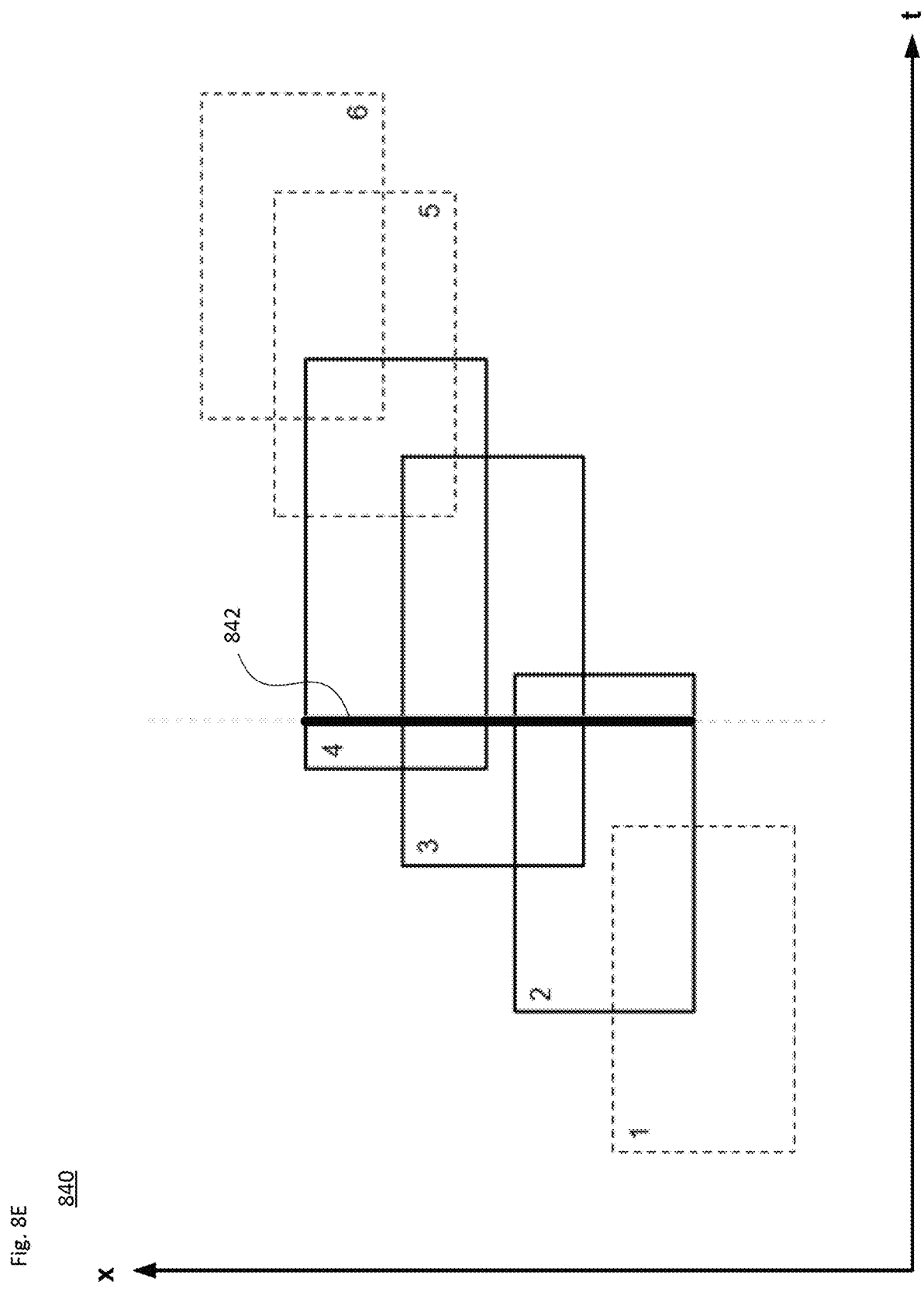

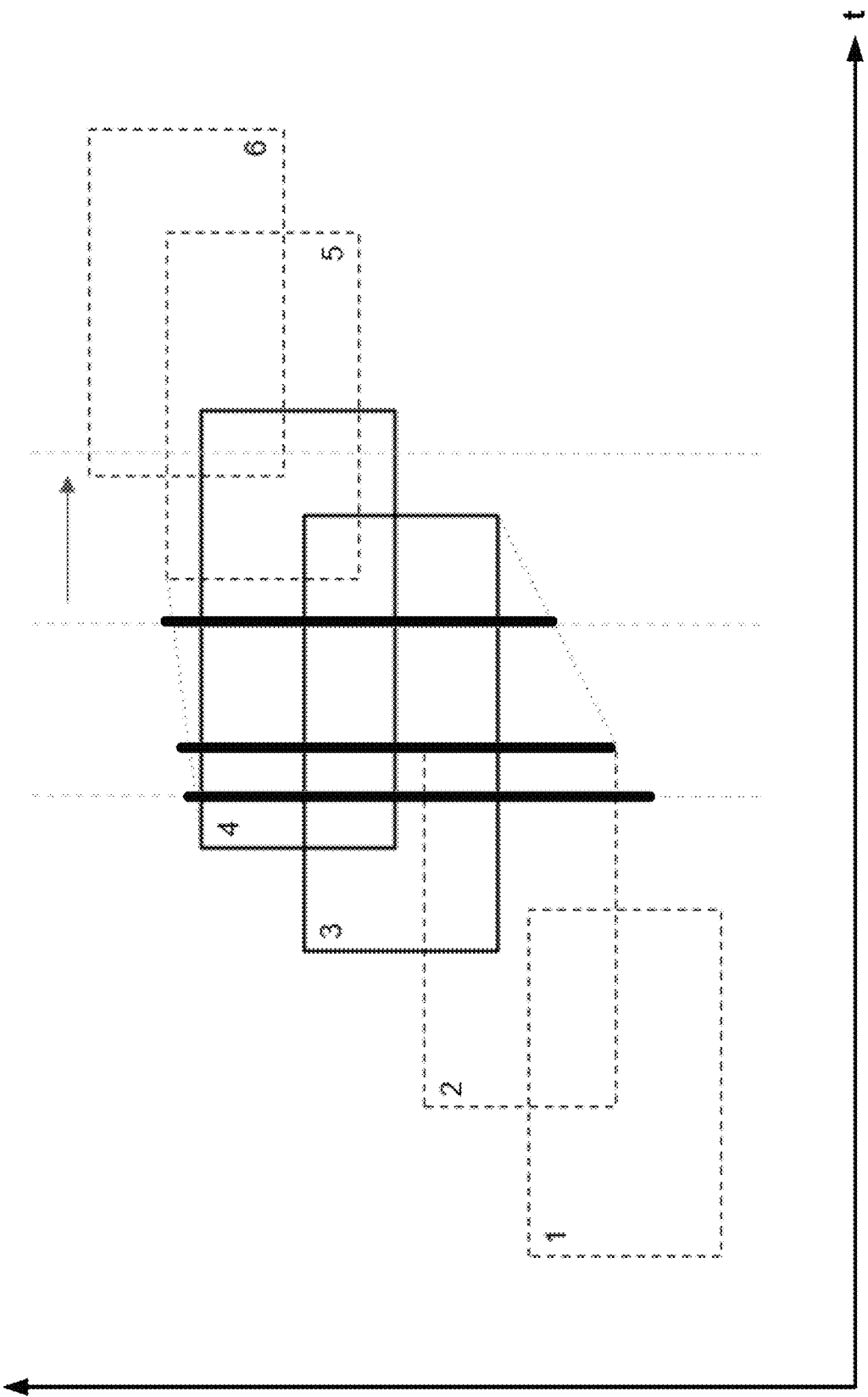

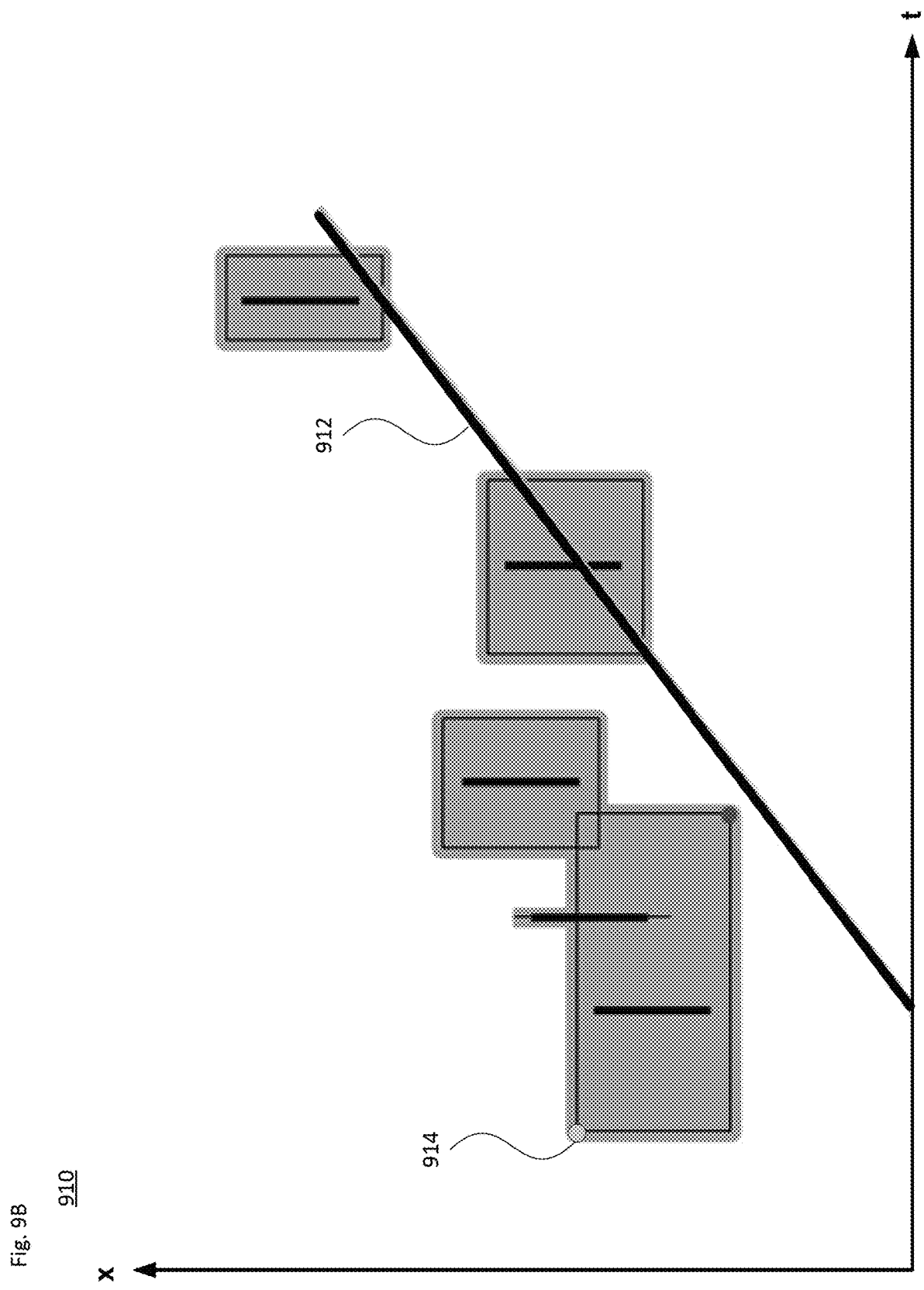

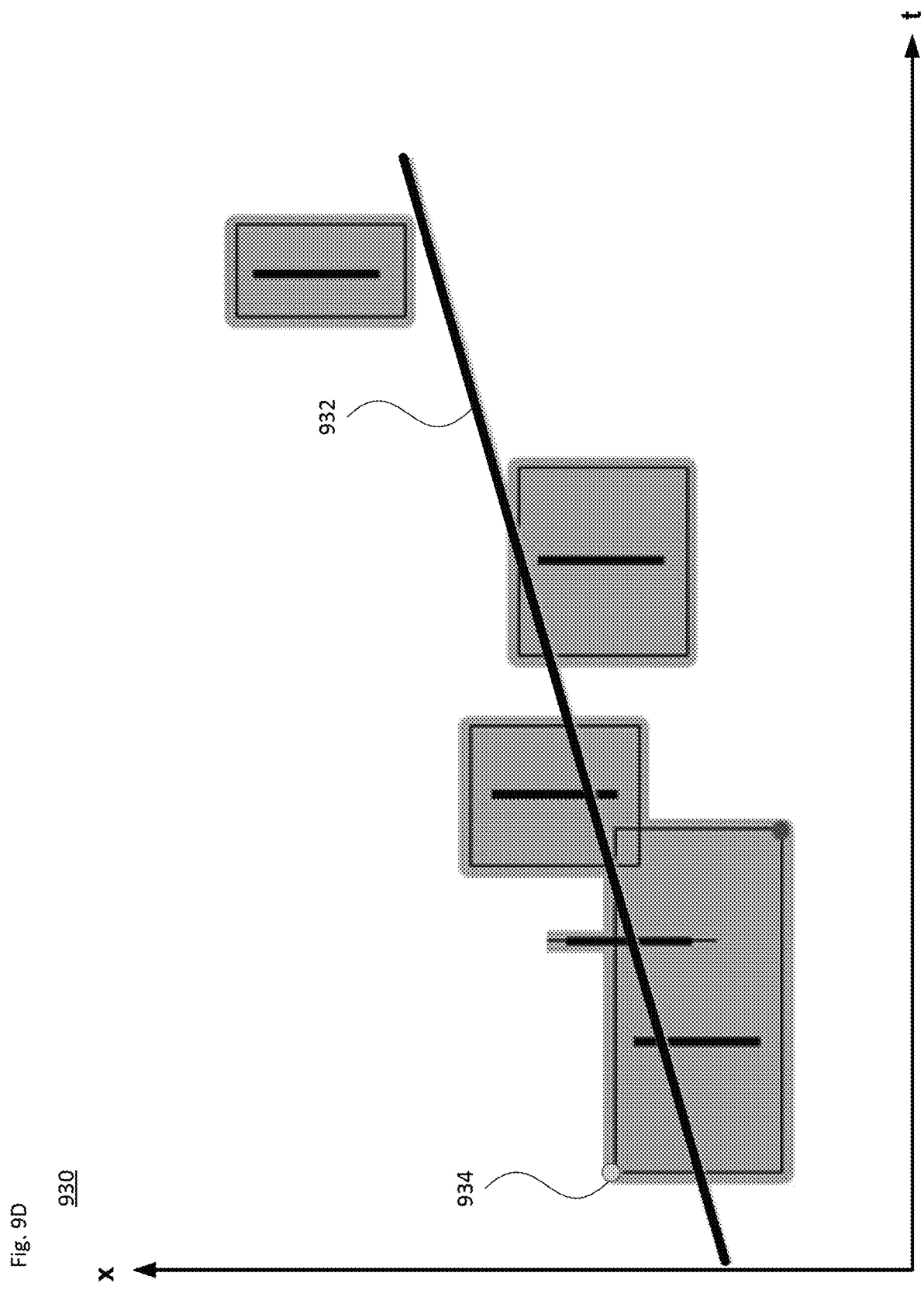

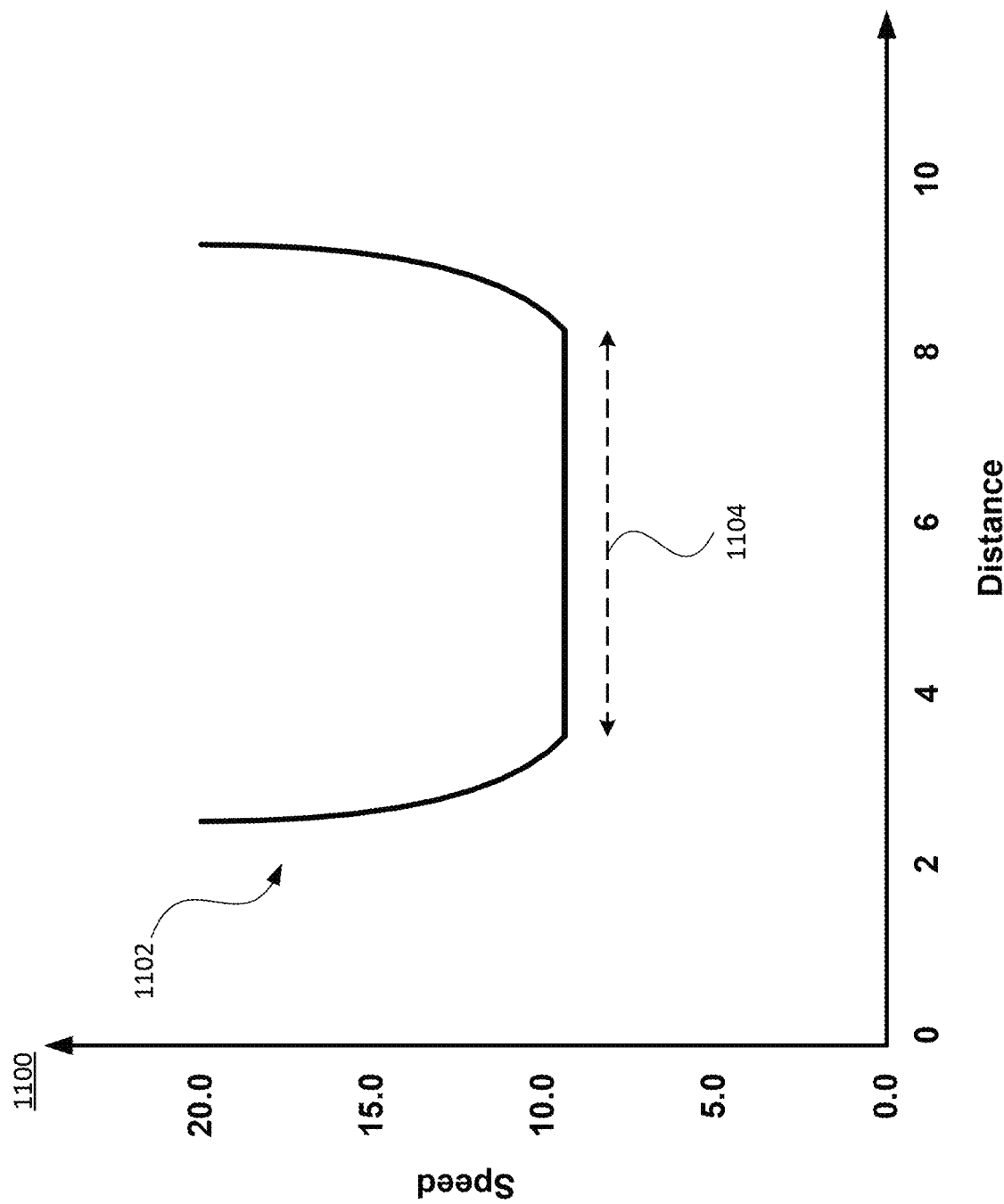

1220

PERMEABLE SPEED CONSTRAINTS

CROSS-REFERENCE TO RELATED APPLICATIONS

This application claims the benefit of the filing date of Provisional Application No. 63/131,092, filed Dec. 28, 2020, the entire disclosure of which is incorporated herein by reference.

BACKGROUND

Self-driving vehicles that operate in an autonomous driving mode may transport passengers or items such as cargo from one location to another. Such vehicles are typically equipped with various types of sensors in order to detect objects in the surroundings. For example, self-driving vehicles may include lasers (lidars), radar, cameras, and other devices which obtain sensor data (e.g., point cloud data or images) from the vehicle's surroundings. Sensor data from one or more of these devices may be used to detect objects and their respective characteristics (e.g., position, shape, heading, speed, etc.). These characteristics can be used to predict what an object is likely to do for some brief period of time in the immediate future. The predictions can aid in controlling the vehicle in order to avoid these objects. Thus, detection, identification, and prediction are critical functions for the safe operation of autonomous vehicle.

BRIEF SUMMARY

The technology relates to controlling self-driving vehicles in autonomous driving modes according to a speed plan. For instance, such autonomous vehicles operate by detecting and identifying objects in the vehicle's nearby environment and reacting to those objects, for instance by changing lanes, speeding up or slowing down. In order to control the vehicle safely, the vehicle's computing devices must be able to determine the speed at which to drive the vehicle. To do this, the computing devices may select a speed plan and adjust that speed plan based on various constraints in real time. A speed plan may be determined for a predetermined period into the future, such as the next 5-20 seconds or more or less. The speed plan may define how the vehicle varies its speed over the predetermined period of time. The speed plan may then be used to control the speed of the vehicle, for instance, by adjusting braking and acceleration systems of the vehicle. By computing over the predetermined period of time, the changes in acceleration ("jerk") experienced by a passenger may be reduced.

However, certain constraints may act in a discontinuous "binary" fashion, which would cause the vehicle to take an action such as hard braking when the constraint is true (e.g., an object is within X meters laterally from the vehicle's path, such as within 1-2 meters), or no action when the constraint is not true (e.g., when the object is slightly farther than X meters from the vehicle, e.g., more than 2.01 meters). To address such issues, aspects of the technology incorporate permeable speed constraints in the speed solver of the driving system, which can include both a speed search algorithm or speed finder for certain discrete decisions and an optimizer for improving on other criteria and metrics. Such constraints are considered "permeable" because unlike other speed constraints they allow driving through those constraints as long as the vehicle satisfies certain speed and/or duration limits. Permeable speed constraints can help make planner decisions more continuous by reducing sensitivity to binary-type inputs. This can be particularly beneficial in scenarios such as driving through objects (e.g., soft trash) at low speed, slowly passing objects with a low lateral gap, and slowing down to mitigate other risk factors.

According to one aspect, a method of maneuvering a vehicle in an autonomous driving mode is provided. The method comprises obtaining, from a perception system of the vehicle, sensor data of one or more objects in an external environment around the vehicle; identifying, by one or more processors, characteristics for each of the one or more objects; determining, by the one or more processors based on the characteristics, a projected trajectory for each of the one or more objects over a selected timeframe; determining, by the one or more processors based on a route of the vehicle, a projected vehicle trajectory over the selected timeframe; generating, by the one or more processors based on the projected trajectories for the one or more objects and the projected vehicle trajectory, a plurality of constraints associated with each of the one or more objects, wherein the plurality of constraints is defined in a distance versus time space; selecting, by the one or more processors, a speed plan based on the plurality of constraints, in which the vehicle is able to pass through a given one of the constraints when a speed of the vehicle relative to a speed of the given constraint satisfies one or more criteria; and maneuvering, by the one or more processors, the vehicle in the autonomous driving mode according to the speed plan.

In one example, the speed plan limits a duration that the vehicle spends inside the given constraint. Here, at least one of a speed of the speed plan and the duration that the vehicle spends inside the given constraint is variable according to a discomfort level.

In another example, the given constraint correlates to a given one of the one or more objects, and at least one of the characteristics of the given object indicate it can be driven through. The given constraint may correlate to a given one of the one or more objects, and a lateral gap between the given object and the vehicle is below a minimum threshold. The given constraint may be a binary constraint. Each projected trajectory for the one or more objects may include a list of agent states representing at least one of a position or speed of a corresponding one of the objects.

In a further example, the given constraint has a set of constraint states over the selected timeframe. Here, selecting the speed plan may include evaluating speed across the set of constraint states. Evaluating speed (a speed limit) across the set of constraint states may include interpolating between at least one pair of adjacent constraint states. The interpolating may be done based time boundaries of the at least one pair of adjacent constraint states.

In another example, prior to maneuvering the vehicle, the one or more processors optimize the speed plan according to at least one permeable variant of a static range or barrier potential. Here, wherein maneuvering the vehicle in the autonomous driving mode according to the speed plan is performed based on the optimized speed plan.

Alternatively or additionally to any of the configurations above, the method may further comprise, prior to maneuvering the vehicle, optimizing the speed plan by formulating one or more existing proximity speed potentials as constraints on vehicle speed that are relaxed as constraints on distance. And alternatively or additionally to any of the configurations above the method may further comprise, prior to maneuvering the vehicle, optimizing the speed plan by creating constraints for both passing and yielding.

According to another aspect, a vehicle is configured to operate in an autonomous driving mode. The vehicle comprises a perception system including one or more sensors, the one or more sensors being configured to obtain sensor data associated with objects in an external environment around the vehicle; a driving system including a steering subsystem, an acceleration subsystem and a deceleration subsystem to control driving of the vehicle; a positioning system configured to determine a current position of the vehicle; and a control system including one or more processors. The control system is operatively coupled to the driving system, the perception system and the positioning system. The control system is configured to: obtain, from the perception system, the sensor data of one or more objects in the external environment; identify, characteristics for each of the one or more objects; determine, based on the characteristics, a projected trajectory for each of the one or more objects over a selected timeframe; determine, based on a route of the vehicle, a projected vehicle trajectory over the selected timeframe; generate, based on the projected trajectories for the one or more objects and the projected vehicle trajectory, a plurality of constraints associated with each of the one or more objects, wherein the plurality of constraints is defined in a distance versus time space; select a speed plan based on the plurality of constraints, in which the vehicle is able to pass through a given one of the constraints when a speed of the vehicle relative to a speed of the given constraint satisfies one or more criteria; and control the driving system to maneuver the vehicle in the autonomous driving mode according to the speed plan.

The speed plan may limit a duration that the vehicle spends inside the given constraint. The given constraint may correlate to a given one of the one or more objects. Here, at least one of the characteristics of the given object may indicate that the given constraint can be driven through, or a lateral gap between the given object and the vehicle may be below a minimum threshold. Alternatively or additionally, the given constraint may have a set of constraint states over the selected timeframe, in which selection of the speed plan includes evaluating speed across the set of constraint states.

Alternatively or additionally to any of the configurations above, the control system may be further configured, prior to maneuvering the vehicle, to optimize the speed plan according to at least one permeable variant of a static range or barrier potential. Here, maneuvering the vehicle in the autonomous driving mode according to the speed plan may be performed based on the optimized speed plan. Alternatively or additionally to any of the configurations above, the control system is further configured, prior to maneuvering the vehicle, to optimize the speed plan by formulating one or more existing proximity speed potentials as constraints on vehicle speed that are relaxed as constraints on distance.

BRIEF DESCRIPTION OF THE DRAWINGS

FIGS. 1C-D illustrate an example cargo-type vehicle configured for use with aspects of the technology.
FIGS. 5A-C illustrate evaluation of an exemplary non-permeable speed constraint in accordance with aspects of the technology.
FIGS. 6A-B illustrate an example constraint scenario in accordance with aspects of the technology.
FIGS. 7A-B illustrate an example for keeping a vehicle speed profile from slipping between two constraint states, in accordance with aspects of the technology.
FIGS. 8A-K illustrate examples of state interpolation in accordance with aspects of the technology.
FIGS. 9A-D illustrate pass and yield decisions in accordance with aspects of the technology.
FIGS. 11A-C illustrate potentials and gain selection in accordance with aspects of the technology.

DETAILED DESCRIPTION

Overview

Figure 1A:
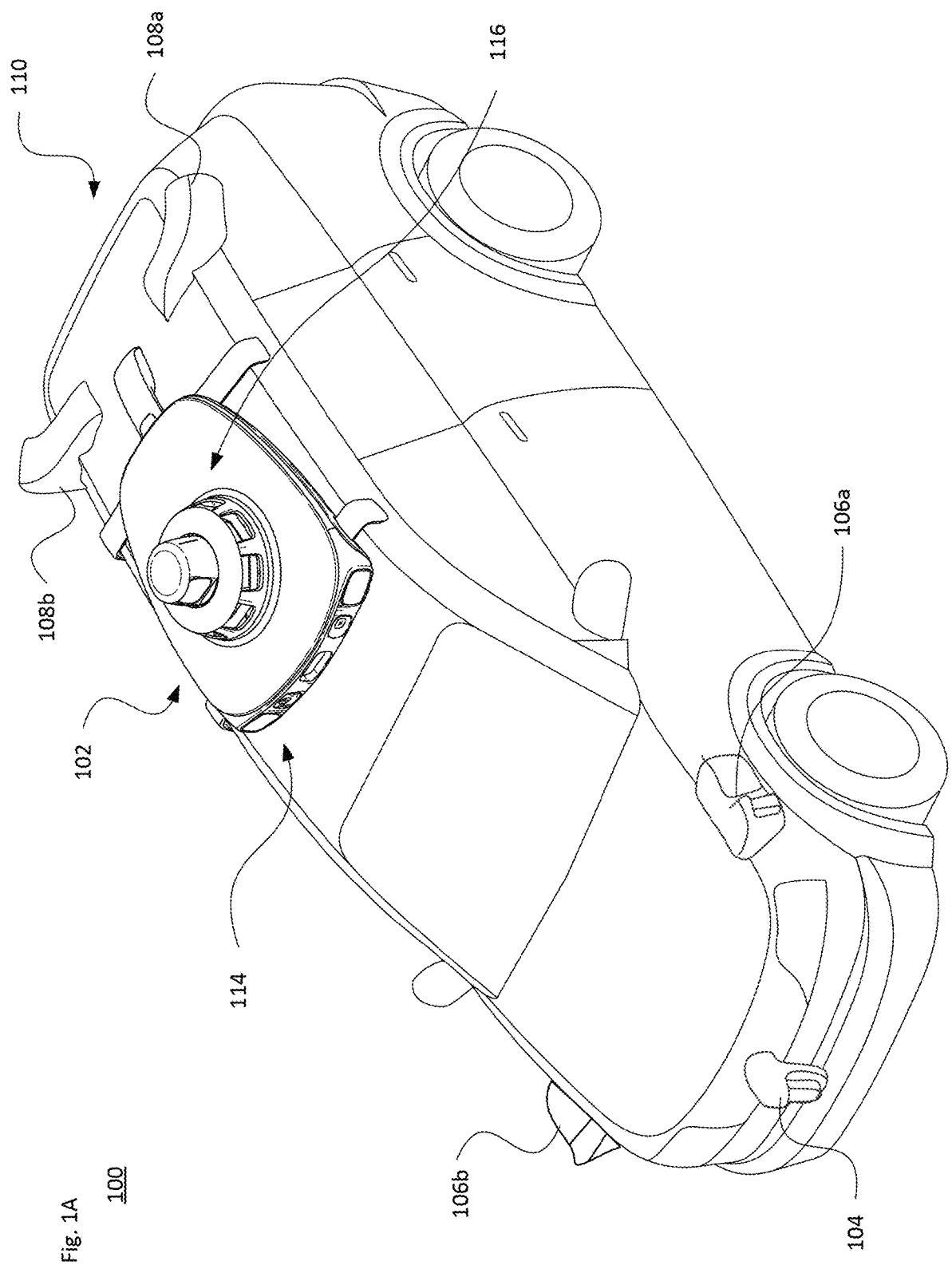
FIGS. 1A-B illustrate example self-driving vehicles in accordance with aspects of the technology.

The technology relates to planning trajectories for self-driving vehicles. A trajectory may include a geometry component which identifies the locations at which an object will be located as well as a speed component which identifies the speeds, accelerations/decelerations, and rates of deceleration/acceleration that a self-driving vehicle can use to follow a route. In this regard, planned trajectories may be limited in time to a few seconds, such as 5-20 seconds (or more or less). The planned trajectory should be consistent with all of the dynamic constraints of the vehicle (e.g., acceleration and deceleration limits, etc.), and for safety reasons should be put through both collision and proximity analysis with respect to nearby objects in the vehicle's external environment and the predicted locations of those nearby objects.

In order to generate a planned trajectory, the vehicle's routing system (e.g., planner module) determines a route to a destination of the vehicle. The route may include the simple geometric path including turns, merges, lane changes, etc. that the vehicle can follow from the vehicle's current location to the vehicle's destination. When generating a planned trajectory, the planning system may select a baseline geometry. This baseline geometry may be a nominal path that traverses one or more lanes of the road in a sequence in accordance with a route to a destination of the vehicle. In addition, the vehicle's computing devices may determine how long a planned trajectory needs to be by identifying a stopping point or a stopping location for the autonomous vehicle along the baseline.

As the autonomous vehicle moves through its environment, the vehicle's perception system may detect and identify objects (e.g., road users) in the vehicle's nearby environment. The perception system may determine one or more characteristics for each object including location, type, heading, orientation, speed, acceleration, change in acceleration, size, shape, etc. This information may be input into a behavior prediction system software module of a behavior modeling system in order to determine predicted trajectories for relevant road user objects. For instance, pedestrians may have trajectories that follow sidewalks and crosswalks at intersections, while bicyclists may have trajectories that either follow a bike lane (if one is present) or the flow of traffic along a portion of a roadway. Motorcycles, cars, vans, trucks and the like may also have different predicted trajectories according to their behavior models.

A plurality of constraints for avoiding collisions or proximity with other road user objects, responding to traffic signals, speed or other control limits, etc., may then be generated based on the sensor data and the predicted trajectories. For instance, the baseline may be used to determine a speed plan which the autonomous vehicle can follow while satisfying (e.g., avoiding or falling within) all of the constraints. However, before publishing a planned trajectory for use by other systems of the vehicle, the vehicle's computing devices may perform collision evaluation and proximity analysis for the planned trajectory and any road user objects detected in the sensor data.

When operating in a self-driving mode, the computing device(s) of the vehicle may select a speed plan (e.g., according to a general speed finder and a local optimizer) and adjust the plan based on various constraints in real time. The constraints may be specified in a two-dimensional (2D) space—a "distance-along-path v. time" space. The processing system of the vehicle may then solve for a speed profile that satisfies all constraints while respecting kinematic limits (e.g., on speed, acceleration, and jerk) of the vehicle. Examples of constraints may be the overlap between physical objects in the nearby environment and the vehicle's path (either the object's current location, or its predicted location over time), traffic controls (e.g., stop lights, stop signs, yield signs, etc.), and other types of constraints.

When constraints are "binary" (e.g., either 0 or 1, or true or false), the speed planning problem can be solved efficiently using a variety of techniques, including bang-bang optimal control, dynamic programming, or topological or state-space search. One downside is that binary constraints are inherently discontinuous over time. For example, an object that is overlapping the trajectory (and thus imposing a difficult constraint, such as one that requires hard braking immediately) at the present time may, a short while into the future (e.g., 1-3 seconds), move slightly further away (e.g., 0.01-0.5 meters or more or less) from the vehicle's own trajectory and no longer be considered "in overlap". Should this occur, the constraint may be removed entirely and the vehicle could accelerate again. However, due to noise in sensor inputs or prediction models, objects may go in and out of overlap very quickly, sometimes several times per second. In a system that replans many times per second (e.g., on the order of 5-20 Hz), this can result in planning discontinuities, unstable driving decisions, unnecessary brake-tapping, steering wheel twitching, and other undesirable behavior, which may be disconcerting to passengers and could possibly damage certain types of cargo (e.g., grocery packages containing eggs or fruit or vegetables that easily bruise).

Permeable speed constraints can address such issues by defining constraints as velocity-dependent obstacles in "distance v. time" space. Thus, as long as the relative speed of the vehicle and the constraints fall within prescribed boundaries, the control system allows the planner module to create a solution that would pass through such constraints. This fixes the binary problem by specifying the overlap with an object as the overlap plus some additional padding factor. When the object is in "true" overlap without padding, where the object and the vehicle's paths would intersect, the permeable speed constraint acts as a normal ("hard") constraint, and the vehicle may not be permitted in that part of distance vs. time space. But when the object's padding is in overlap with the path, the imposed permeable constraint is a velocity limit (a maximum and/or minimum limit). This achieves the behavior that trajectories that pass closely to—but do not collide with—the current/future states of objects must slow down, but do not have to stop completely. This in turn means that small perturbations in the constraint inputs, such as due to noise in sensor inputs or prediction models, are less likely to lead to vast differences in successive driving plans. This approach has the desired benefit that the speed planning problem can still be solved efficiently, since there is still a deterministic mapping between distance vs. time space and the vehicle's allowable speed. Such an approach can be applied for both local optimization and a more generalized speed finder.

Example Vehicle Systems

The technology may be employed in all manner of self-driving vehicles, including vehicles that transport passengers or items such as food deliveries, packages, cargo, etc. While certain aspects of the disclosure may be particularly useful in connection with specific types of vehicles, the vehicle may be different types of vehicle including, but not limited to, cars, vans, motorcycles, cargo vehicles, buses, recreational vehicles, emergency vehicles, construction equipment, cleaning or sweeping equipment, etc.

Figure 1B:
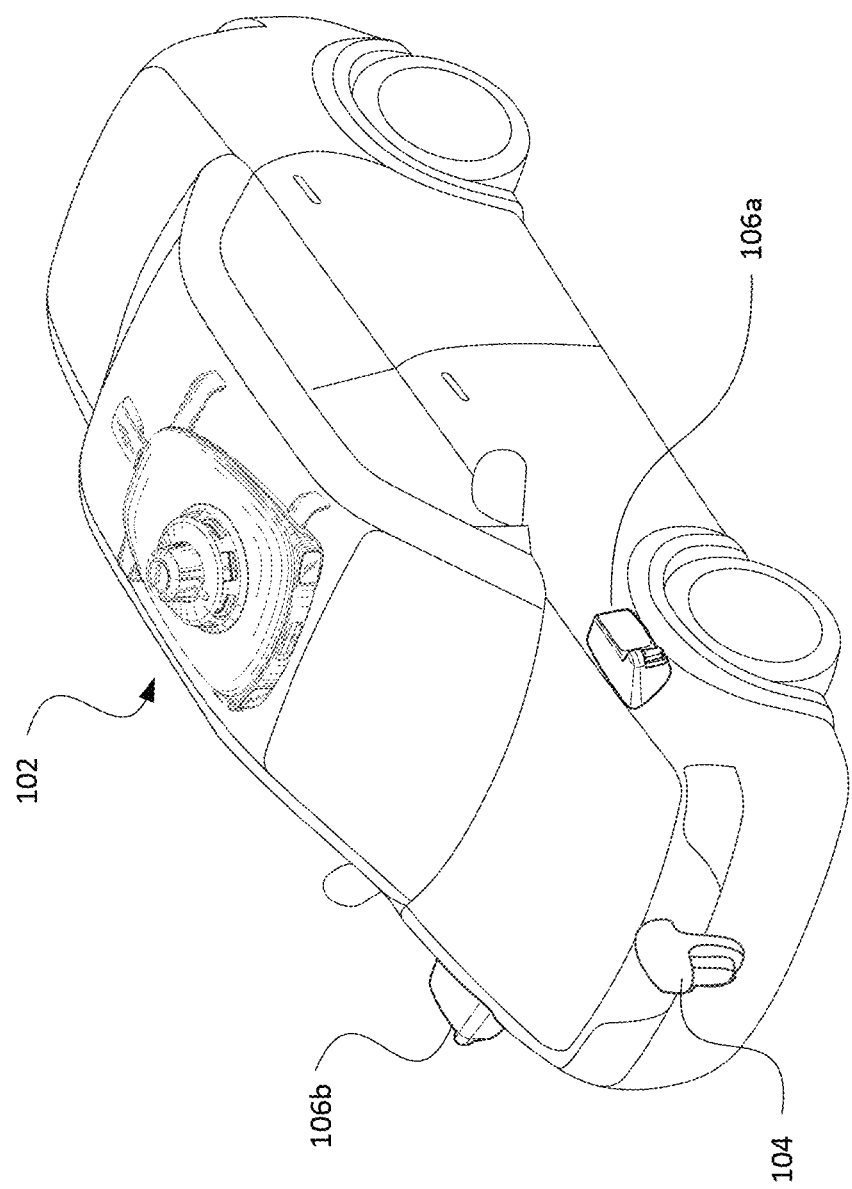

FIG. 1A illustrates a perspective view of an example passenger vehicle 100, such as a minivan or sport utility vehicle (SUV). FIG. 1B illustrates a perspective view of another example passenger vehicle 150, such as a sedan. The passenger vehicles may include various sensors for obtaining information about the vehicle's external environment. For instance, a roof-top housing unit (roof pod assembly) 102 may include a lidar sensor as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

Arrow 114 indicates that the roof pod 102 as shown includes a base section coupled to the roof of the vehicle. And arrow 116 indicated that the roof pod 102 also includes an upper section raised above the base section. Each of the base section and upper section may house different sensor units configured to obtain information about objects and conditions in the environment around the vehicle. The roof pod 102 and other sensor housings may also be disposed along vehicle 150 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

FIGS. 1C-D illustrate an example cargo vehicle 150, such as a tractor-trailer truck. The truck may include, e.g., a single, double or triple trailer, or may be another medium or heavy-duty truck such as in commercial weight classes 4 through 8. As shown, the truck includes a tractor unit 152 and a single cargo unit or trailer 154. The trailer 154 may be fully enclosed, open such as a flat bed, or partially open depending on the type of cargo to be transported. In this example, the tractor unit 152 includes the engine and steering systems (not shown) and a cab 156 for a driver and any passengers.

The trailer 154 includes a hitching point, known as a kingpin, 158. The kingpin 158 is typically formed as a solid steel shaft, which is configured to pivotally attach to the tractor unit 152. In particular, the kingpin 158 attaches to a trailer coupling 160, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 162, 164 disposed there along. For instance, one or more sensor units 162 may be disposed on a roof or top portion of the cab 156, and one or more side sensor units 164 may be disposed on left and/or right sides of the cab 156. Sensor units may also be located along other regions of the cab 156, such as along the front bumper or hood area, in the rear of the cab, adjacent to the fifth-wheel, underneath the chassis, etc. The trailer 154 may also have one or more sensor units 166 disposed there along, for instance along a side panel, front, rear, roof and/or undercarriage of the trailer 154.

As with the sensor units of the passenger vehicles of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors).

There are different degrees of autonomy that may occur for a self-driving vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. At this level, the vehicle may operate in a strictly driver-information system without needing any automated control over the vehicle. Here, the vehicle's onboard sensors, relative positional knowledge between them, and a way for them to exchange data, can be employed to implement aspects of the technology as discussed herein. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes for which speed planning is employed, which are referred to herein as autonomous driving modes. Thus, reference to an autonomous driving mode herein includes both partial and full autonomy.

Figure 2:
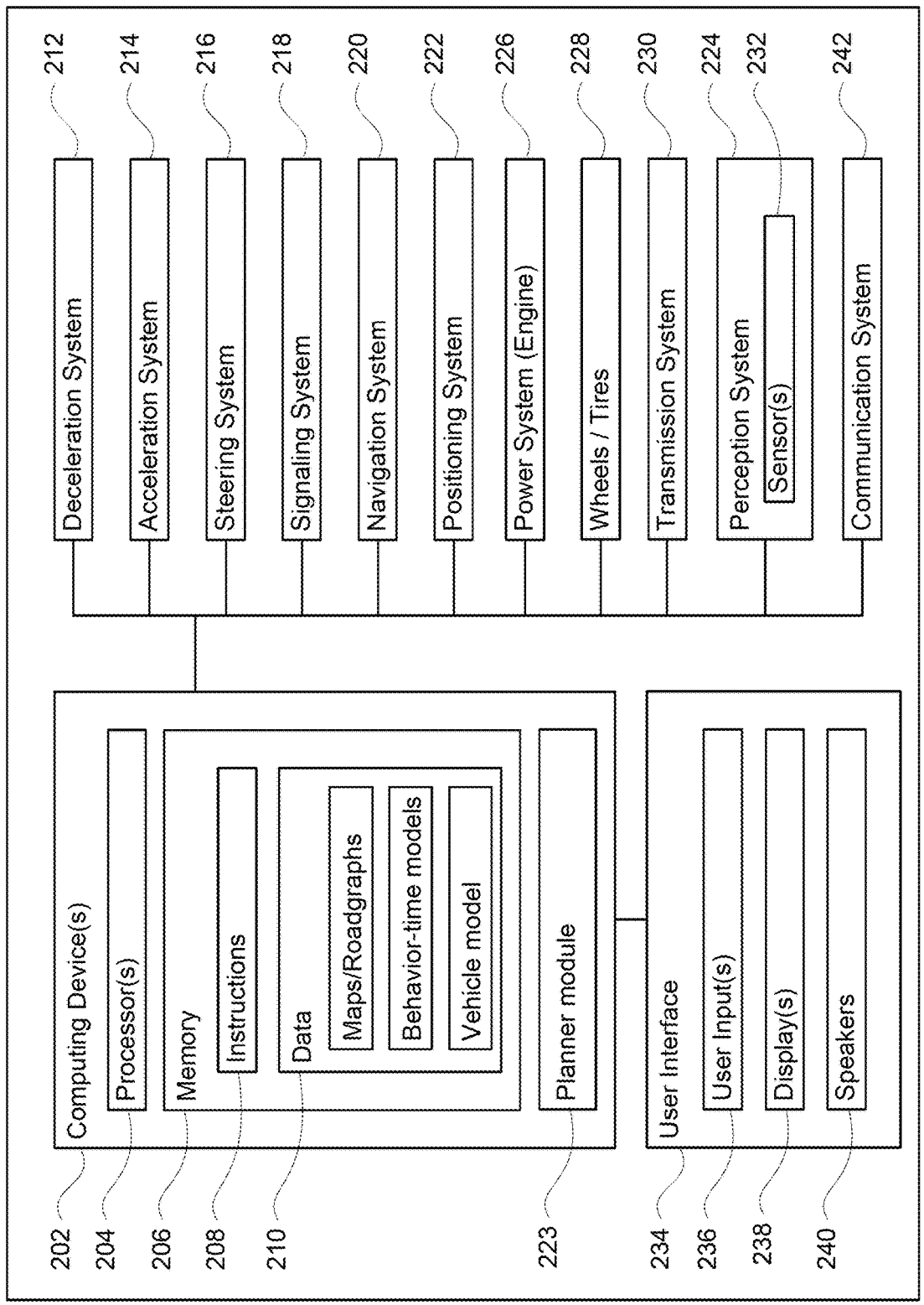
FIG. 2 illustrates components of a self-driving vehicle in accordance with aspects of the technology.

FIG. 2 illustrates a block diagram 200 with various components and systems of an exemplary vehicle, such as passenger vehicle 100 or 150, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. For instance, the memory may include illumination-related information to perform, e.g., occluded vehicle detection. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. In one example, some or all of the memory 206 may be an event data recorder or other secure data storage system configured to store vehicle diagnostics and/or detected sensor data, which may be on board the vehicle or remote, depending on the implementation.

The data 210, such as map information (e.g., roadgraphs), behavior-time models, vehicle models, etc., may be retrieved, stored or modified by one or more processors 204 in accordance with the instructions 208. In one example, behavior-time models may be used to predict the future behavior of one or more detected objects in the vehicle's nearby environment for a pre-determined period of time, such as the next 10 seconds or more or less.

In one example, the behavior-time models may be configured to use data for an object received from the perception system, and in particular another road user, including the road user's characteristics as well as additional contextual information. As an example, given the location, heading, speed, and other characteristics included in the data from the vehicle's onboard perception system, the behavior-time models may provide a set of one or more predictions for how the object could behave for the predetermined period of time as well as a corresponding likelihood value for each prediction. The predictions may include a trajectory, for instance, defining a set of future locations where the object is expected to be at various times in the future corresponding to the predetermined period of time. The likelihood values may indicate which of the predictions are more likely to occur (relative to one another). In this regard, the prediction with the greatest likelihood value may be the most likely to occur whereas predictions with lower likelihood values may be less likely to occur.

Thus, the behavior-time models may be configured to generate a set of possible hypotheses for what a particular road user will do over a particular horizon or predetermined period of time (e.g. 10 seconds) and relative likelihoods for each hypothesis. These models may be trained using data about how an object observed at that location behaved in the past, intuition, etc., and may also be specifically designated for particular types of objects, such as vehicles, pedestrians, motorcycles, bicyclists, etc. The computing devices can then reason about hypotheses that interact with the vehicle's trajectory and are of a sufficient likelihood to be worth considering.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose, e.g., position and orientation along the roadway or pitch, yaw and roll of the vehicle chassis relative to a coordinate system). The autonomous driving computing system may employ a planner module 223, in accordance with the navigation system 220, the positioning system 222 and/or other components of the system, e.g., for determining a route from a starting point to a destination, for determining a speed plan for an upcoming timeframe (e.g., the next 5-20 seconds), or for making modifications to various driving aspects in view of current or expected environmental conditions.

The computing devices 202 are also operatively coupled to a perception system 224 (for detecting objects in the vehicle's environment and information about the vehicle such as tracking increases or decreases in speed and the direction of such changes), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from map information and navigation system 220. Computing devices 202 may use the positioning system 222 to determine the vehicle's location and the perception system 224 to detect and respond to objects when needed to reach the location safely. In order to do so, computing devices 202 may implement a speed plan that causes the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, which the computing devices 202 can use to navigate or control the vehicle. The map information may include information identifying the shape, location, and other characteristics of lanes, traffic signal lights, crosswalks, sidewalks, stop or yield signs, stop lines or other road markings, etc. Areas where a vehicle can drive may indicate the location and direction in which a vehicle should generally travel at various locations in the map information.

While the map information may be image-based maps, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, a stop sign or road markings such as stop lines and crosswalks may be linked to a road and an intersection, etc. In some examples, the associated data may include grid-based indices of a road network to allow for efficient lookup of certain road network features.

In this regard, the map information may include a plurality of graph nodes and edges representing road or lane segments that together make up the road network of the map information. In this case, each edge may be defined by a starting graph node having a specific geographic location (e.g., latitude, longitude, altitude, etc.), an ending graph node having a specific geographic location (e.g., latitude, longitude, altitude, etc.), and a direction. This direction may refer to a direction the vehicle must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes.

Thus, the maps may identify the shape and elevation of roadways, lane markers, intersections, stop lines, crosswalks, posted speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The detected objects may be other vehicles, obstacles in the roadway, traffic signals, signs, road markings (e.g., crosswalks and stop lines), objects adjacent to the roadway such as sidewalks, trees or shrubbery, etc. The sensors may 232 may also detect certain aspects of weather conditions, such as snow, rain or water spray, or puddles, ice or other materials on the roadway.

By way of example only, the sensors of the perception system may include light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, and/or any other detection devices that record data which may be processed by computing devices 202. The perception system 224 may also include one or more microphones or other acoustical arrays, for instance arranged along the roof pod 102 and/or other sensor assembly housings.

Such sensors of the perception system 224 may detect objects outside of the vehicle and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 224 may also include other sensors within the vehicle to detect objects and conditions associated with the vehicle. For instance, sensors may detect, e.g., one or more persons, pets or packages, within the vehicle. Other sensors may detect conditions within and/or outside the vehicle such as temperature, humidity, etc. Still other sensors 232 of the perception system 224 may measure the rate of rotation and angle of the wheels 228, an amount or a type of braking by the deceleration system 212, overall vehicle pose, and other factors associated with the equipment of the vehicle itself.

The raw data and/or characteristics of objects received from the perception system may be used with contextual information as input to a behavior-time model of data 210 to make a prediction about what other objects are going to do for the predetermined period of time. For instance, information such as the object's type, location, lateral gap proximity, recent motion heading, acceleration, and velocity may be combined with other information such as where the object is in the world using the detailed map information discussed above may be used as input to a behavior-time model. The contextual information may include the status of other objects in the environment, such as the states of traffic lights. In addition, features of other objects (such as vehicles) that might be crossing the objects' path may also be used as input to the model.

The raw data obtained by the sensors can be processed by the perception system 224 and/or sent for further processing to the computing devices 202 periodically or continuously as the data is generated by the perception system 224. For instance, the raw data from the sensors can be quantified or arranged into a descriptive function or vector for processing.

Computing devices 202 may use the positioning system 222 to determine the vehicle's location and perception system 224 to detect and respond to objects and roadway information (e.g., signage, speed limits and/or road markings) when needed to reach the location safely, e.g., via adjustments made by planner module 223, including adjustments in the speed plan.

As illustrated in FIGS. 1A-B, certain sensors of the perception system 224 may be incorporated into one or more sensor assemblies or housings. In one example, these may be integrated into front, rear or side perimeter sensor assemblies around the vehicle. In another example, other sensors may be part of the roof-top housing (roof pod) 102. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle to provide information to riders, or to communicate with users or other people outside the vehicle.

The vehicle may also include a communication system 242. For instance, the communication system 242 may also include one or more wireless configurations to facilitate communication with other computing devices, such as passenger computing devices within the vehicle, computing devices external to the vehicle such as in other nearby vehicles on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
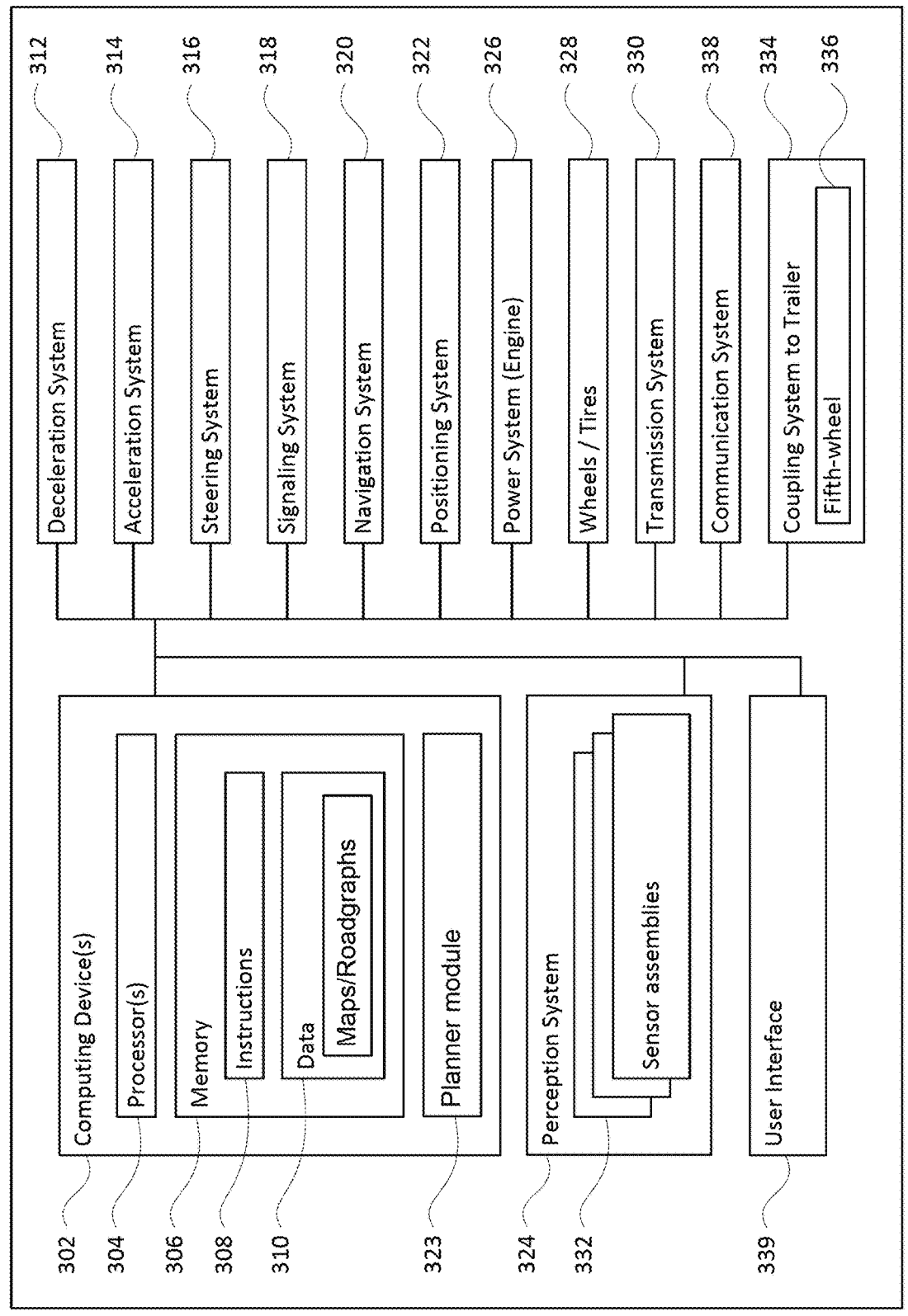
FIGS. 3A-B are block diagrams of systems of an example cargo-type vehicle in accordance with aspects of the technology.

FIG. 3A illustrates a block diagram 300 with various components and systems of a vehicle, e.g., vehicle 150 of FIGS. 1C-D. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the data may include map-related information (e.g., roadgraphs), behavior-time models, discomfort information, etc., to perform speed planning.

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

In one example, the computing devices 302 may form an autonomous driving computing system incorporated into vehicle 150. Similar to the arrangement discussed above regarding FIG. 2, the autonomous driving computing system of block diagram 300 may be capable of communicating with various components of the vehicle in order to perform route planning and driving operations. For example, the computing devices 302 may be in communication with various systems of the vehicle, such as a driving system including a deceleration system 312, acceleration system 314, steering system 316, signaling system 318, navigation system 320 and a positioning system 322, each of which may function as discussed above regarding FIG. 2.

The computing devices 302 are also operatively coupled to a perception system 324, a power system 326 and a transmission system 330. Some or all of the wheels/tires 228 are coupled to the transmission system 230, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information and navigation system 320. Computing devices 302 may employ a planner module 323, in conjunction with the positioning system 322, the perception system 324 and other subsystems to detect and respond to objects when needed to reach the location safely, similar to the manner described above for FIG. 2.

Similar to perception system 224, the perception system 324 also includes one or more sensors or other components such as those described above for detecting objects external to the vehicle, objects or conditions internal to the vehicle, and/or operation of certain vehicle equipment such as the wheels and deceleration system 312. For instance, as indicated in FIG. 3A the perception system 324 includes one or more sensor assemblies 332. Each sensor assembly 232 includes one or more sensors. In one example, the sensor assemblies 332 may be arranged as sensor towers integrated into the side-view mirrors on the truck, farm equipment, construction equipment or the like. Sensor assemblies 332 may also be positioned at different locations on the tractor unit 152 or on the trailer 154, as noted above with regard to FIGS. 1C-D. The computing devices 302 may communicate with the sensor assemblies located on both the tractor unit 152 and the trailer 154. Each assembly may have one or more types of sensors such as those described above.

Also shown in FIG. 3A is a coupling system 334 for connectivity between the tractor unit and the trailer. The coupling system 334 may include one or more power and/or pneumatic connections (not shown), and a fifth-wheel 336 at the tractor unit for connection to the kingpin at the trailer. A communication system 338, equivalent to communication system 242, is also shown as part of vehicle system 300.

Similar to FIG. 2, in this example the cargo truck or other vehicle may also include a user interface subsystem 339. The user interface subsystem 339 may be located within the cabin of the vehicle and may be used by computing devices 202 to provide information to passengers within the vehicle, such as a truck driver who is capable of driving the truck in a manual driving mode.

Figure 3B:
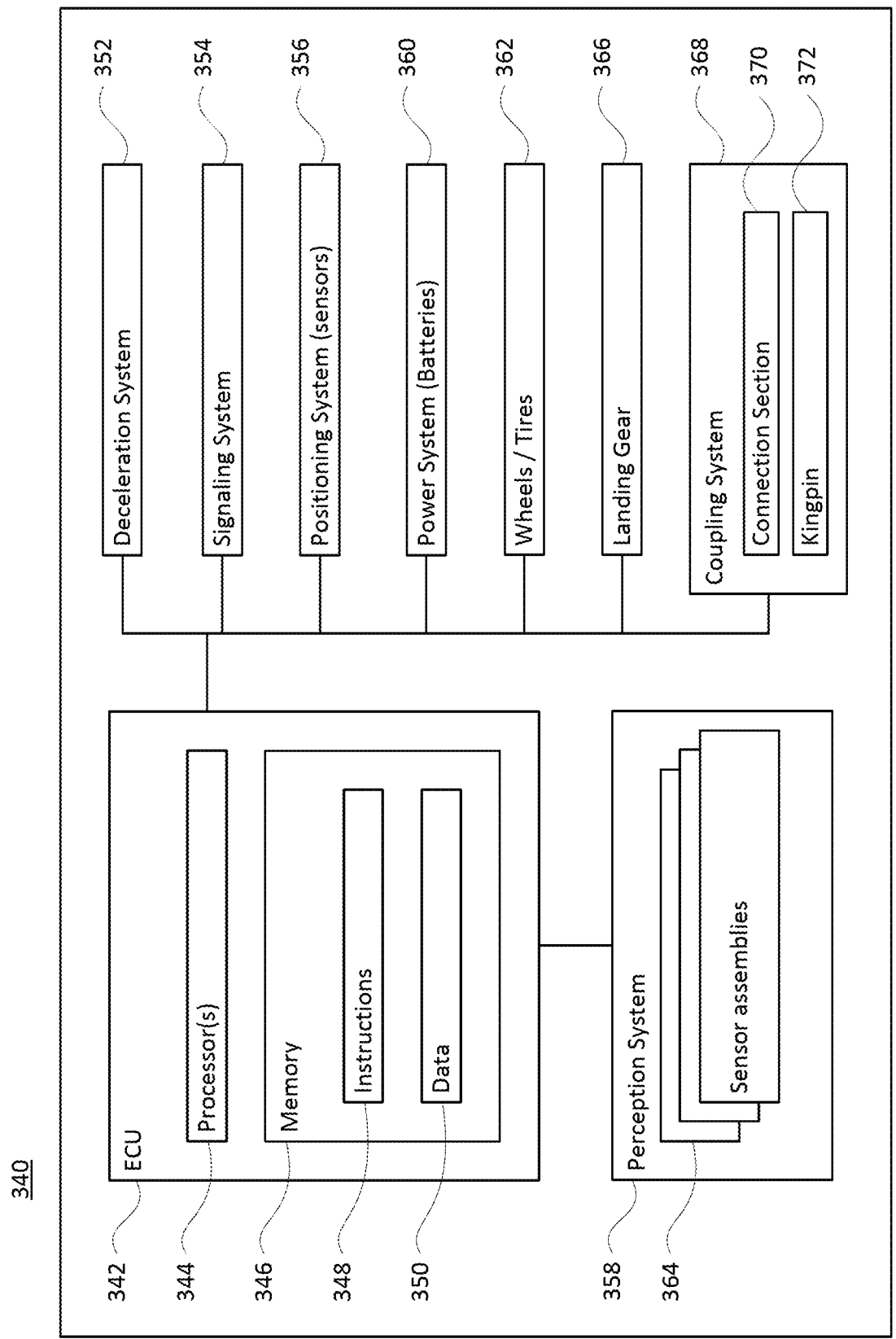

FIG. 3B illustrates an example block diagram 340 of systems of the trailer, such as trailer 154 of FIGS. 1C-D. As shown, the system includes an ECU 342 of one or more computing devices, such as computing devices containing one or more processors 344, memory 346 and other components typically present in general purpose computing devices. The memory 346 stores information accessible by the one or more processors 344, including instructions 348 and data 350 that may be executed or otherwise used by the processor(s) 344. The descriptions of the processors, memory, instructions and data from FIGS. 2 and 3A apply to these elements of FIG. 3B.

The ECU 342 is configured to receive information and control signals from the trailer unit. The on-board processors 344 of the ECU 342 may communicate with various systems of the trailer, including a deceleration system 352, signaling system 354, and a positioning system 356. The ECU 342 may also be operatively coupled to a perception system 358 with one or more sensors arranged in sensor assemblies 364 for detecting objects in the trailer's environment. The ECU 342 may also be operatively coupled with a power system 360 (for example, a battery power supply) to provide power to local components. Some or all of the wheels/tires 362 of the trailer may be coupled to the deceleration system 352, and the processors 344 may be able to receive information about tire pressure, balance, wheel speed and other factors that may impact driving in an autonomous mode, and to relay that information to the processing system of the tractor unit. The deceleration system 352, signaling system 354, positioning system 356, perception system 358, power system 360 and wheels/tires 362 may operate in a manner such as described above with regard to FIGS. 2 and 3A.

The trailer also includes a set of landing gear 366, as well as a coupling system 368. The landing gear may provide a support structure for the trailer when decoupled from the tractor unit. The coupling system 368, which may be a part of coupling system 334, provides connectivity between the trailer and the tractor unit. Thus, the coupling system 368 may include a connection section 370 (e.g., for communication, power and/or pneumatic links to the tractor unit). The coupling system also includes a kingpin 372 configured for connectivity with the fifth-wheel of the tractor unit.

General Speed Planning

Figure 4A:
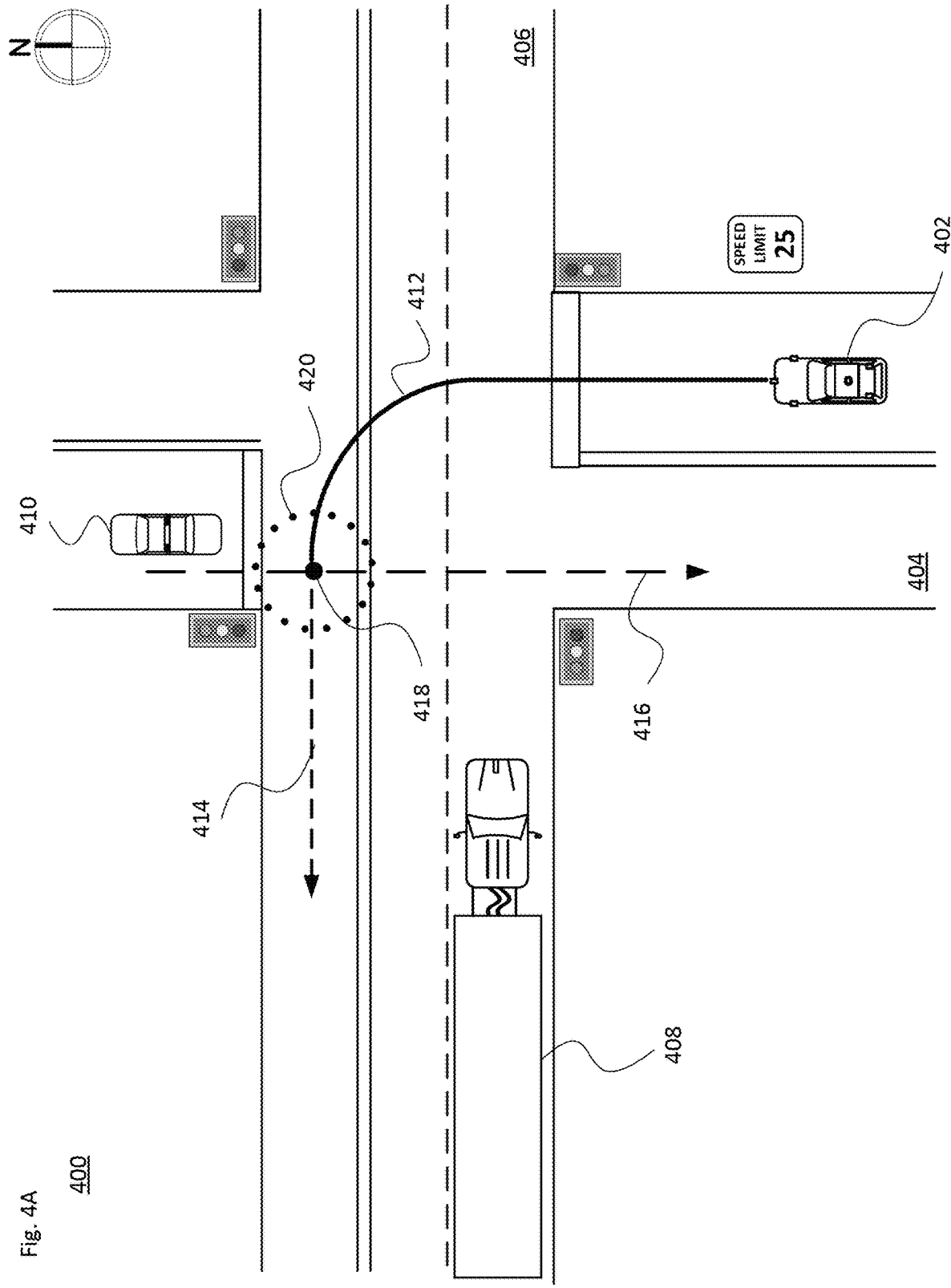
FIGS. 4A-B illustrate speed planning scenarios in accordance with aspects of the technology.

Before discussing permeable speed plans in particular, examples of general speed plans are presented with reference to view 400 of FIG. 4A. In this example, self-driving vehicle 402 is driving along a road segment 404, approaching an intersection with cross-street road segment 406. In order to reach a desired location, the vehicle 402 may plan on making a left turn at the intersection onto the westbound lanes of road segment 406. As shown in this example, there may be other road users, such as truck 408 traveling eastbound on the cross-street, and a car 410 traveling in the southbound direction opposite the vehicle 402.

As noted above, a speed plan may be determined for a predetermined period of time into the immediate future, such as the next 5-15 seconds (or more or less). The speed plan may define how the vehicle varies its speed (accelerates, decelerates, or continues at a given speed) over the predetermined period of time. For instance, the speed of a vehicle may remain constant for the full timeframe, or accelerate/decelerate for at least some portion of the timeframe. The speed plan may then be used to control the speed of the vehicle, for instance, by actively adjusting braking and acceleration inputs, such as by applying the brakes or by increasing fuel or other energy provided to the engine, respectively. Passive deceleration may occur without braking by not supplying fuel or other energy to the engine. By computing over the predetermined period of time, the changes in acceleration or "jerk" experienced by a rider in the vehicle may be reduced.

To determine a speed plan, the vehicle's computing devices (e.g., processors 204 or 304) may first determine the route to a final destination or other location to which the vehicle will be driven. This location may be, for instance, a destination location selected by a rider or designated by an operator for cargo drop-off, food deliveries, etc. The speed plan may be based on the detailed map information defining the geometry of vehicle's expected environment as the vehicle maneuvers along the route.

In addition, the speed plan may be based on speed restrictions for the vehicle. For instance, as autonomous vehicles may have physical speed limits (only so much power can be generated by the power system 226 or 326) and/or legal speed limit requirements (e.g., the vehicle must be driven at, no faster than, or below 25 miles per hour, etc.). In one example, the speed plan may be based on a fastest possible speed for the vehicle at various locations along the route for the predetermined period. For instance, the initial speed plan for vehicle 402 may include maneuvering along a path 412 (the solid portion) of route 414 at 25 miles per hour (the posted legal speed requirement) for the next 5 seconds.

The speed plan may then be adjusted using a set of constraints. In other words, the fastest possible speed may be reduced in order to satisfy constraints of the set of constraints. The adjusted speed plan may thereafter be further adjusted based on a new set of constraints such that the process is iterative as the vehicle is driving. In this regard, a prior speed plan may be used to determine a current speed plan (or next speed plan as the case may be). For instance, once an initial speed plan is adjusted based on an initial set of constraints, the adjust speed plan may thereafter be adjusted on an updated set of constraints using updated predicted trajectories of other road users and environmental conditions. In addition, the prior speed plan may be adjusted periodically, for instance every 0.1 second (1/10 second) or more or less.

Because the process is iterative, satisfying the constraints may also include increasing the speed of the vehicle and legal speed limits. However, in many cases, the constraints may cause the vehicle to slow down. In one example, this may be a gradual reduction in speed using soft braking from 25 miles per hour to, e.g., 15 miles per hour over the course of 5 seconds. In contrast, hard braking may reduce the speed from 25 miles per hour to 2 miles per hour over the course of 3 seconds. The resulting adjusted speed plan may then be used by the vehicle's computing devices to control the speed of the vehicle 402.

In one example, a constraint of the constraint set may be based on the predicted trajectories of other objects detected in the vehicle's environment. For instance, when an object is detected, its speed, pose or orientation, type, and other characteristics may be used to generate a prediction of where that object is likely to travel for a brief period of time into the future. Where that predicted trajectory crosses and/or comes within a predetermined distance of the route at some particular point in time, the predicted trajectory may be used to generate a constraint to avoid a particular location at a particular point in time.

Thus, as the vehicle 402 is being maneuvered by its computing device(s), the vehicle's perception system may provide the computing devices with information about objects, including other road users, detected in the vehicle's surrounding environment. For instance, as noted above FIG. 4A depicts vehicle 402 approaching the intersection in order to make a left turn. The perception system may provide the computing device with information about truck 408 and car 410, such as their type, size, location, heading, velocity (absolute and/or relative to vehicle 402), etc.

The raw data and/or characteristics of objects received from the perception system may be used with contextual information as input to a behavior-time model to make a prediction about what other objects are going to do for the predetermined period of time. For instance, information such as the object's type, location, recent motion heading, acceleration, and velocity (e.g., over the last 1-20 seconds) may be combined with other information such as where the object is in the world using the detailed map information discussed above may be used as input to a behavior-time model. The contextual information may include the status of other objects in the environment, such as the states of traffic lights. In addition, features of other objects (such as vehicles) that might be crossing the objects' path may also be used as input to the model.

As noted above, the behavior-time model may provide a set of hypotheses each having an associated likelihood value. As an example, one or more of those hypotheses with the highest likelihoods (or those above a particular threshold such that a given hypothesis is considered to have a reasonable likelihood of occurrence) may be identified as an actual future trajectory or behavior prediction for the object over the predetermined period of time. For instance, the vehicle's computing devices may use a behavior-time model to generate a prediction of what an object will do during the next predetermined period of time (e.g., 2-10 seconds) or a time period corresponding to how long the vehicle is likely to interact with the object (e.g., until the object is well behind the autonomous vehicle).

Given this, the computing devices may predict that car 410 is going to continue move towards and pass through the intersection according to trajectory 416, while truck 408 is going to be stopped at the traffic light facing the eastbound lanes. Therefore, according to the predicted trajectory in this example, the route and trajectory are expected to intersect at point 418. As such, a constraint may be generated for vehicle 402 to avoid the point 418, at the point in time when car 410 (or any portion of that car) is expected to overlap with point 418. Thus, the initial speed plan (or prior speed plan) may be adjusted such that the vehicle 402 is able to satisfy the constraint as well as any other constraints within the constraint set. In other words, this point avoidance constraint may cause vehicle 402 to adjust the initial speed plan (or prior speed plan), for instance in order to cause vehicle 402 to slow down or alternatively maintain its speed in order to avoid point 418 during the point in time at which trajectory 416 of car 410 (or any portion of car 410) is expected to overlap with point 418.

As another example, a constraint may be that at the particular point in time when the predicted trajectory crosses or comes within a predetermined distance of the route, the vehicle must come no closer than some distance from the object. Thus, another constraint may be generated that prevents or limits vehicle 402 from entering an area that is proximate to point 418 corresponding to area 420 that is within a predetermined distance, such as 3 meters or more or less, of point 418, during the period of time during which the trajectory 416 of car 410 (or any portion of car 410) is expected to overlap with area 420. Again, the initial speed profile may be adjusted such that the vehicle 402 is able to satisfy this constraint as well as any other constraints within the set. In other words, this particular constraint may cause vehicle 402 to adjust its speed plan, for instance in order to cause vehicle 402 to slow down or alternatively maintain its speed in order to avoid area 420 during the period of time during which the trajectory 416 of car 410 (or any portion of car 410) is expected to overlap with area 420.

In a further example, where the vehicle 402 is to make a left turn at the intersection, a constraint may be generated that requires the vehicle 402 to yield to oncoming traffic or rather to not be in the lane of the oncoming traffic when that oncoming traffic is close to or crossing the route. In this regard, a constraint may be generated that limits vehicle 402 from entering area 420 until car 410 has completely cleared area 420, thereby yielding to car 410. Again, the speed profile may be adjusted to satisfy this constraint as well as any other constraints within the set. In other words, this constraint may cause the planner module of the processing system to generate a speed plan for vehicle 402 to slow down and yield to car 410.

Figure 4B:
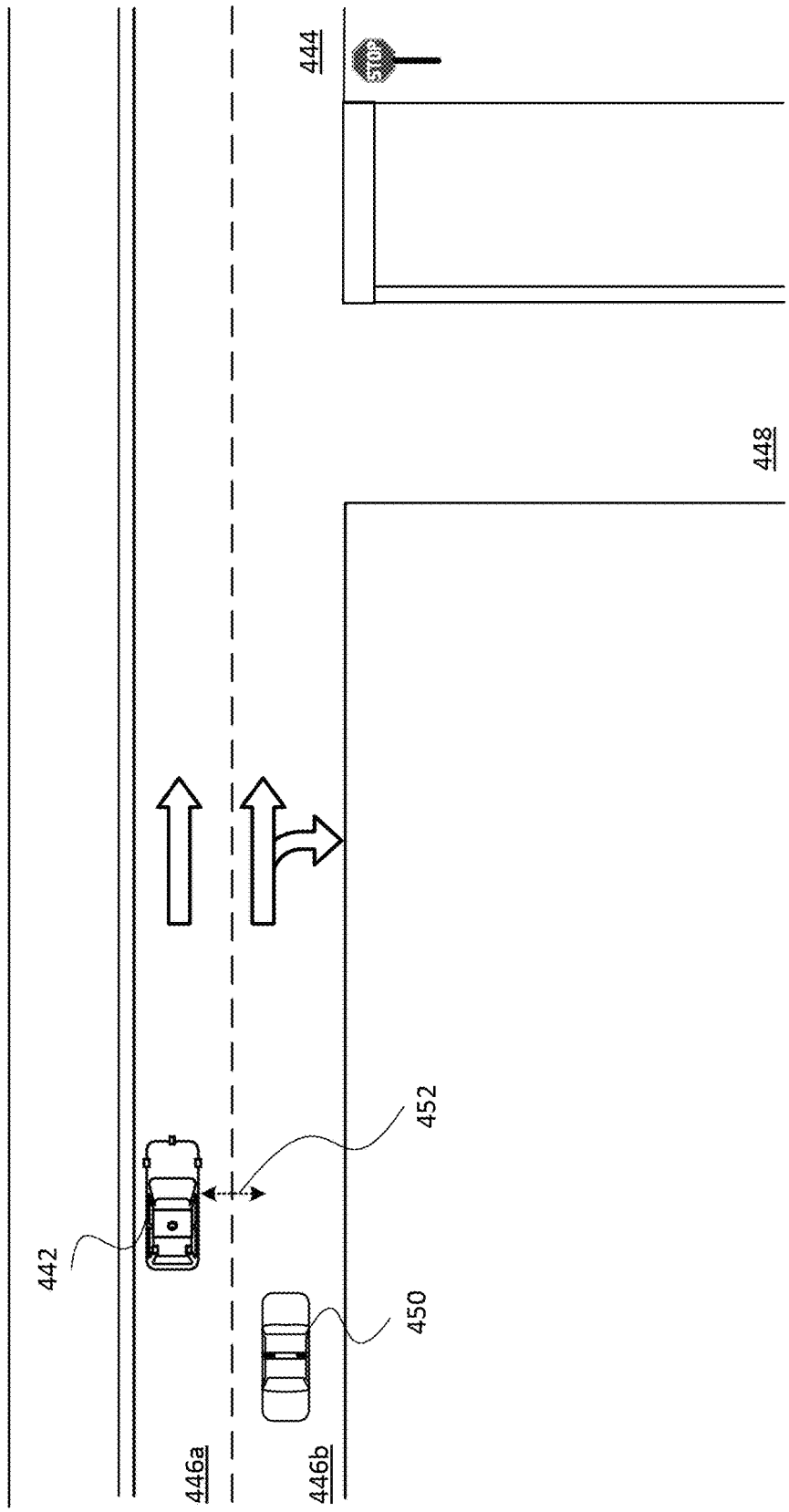

As yet another example, a constraint may be that the vehicle must pass the other object by a certain point on the route and if not, the vehicle must not pass the other object, for instance, prior to reaching an exit ramp or to making a turn. View 440 of FIG. 4B illustrates one scenario. For instance, vehicle 442 traveling eastbound on road segment 444 may need to change from a first lane 446a to a second lane 446b in order to reach an exit ramp or make a turn to the south. Here, lane 446a may be a straight-only lane, while lane 446b may permit vehicles to either travel straight or make a turn onto road segment 448 If another object such as vehicle 450 is expected to be located within the second lane 446b according to the predicted trajectory for that object, a constraint may be generated that the vehicle 442 must pass the vehicle 450 within a predetermined distance, such as 25 or 50 meters or more or less, where the turn needs to be made. The predetermined distance may be selected based upon the current speed of the vehicles 442 and 450.

In addition or alternatively, the proximity of the vehicle to other moving or potentially moving objects may be used to generate constraints. For example, the vehicle may be restricted from traveling too fast next to other objects such as other vehicles, bicyclists, motorcycles, or pedestrians, whether stopped (parked) or moving. If the other object is moving, such as where the vehicle is passing another object (such as other vehicles, bicyclists, motorcycles, or pedestrians) in an adjacent lane (or on the side of the lane in which the vehicle is currently traveling), a constraint may limit the speed of the vehicle to the speed of the other object plus some fixed amount or percentage of the speed. By way of example, FIG. 4B illustrates a lateral gap 452 between the vehicles 442 and 450 traveling in adjacent lanes. In some scenarios, the fixed amount could change depending on the speed of the other object and the lateral gap between the vehicle and the other object.

In yet other examples, constraints may be generated based on environmental conditions. For instance, a state of a traffic signal (e.g., traffic light, railroad signal, firehouse signal, etc.) may be used to generate a constraint for the vehicle. In this regard, a vehicle's location relative to a traffic signal which is red or yellow may be used to generate a constraint that the vehicle must stop prior to an intersection or stop line on the roadway. Again, this constraint may be used to adjust the initial speed plan (or prior speed plan). In some examples, it may be useful for the computing devices to "remember" environmental conditions, even where they do not persist into the next iteration. For instance, if a bicyclist makes a hand signal for a turn, even though the hand signal does not persist, it is important for the computing devices to consider this signal for generating constraints for future iterations. In this regard, such a signal may continue to be used to generate constraints for the next few seconds, for instance 2-6 seconds or more or less.

Still other constraints may be generated based on expected "comfort" of riders within the vehicle according to a discomfort value. For instance, constraints may include hard physical limits to fore/aft and lateral deceleration and acceleration values of the vehicle which correspond to mechanical operational limits of the vehicle (e.g., how hard the brakes or accelerator can be applied by the deceleration system or acceleration system at any given time). However, because these physical limits can be uncomfortable to the passengers (causing the jerk described above), constraints may include "soft limits" which correspond to fore/aft and lateral deceleration and/or acceleration limits for the vehicle which correlate to a more comfortable experience for a passenger. Because such soft limits constraints are based in comfort, they may be treated differently than other constraints in that the computing devices may be able to violate such soft limits constraints when necessary, such as to avoid a collision or other dangerous situation.

A further constraint may relate to the absolute minimum distance to another object to ensure the safety of passengers, such as a headway distance (from the front of the vehicle to the object), a tailing distance (from the rear of the vehicle to the object), or lateral gap (lateral distance between the vehicle and the object). Again, because these physical limits, while still considered safe for the passengers, can be uncomfortable to occupants, additional soft limit constraints may include greater distance limits than actually required for safety. In that regard, these soft limit constraints may also relate to the "comfort" of pedestrians, bicyclists, motorcyclists, and passengers of other vehicles as well as passengers of the vehicle setting the constraint, and may be violated when necessary, such as to avoid a collision or other dangerous situation.

Additional constraints may relate to how other objects are likely to respond to the speed or speed changes of the vehicle. For instance, additional soft limit constraints may correspond to fore/aft and lateral deceleration and/or acceleration limits for other objects (e.g., other road users). This may correlate to a more "comfortable" experience for those other objects (or passengers within a vehicle if the object is a vehicle). In this scenario, the speed plan of the vehicle would be constrained by a limit on the amount of deceleration and/or acceleration that the speed plan would require of other vehicles in order to satisfy all of the constraints of the set of constraints. Still further, such constraints may vary based upon whether the vehicle is within the field of view of that other object. In this regard, constraints corresponding to acceptable fore/aft and lateral deceleration and acceleration values of another object may be even lower where the vehicle is not within a field of view of that other object or, in other words, is not within some angle range such as 50 degrees (or more or less) from the heading of the other object. Again, because such soft limit constraints are based in comfort, they may be treated differently than other constraints in that the computing devices may be able to violate such soft limits constraints when necessary, such as to avoid a collision or other dangerous situation.

As noted above, the constraints may cause a planner module or other part of the computing devices to adjust the initial speed plan (or prior speed plan). Once all of the constraints are satisfied, the adjusted speed plan may be used by the computing devices to control the vehicle in any of the manners described above.

The planner module or another part of the on-board computer system implementing the speed solver may have sub-modules that plan the vehicle's path to a destination, make discreet speed-related decisions, and optimize the speed profile. For instance, a speed finder sub-module may solve a motion planning search problem that provides discrete decisions, e.g., pass or do not pass, go through a yellow light or stop, etc. This can involve evaluating how much reaction is assumed for other agents. And a speed optimizer sub-module may smooth out the speed profile to reduce jerk. This may take into account a discomfort framework for passengers of the vehicle and possibly for other road users (e.g., other vehicles, bicyclists, or pedestrians), which can tie all discomfort criteria to a common value. For example, a discomfort value may be determined based on a combination of factors relating to expected discomfort experienced by a passenger of the vehicle (whether or not the vehicle actually includes a passenger) and a passenger of another vehicle, pedestrian, or bicyclist, etc. The overall discomfort would then represent the maximum of individual costs (e.g., braking for the self-driving vehicle, other object actions, lateral acceleration, etc.

Permeable Constraints

As noted above, permeable speed constraints can address discontinuity issues created by binary situations by defining constraints as velocity-dependent obstacles in "distance v. time" space. While permeable speed constraints may not eliminate all unnecessary discontinuities in the planner module, they allow making more continuous decisions about whether to create a speed constraint.

There can be many different thresholds governing whether to create a speed constraint for a vehicle trajectory, such as a likelihood another road user follows a predicted trajectory, and a lateral gap. For instance, the likelihood could potentially include a likelihood of the road user existing in the first place. By way of example, when there is an occlusion or data received from the onboard sensors does not clearly show detection of a road user (e.g., an "agent"), then the likelihood of existence of such a road user might be less than 100%. According to one non-permeable scenario, if the likelihood is above some threshold and the lateral gap is below another threshold, a speed constraint is created. Otherwise, it is not created. This causes an unnecessary binary decision. If a speed constraint is not created, the vehicle would not react to the object at all. In contrast, if a speed constraint is created, the vehicle must stay outside of the constraint even if it requires braking hard. However, in many situations it does not make sense to go from not doing anything at all to reacting strongly to some object just because there was a small change, such as the object moving (or appearing to move) by 1 mm, or because its likelihood increased by some very small amount (e.g., 1%).

Conceptually, such a small change in the world cannot make the situation that much worse, and, therefore the vehicle's reaction should reflect that. Permeable speed constraints allow a continuous transition between these two extremes. By allowing the vehicle to drive through the constraint at a low speed (e.g., less than about 5-10 mph), the amount of necessary braking is reduced. Varying the vehicle's speed limit allows for a continuous transition between the two extremes. A relative speed limit close to zero makes the permeable constraint similar to a hard constraint, while a large relative speed limit makes the permeable constraint similar to not having any constraint.

Use cases for permeable speed constraints generally fall into three groups of situations. The first group involves driving through objects (e.g., soft trash, a dust cloud, etc.) at low speed. The second group involves slowly passing objects with a low lateral gap. And the third group involves slowing down to mitigate other risk factors that do not fall into the first two groups. The first two groups involve making planner decisions more continuous. For the first group, permeable constraints allow limiting speed to reduce the severity of a collision. For instance, this enables the system to handle the likelihood more continuously by allowing low-severity but not high-severity collisions for very-low-likelihood predictions. Thus, low-likelihood predictions can be taken into account without overreacting to them. For the second group, permeable constraints enable the vehicle to react more continuously as the lateral gap to an object shrinks. For the third group, permeable speed constraints can replace other solutions such as slow regions, providing the system flexibility during real-time driving operations.

A main feature of permeable speed constraints is the ability to limit the vehicle's speed. A secondary feature is limiting the duration the vehicle spends inside the constraint. Limiting the duration is particularly beneficial for situations involving the second group, and helps ensure a continuous transition to a hard constraint. Limiting speed alone isn't enough for a continuous transition because limiting the relative speed between the vehicle and a given object to 0 is not helpful because it does not allow the vehicle to move away from the object.

The speed and duration limits can vary with discomfort. The limits can also reach zero below a given discomfort level. This means that constraints can be hard below a certain discomfort level and permeable above it. The speed limits are only enforced inside a constraint.

Continuous Transition and Overlap Computation

One aspect of the technology ensures a continuous transition from a permeable speed constraint to a hard speed constraint as the lateral gap or the overall discomfort value shrinks, or the likelihood increases.

With regard to scenarios in group one, as the discomfort shrinks or the likelihood of the constraint increases, the permeable constraint becomes more like a hard constraint and the allowed speed difference shrinks. It is the limit on speed difference or relative speed between the vehicle and the object of interest that shrinks to zero, not the absolute speed of the vehicle. When the relative speed is zero, the vehicle can (in principle) not rear-end or be rear-ended by the other object such as another road user. This makes the constraint similar to a hard constraint and allows for a continuous transition. While this is true in principle, in practice the constraint boundary could potentially move faster than the object is moving along its trajectory, e.g., because the uncertainty grows, and the vehicle could still potentially rear-end the object even though it moves at the same speed.

With regard to scenarios in group two, for constraints that are permeable because their lateral gap is larger than some threshold, the allowed speed difference also shrinks as the lateral gap or discomfort shrink, but it never shrinks all the way to 0. That is because this would not result in a continuous transition from a permeable to a hard constraint. Instead, as the lateral gap shrinks the relative speed limit only shrinks until it reaches some threshold greater than 0. In this case, if the lateral gap shrinks further, the constraint starts limiting the duration the vehicle can be inside the constraint. Thus, the first part of such a constraint is permeable and the second part is hard. As the lateral gap shrinks, the time at which the constraint switches from permeable to hard shrinks until eventually the whole constraint becomes a hard constraint.

To explain the benefit of a duration-limited constraint consider the following example. Assume the vehicle is moving at the same speed as a neighboring car, for instance as illustrated in FIG. 4B. Assume the car comes closer with every planner iteration but is not predicted to come closer in the future. Without a permeable speed constraint, the neighboring car may be ignored by the system as long as its lateral gap is above a required threshold (e.g., 1.2 m, or more or less). In that situation, as soon as the neighboring car would come closer than the threshold, a speed constraint would be created that the vehicle could not satisfy, potentially requiring the vehicle to come to a full stop. This would be an extremely non-continuous transition, where a tiny change in the position of the neighboring car (e.g., a lateral gap of 1.3 m v. a lateral gap of 1.2 m) could result in a huge change in the autonomous vehicle's reaction (immediate stopping). By using a permeable speed constraint that enforces a zero relative speed as it transitions to a hard constraint, the operational result would not be any different, and could potentially be worse. For instance, as the permeable constraint would become harder, the relative speed would be enforced to be close to zero, which would force the vehicle to stay next to the neighboring car and keep the vehicle from speeding up or slowing down to get out of the narrow lateral gap area.

In contrast, when using a duration-limited constraint, the transition is more continuous. At first, as the lateral gap shrinks, the relative speed between the vehicle and the neighboring car would be limited because moving past the nearby car could create safety concerns or otherwise raise the discomfort for passengers in the vehicles or the nearby car. When the constraint becomes duration-limited, the vehicle is "pushed away" from the neighboring car because the vehicle has to be completely outside of the constraint at some point in the future. Since the permeable part of the constraint does not enforce the relative speed to be 0, the vehicle can slow down or speed up as needed. According to one aspect, the closer the neighboring car, the sooner the vehicle would have to be completely outside of the constraint, and the harsher the vehicle's reaction would be.

Overlaps

It is possible to create speed constraints only for ranges on the vehicle's trajectory where an agent state overlaps, i.e., has a lateral gap less than a required threshold. In particular, each predicted trajectory for an agent (e.g., other road user) includes a list of agent states. Each agent state represents the position, speed, etc. of the agent at one point in time. Here, any parts of the agent state that are above the lateral gap threshold could be completely ignored. Given a fixed required lateral gap, the system could compute the overlap range on the vehicle's trajectory for that specific required lateral gap. For permeable speed constraint scenarios in the first group involving driving through objects at low speed, the system may still only consider the trajectory range with a lateral gap less than the required one.

However, for scenarios in group two, such as slowly passing objects with a low lateral gap, according to one aspect the system also creates a permeable constraint for agent states that do not overlap with the vehicle's trajectory, in other words those states that have a lateral gap above the threshold. For these constraints, the system needs to know where on the vehicle trajectory it needs to enforce which speed limit. The speed limit is a function of the lateral gap. But each part of the agent state has a different lateral gap.

A first option here would be to use single point with a minimum lateral gap. In particular, for agent states that do not overlap with the vehicle trajectory, the system creates a permeable constraint state at a single point where the lateral gap reaches its minimum. This minimum lateral gap is used to decide the speed limit. This is an optimistic approach that effectively ignores most of the agent state and only places a constraint for the closest point. But the goal here is that slowing down for the closest point will result in the vehicle being close to the desired speed for other parts of the agent state. This approach does not require any additional overlap computation because this information is already computed. This option also does result in a continuous transition from a permeable to a hard constraint as the agent gets closer to the vehicle trajectory. During real world driving, for objects parallel to the vehicle trajectory, the closest point can jump around a lot. And for large objects (or regions encompassing one or more objects) such as dynamic blockages this approach might ignore the majority of the object. According to one aspect, a dynamic blockage is an area in the map that the vehicle is not permitted to drive in, e.g., because of construction or some other temporal condition. For instance, there may be a region in which one or more construction vehicles are operating.

A second option is to use a projected range with a maximum lateral gap. Here, for both agent states that overlap and do not overlap, the system can create a permeable constraint state for the whole projected range of the agent state and use the maximum lateral gap of the agent state. However, in this case the vehicle may not slow down enough for parts of an agent state that fall within some minimum distance. This approach may also not result in a continuous transition from a permeable to a hard constraint as the agent gets closer to the vehicle trajectory. This approach could also require changes to the overlap computation to report the maximum lateral gap.

A third option is to compute overlaps for multiple required lateral gaps. Here, the system may compute multiple overlaps for different amounts of required lateral gap. The smallest of the required lateral gaps would be the one for a hard constraint. For each computed overlap for a specific required lateral gap, the system can use the speed limit corresponding to that lateral gap. This results in an optimistic speed limit because parts of the overlap might actually have a lower lateral gap. But the system can make this approach less optimistic, more accurate and more continuous by increasing the number of overlaps computed for different required lateral gaps. This approach requires computing multiple overlaps, which can affect the number of computations needed. For instance, in addition to the strict overlaps and the overlaps including the standard required lateral gap, the system may need to compute approximately 1 to 10 additional overlaps, depending on how accurate slowdown is desired to be and how continuous of a transition is desired.

For regular constraints, a pass decision means that the vehicle is always ahead of the constraint, in other words the vehicle is passing every constraint state. Similarly, when the vehicle is yielding it is always behind the constraint, in other words the vehicle is yielding to every constraint state. With permeable speed constraints, this is no longer the case. For instance, the vehicle might be passing some constraint states and yielding to others and drive through some constraint states. However, the system will still have a pass/yield decision for the constraint as a whole. That is necessary because the system needs to determine whether to use the pass or yield reaction. The pass/yield decision will be based on whether the vehicle passes or yields to the first overlapping state. If the vehicle does not do either and drives through the first state, then a yield decision can be employed for the whole constraint.

Duration Limit

According to one aspect of the technology, the duration of time that the vehicle spends next to another road user (agent) with low lateral gap is limited to reduce the risk of collision in case the other road user cuts into the vehicle's lane. Limiting the duration instead of requiring the vehicle to avoid the constraint completely results in a more moderate reaction that trades off the risk of a potential collision with the risk of braking hard.

In a first option, the duration is limited directly. Here, the limit is only a function of discomfort and would not depend on the current vehicle speed, length of a region associated with the nearby road user, or how long the vehicle has already been inside the object. For instance, the discomfort framework of the speed solver would automatically trade-off the amount of braking with the time spent inside of the constraint. This approach is very simple to implement and would work in combination with risk mitigation. However, the absolute time at which the constraint switches from permeable to hard keeps moving since it is always a fixed duration from now (the present time). This might potentially result in the vehicle never actually moving out of the constraint.

In a second option, the duration the vehicle can spend inside the constraint is limited. But instead of choosing the duration directly as a function of discomfort, the system evaluates the acceleration limit and derives the duration limit based on how long it takes the vehicle to move out of the constraint at that acceleration limit. Here, the system may allow both passing and yielding, but allowing passing only if it results in a shorter duration inside the constraint. In this scenario, the duration limit may be recomputed from the acceleration limit at every discomfort level using the buffers and agent reaction of that discomfort level. Choosing the acceleration limit and deriving the duration from it has the advantage that the relative duration limit decreases over time and stays the same in absolute terms as the vehicle moves out of the constraint. In one example, the system could shrink the allowed acceleration at higher discomforts to cause a larger duration. Or it could directly add some additional time at higher discomforts.

Speed Limits

Figure 5B:
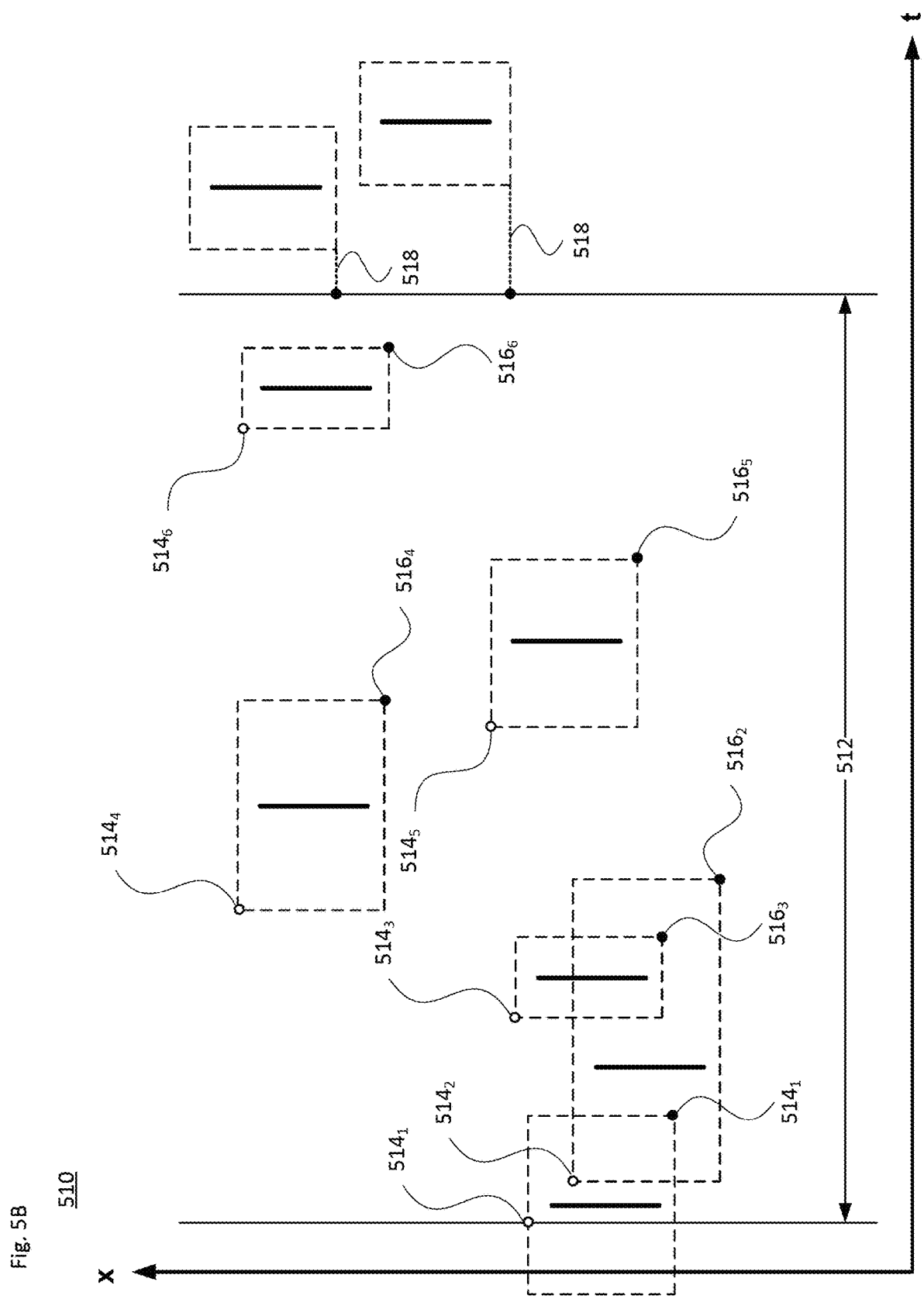
Figure 5C:
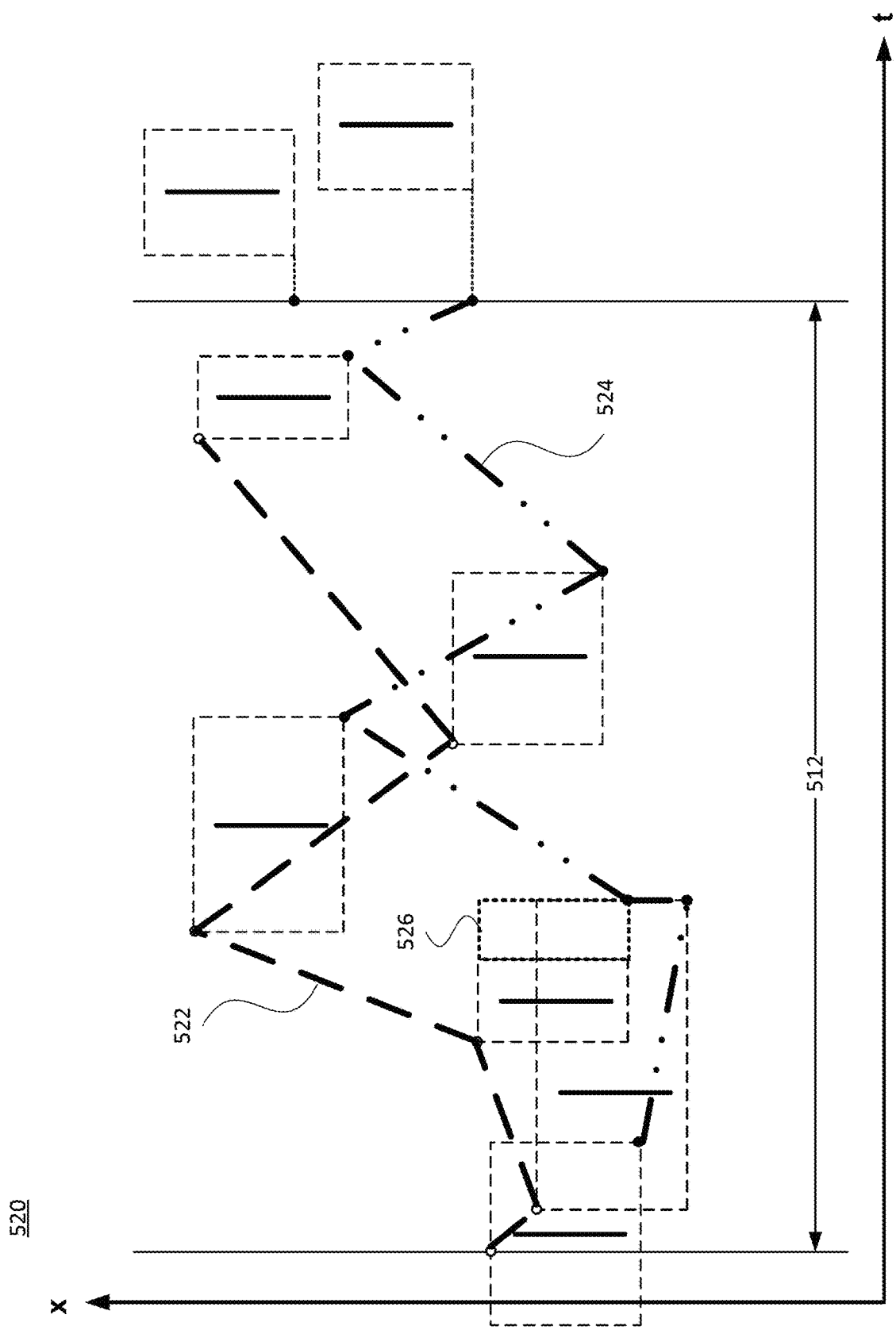

Enforcement of regular, non-permeable, speed constraints can be understood with reference to FIGS. 5A-C. In the example view 500 of FIG. 5A plotted as time v. distance, there are 8 agent states or speed constraint states to consider. These constraints overlap with the vehicle's trajectory as shown by thick vertical lines 502 (e.g., $502_1 \ldots 502_8$ in this example). The system adds buffers around these states both in time (t) and distance (x), resulting in dashed boxes 504 (e.g., $504_1 \ldots 504_8$ in this example). The buffers for individual states might differ in time and/or distance. For instance, there could be no time buffer, in which case the box would just be a vertical line 502. Boxes might or might not overlap. For instance, box $504_2$ overlaps with boxes $504_1$ and $504_3$.

For regular, non-permeable speed constraints there is either a pass or yield decision. When there is a pass decision, the vehicle speed profile must stay above the boxes. And when there is a yield decision, the vehicle speed profile must stay below the boxes. To enforce this, as illustrated by view 510 of FIG. 5B and view 520 of FIG. 5C, the system need only need to check within a selected timeframe 512 that corners 514 (here, $514_1 \ldots 514_6$) are below the profile for passing, or the corners 516 (here, $516_1 \ldots 516_6$) are above the profile for yielding. This is because the vehicle speed profile cannot move backwards. In one implementation, the system does not store the boxes. Rather, it would only store the points 514 and 516 independently from each other. Dashed lines 518 show that constraints buffered by boxes $504_7$ and $504_8$ are outside of the selected timeframe 512.

View 520 of FIG. 5C illustrates a dashed line 522 indicating a boundary for the passing profile. As noted above, for a pass decision in this non-permeable constraint example, the vehicle speed profile would need to stay above dashed line 522. Dash-dot line 524 indicates a boundary for the yielding profile. Here, the vehicle speed profile would need to stay below dash-dot line 524. As shown an additional box 526 extends from box $504_3$ to account for point $516_2$ of box $504_2$ in the yielding profile boundary (524).

Even though the boxes might not overlap, there is no risk that the speed profile drives through a gap between them without the system detecting that there would be a collision. This is because the whole constraint has only one pass/yield decision and the system would enforce the speed profile to be either above all boxes or below all boxes. To evaluate whether the speed profile satisfies a constraint point 514 or 516, the system evaluates the position of the speed profile at the time of the constraint point and compares it to the position of the constraint point. However, as noted above, due to the binary or discontinuous nature of certain constraints, this may not be an optimal approach.

Speed Limit Constraint Considerations

Figure 6B:
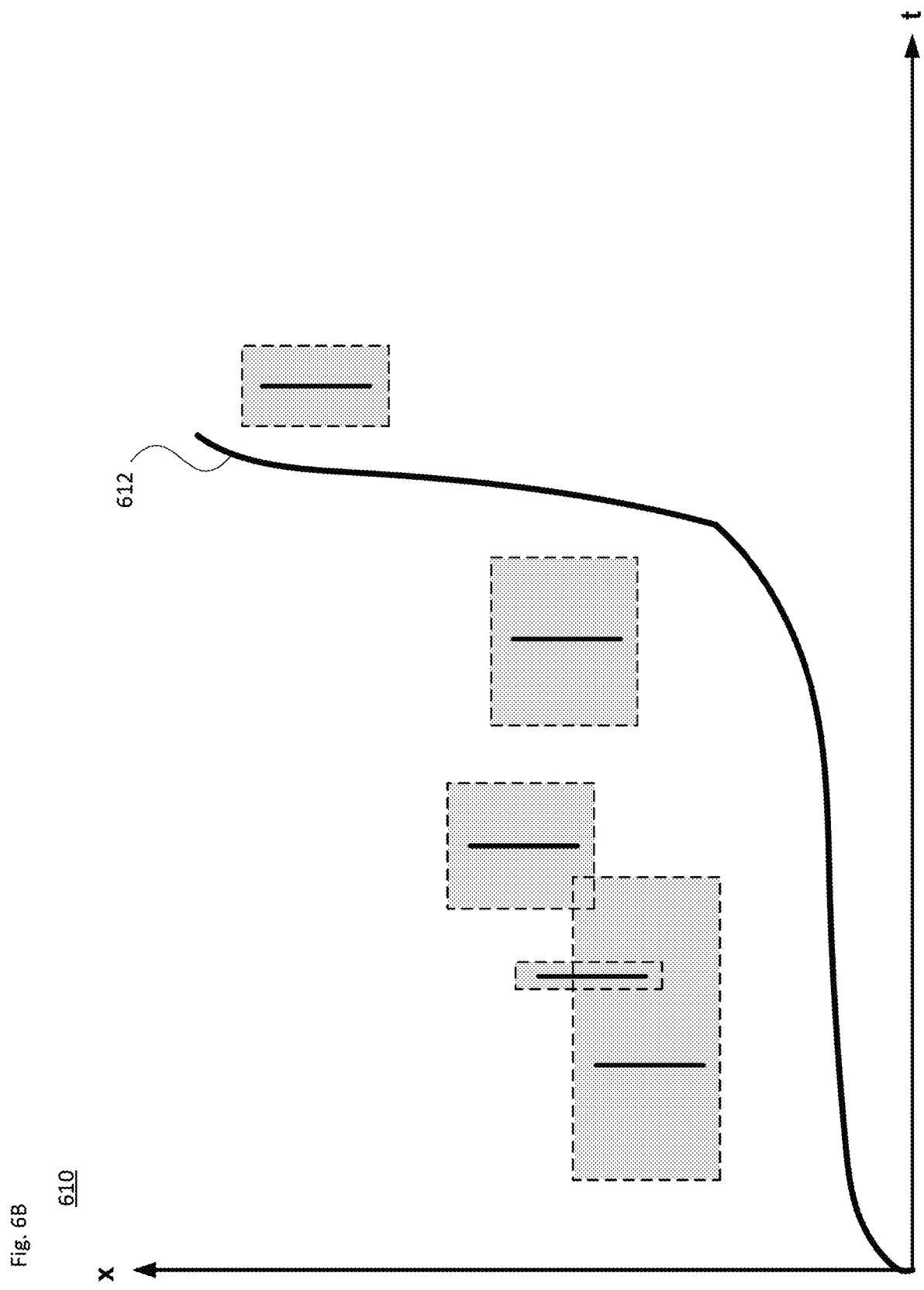

With permeable speed constraints, the vehicle is allowed to drive through the constraint below a certain speed limit. According to one aspect of the technology, the system enforces the speed limit whenever the speed profile is inside a box representing a constraint state. View 600 of FIG. 6A illustrates an example in which the time/position combinations at which the system enforces the speed limit in the shaded regions 602.

However, if this is all that is done, then the vehicle speed profile could slip through in between two constraint states without the speed limit ever being enforced. An example of this is shown in view 610 of FIG. 6B, with line 612 indicating a path to slip between constraints. Thus, because the vehicle could drive through some constraint states, the system may be unable to enforce the same decision on all constraint states. For instance, the vehicle might yield to some states, then drive though some states and pass later states.

Figure 7A:
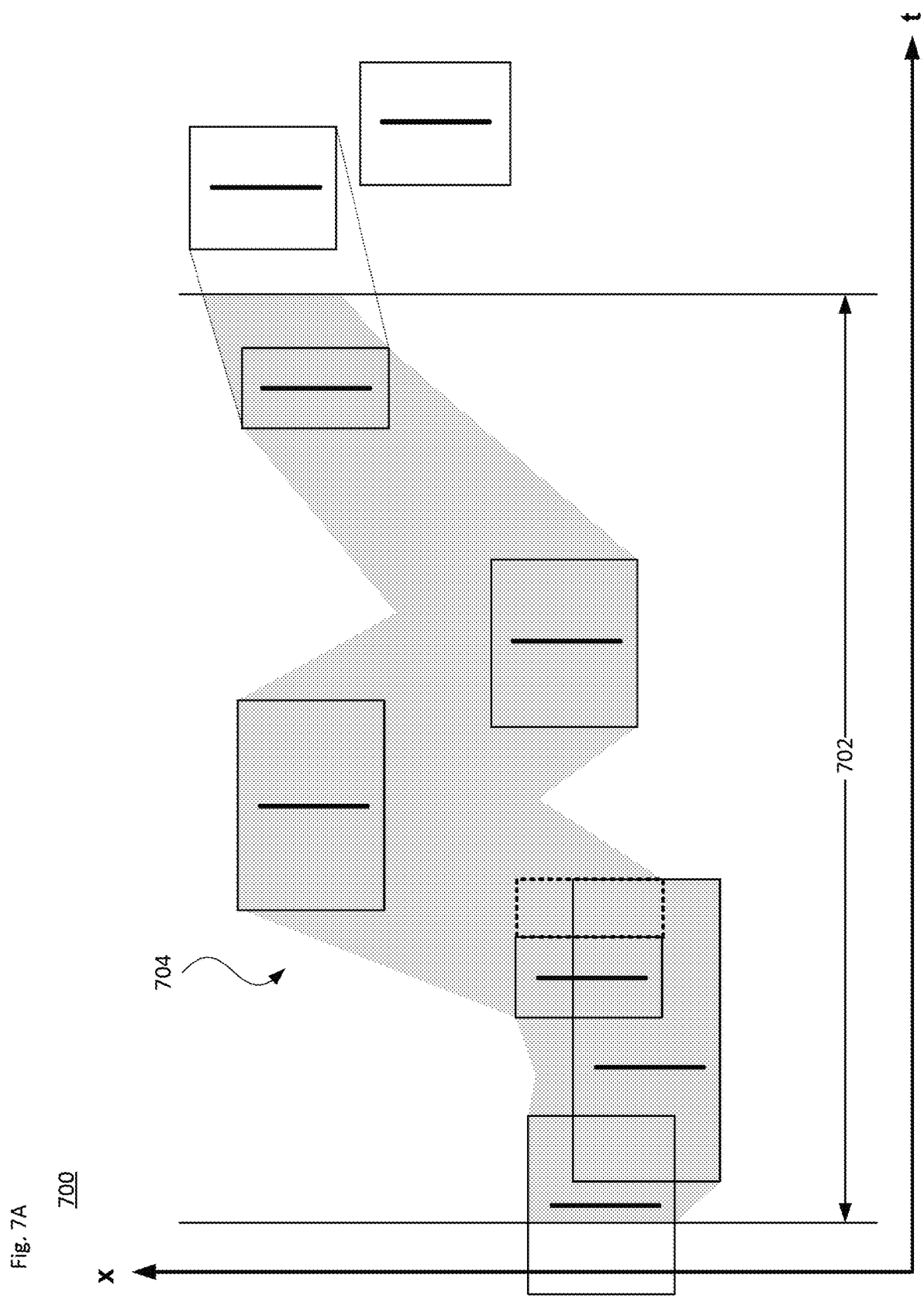

To keep the vehicle speed profile from slipping between two constraint states, the system also limits the speed in the area swept when one box continuously transitions into the next box. An example of this is shown in FIG. 7A, showing a timeframe 702 and a contiguous shaded area 704 representing the area swept by interpolation across the boxes of constraints. In particular, this includes interpolating between two consecutive boxes, which are ordered based on their nominal time shown as the thick vertical lines within those boxes. Based on this, at every point in time the full extent of the constraint can be known for the given timeframe. This encompasses the vehicle's planned trajectory and other agents' predicted positions during the timeframe.

Here, the system only needs to consider the part of the constraint that is inside the speed profile time range (e.g., within timeframe 702). This is in contrast to the general speed constraint approach, where the profile needs to yield to everything beyond the time range and pass everything before the time range. Since the system may not know where and at what speed the vehicle is going to drive through a state past the time horizon (e.g., past the timeframe 702, it may not be possible to determine what speed or position the vehicle needs to be in at the end of the time horizon to satisfy it. Thus, according to one approach, the system ignores parts of the constraint outside of the time horizon. Regardless, the first state past the time horizon is used for the interpolation up to the time horizon. View 710 of FIG. 7B illustrates boundaries 712 (dotted line) and 714 (dashed line) that would correspond to a non-permeable speed constraint, which contrasts with the swept volume 704.

Figure 8C:
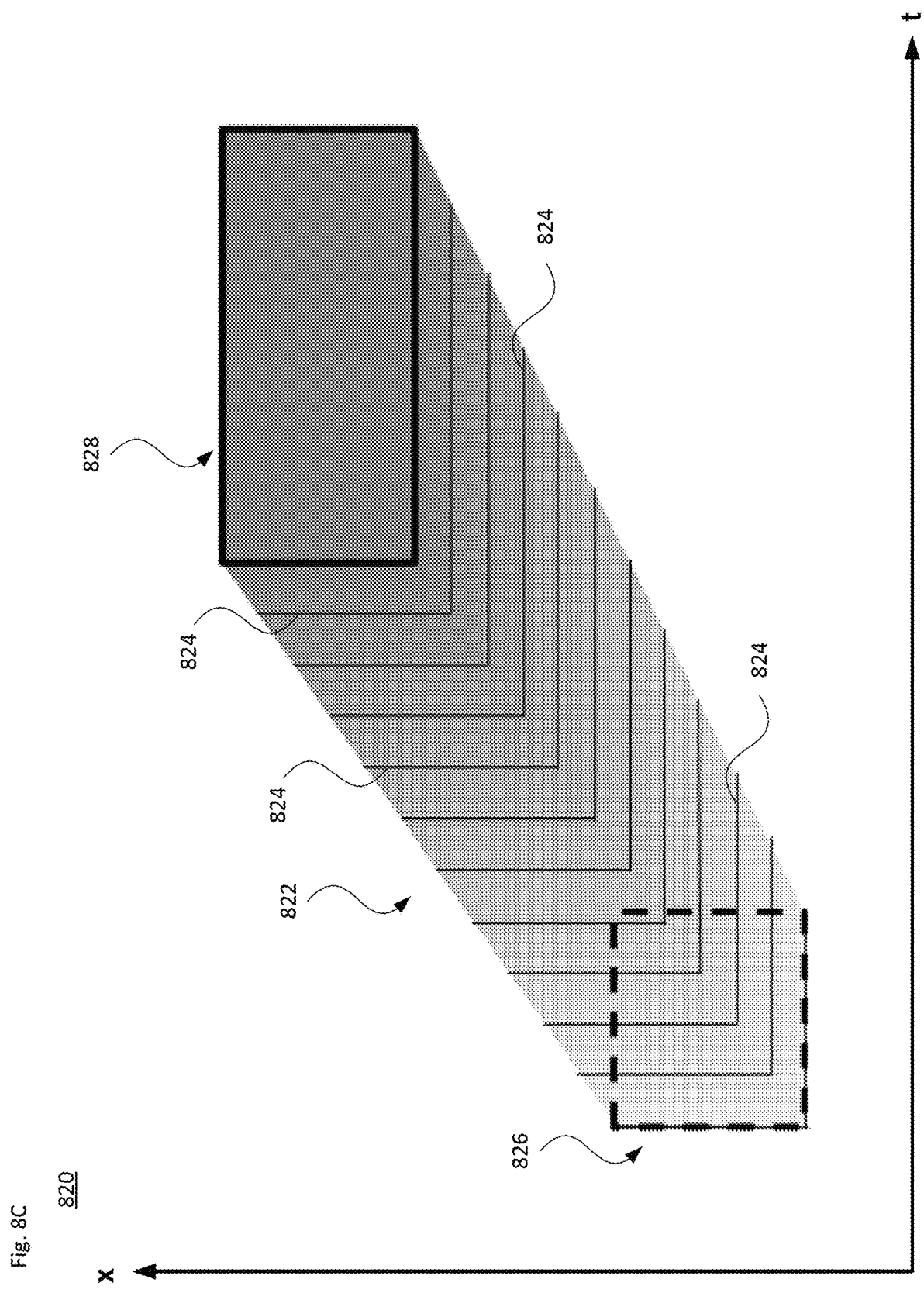

Interpolation between two states may be understood with reference to FIGS. 8A-8E. View 800 of FIG. 8A illustrates area 802 swept by linearly interpolating between two constraint states $804_1$ and $804_2$. As shown in view 810 of FIG. 8B via the thick solid vertical lines 812, the system creates samples at single points in time that match the position range (region) of the swept area at that point in time as shown below. Each sample represents a constraint at one point in time. Samples are typically created both evenly spaced at every time step (as shown by the dashed vertical lines 814) as well as at the time boundaries 816 of all constraint states (i.e., at the vertical edges of the boxes representing constraint states 804). The latter helps reduce discretization error.

Here, the system not only interpolates the region of the constraint states but also other properties of interest, such as the vehicles speed limit, which is associated with each constraint state. View 820 of FIG. 8C represents the interpolated value of the vehicle speed limit a color gradient 822. Here, the solid, L-shaped lines 824 represent isolines, along which the vehicle speed limit has the same value. The dashed lower box 826 is associated with a looser speed limit, while solid upper box 828 is associated with a stricter speed limit.

Figure 8D:
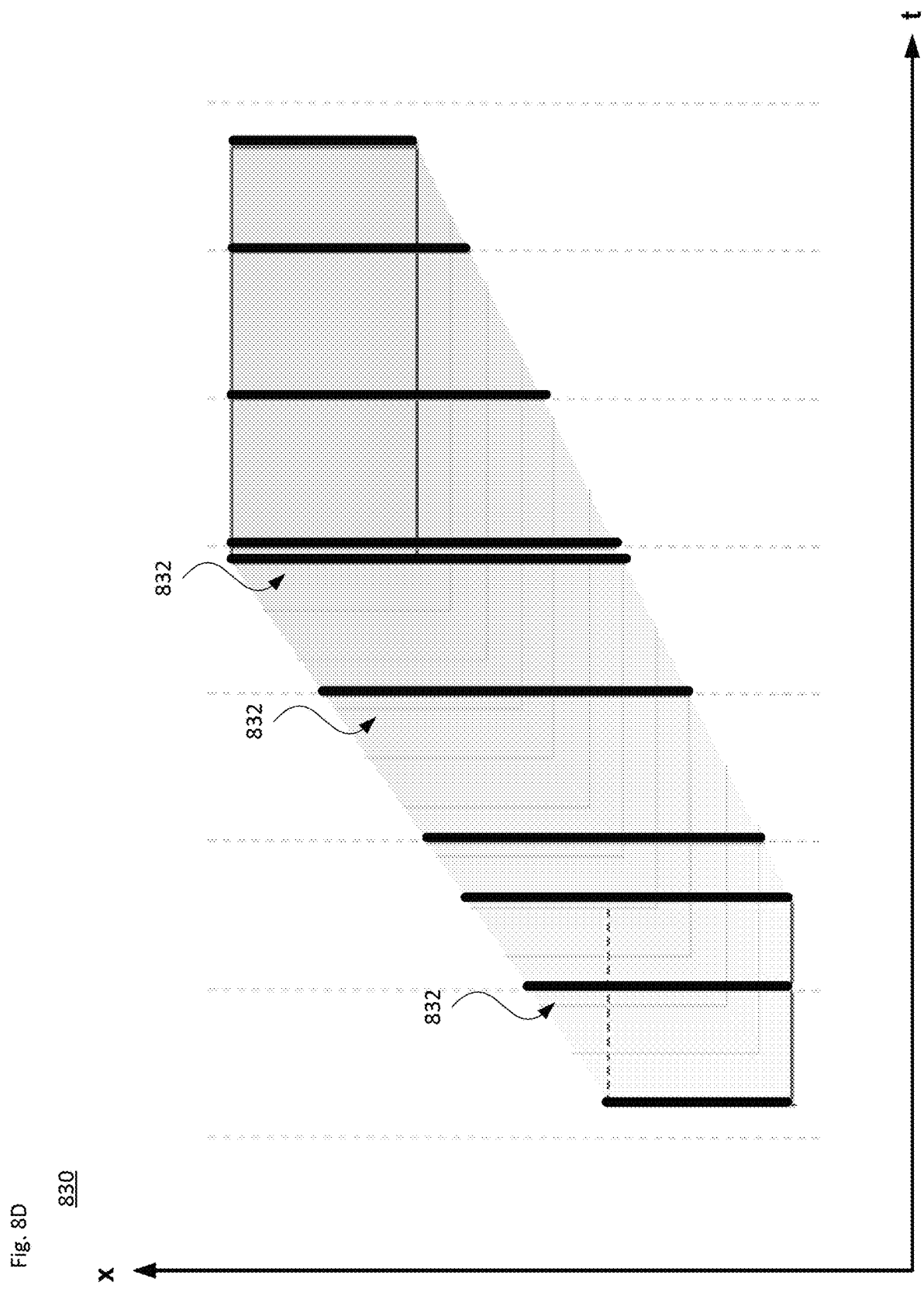
Figure 8F:
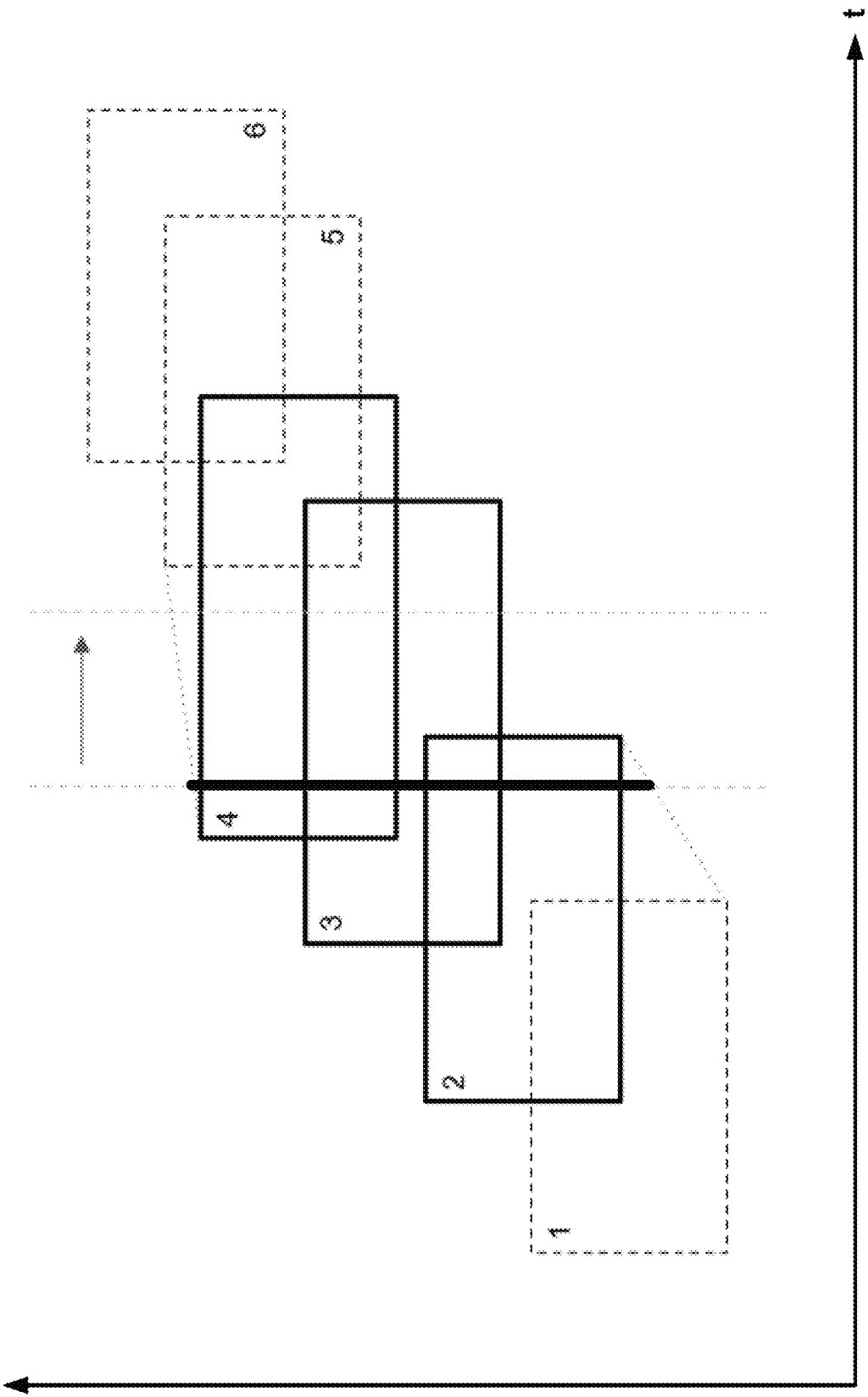
Figure 8G:
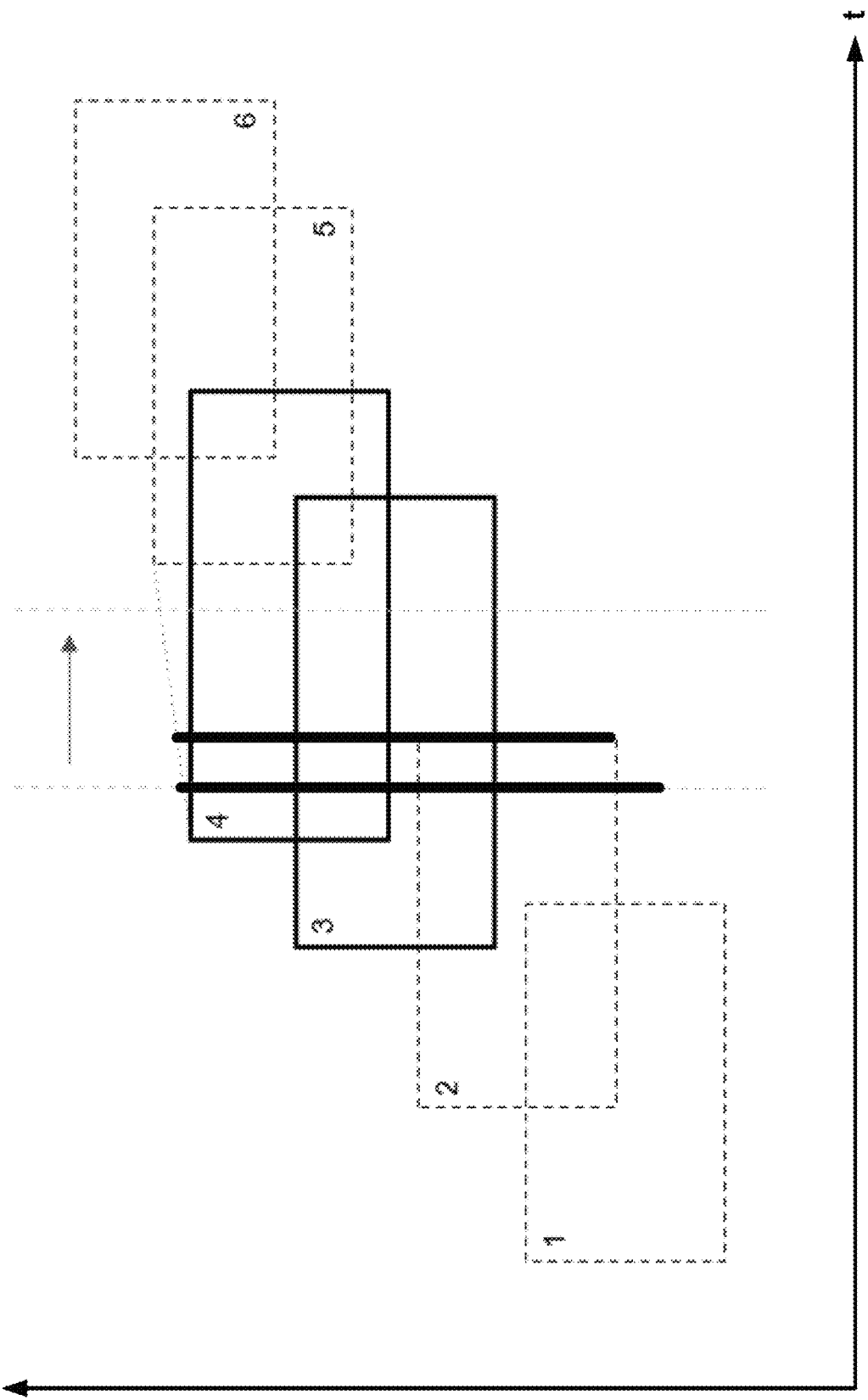
Figure 8H:
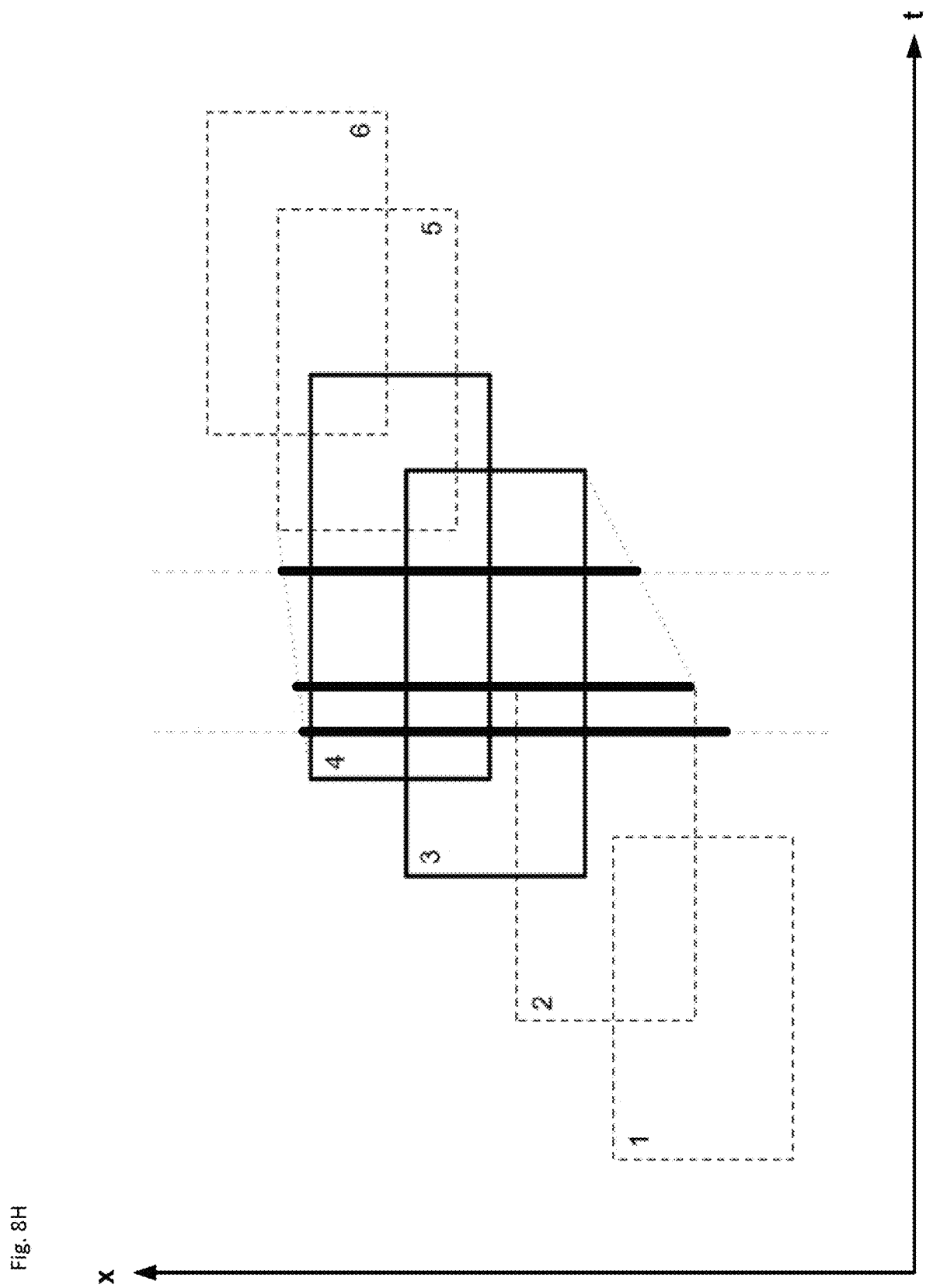
Figure 8J:
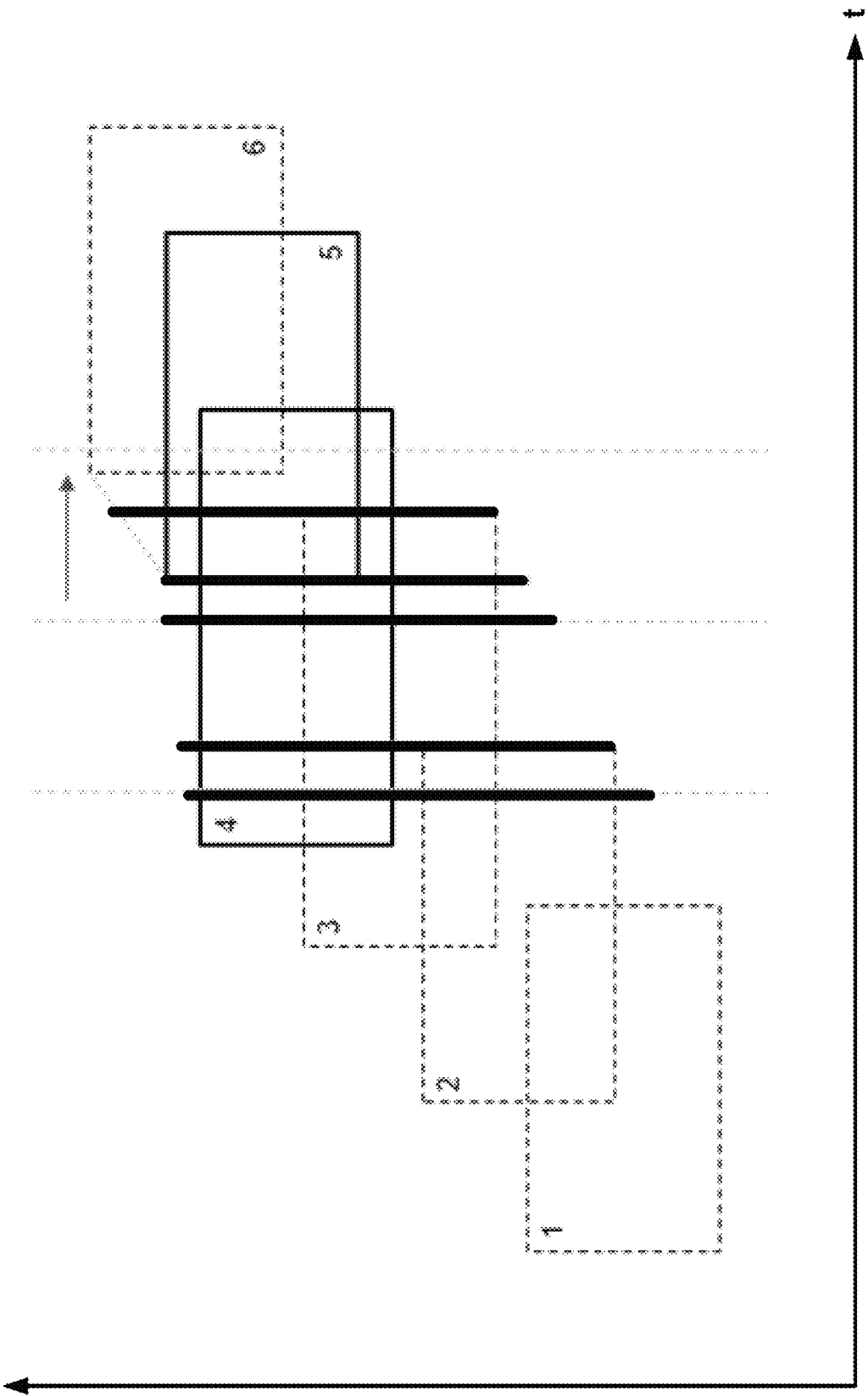
Figure 8K:
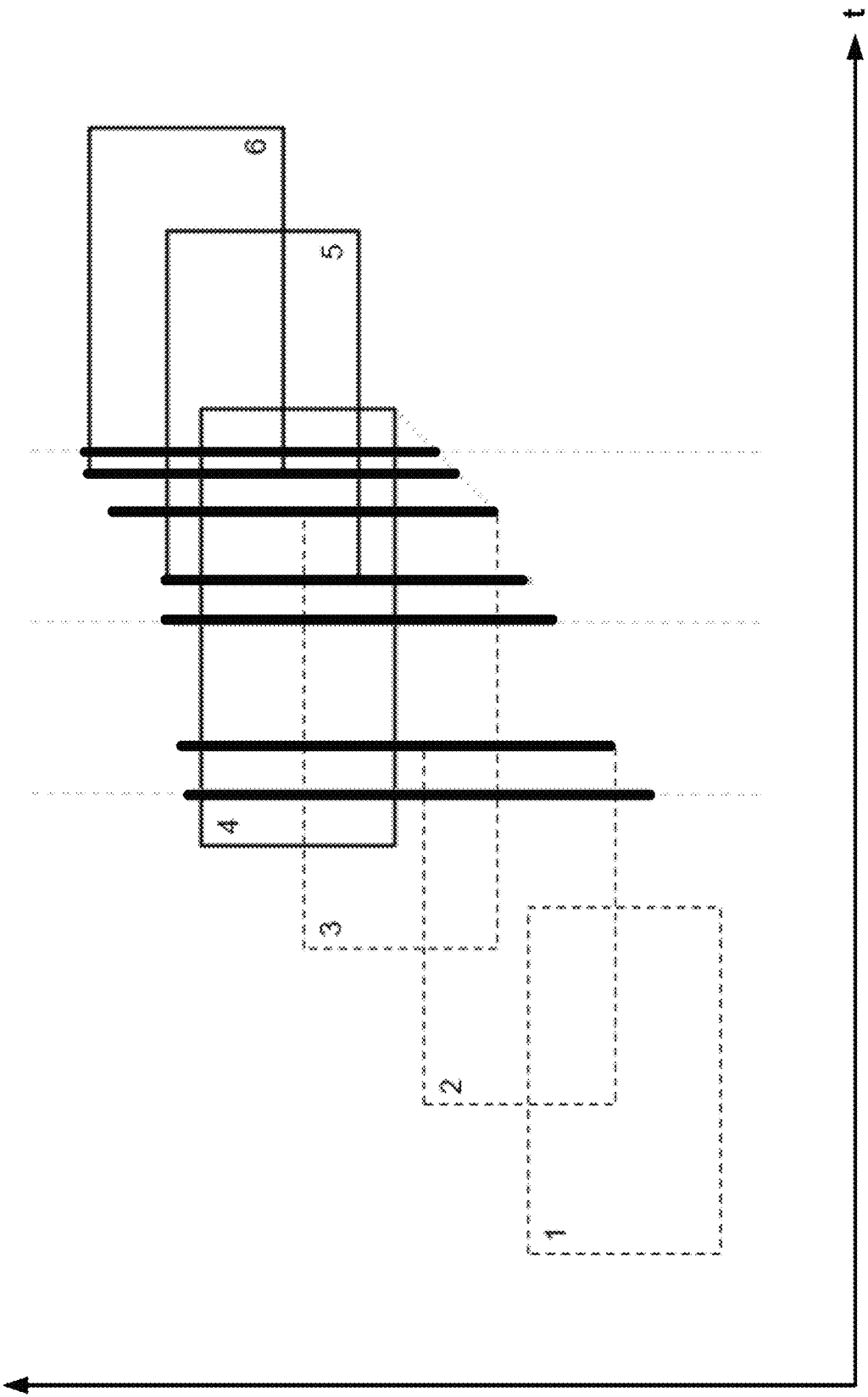

At each point in time the vehicle speed limit is a function of position. However, to keep things simple, especially when combining multiple such interpolations into a single sample, the system may only consider the most restrictive vehicle speed limit at the time. View 830 of FIG. 8D illustrates the samples at which the speed constraint is enforced, as shown by the thick black vertical lines 832 at various points in time, including several interpolated points.

At every point in time, there can be multiple active states and up to 2 interpolations between states to be considered. View 840 of FIG. 8E shows the 3 states that are active at one point (boxes 2, 3 and 4). Here, the system need only consider interpolations at the boundary of the range of active states, in other words interpolating between the first active state and the state before it (e.g., boxes 1 and 2) and between the last active state and the state after it (e.g., boxes 4 and 5). The resulting region of the sample, incorporating all active samples and the 2 interpolations, is shown at vertical line 842. Subsequent iterations are illustrated in FIGS. 8F-8K, which show how vertical lines are added for additional points in time and how these lines may change with additional interpolations.

Even though the system interpolates between constraint states to obtain a connected constraint region in which the speed limit is enforced, there is still a chance the vehicle speed profile slips through the constraint without the speed limit being enforced. This is because the constraint is sampled and only enforcing the speed limit at discrete points in time. It is therefore possible that the vehicle travels far enough within one time step that it yields to one sample and passes the next without ever being inside a sample. To address this potential situation, whenever the system checks for conflict with a sample, it can also look at the previous sample. For each sample, the vehicle position can either be behind the sample's region (yielding), be in front of it (passing), or be inside of it. Whenever the vehicle's position is inside a sample's region, the system can enforce the sample's speed limit. If the vehicle position switches from yielding to one sample to passing the next sample or the other way around, the vehicle has slipped through the constraint. In that case, the system can still enforce the speed limit of the next sample even if the vehicle position is not inside that sample's region.

Enforcing the Constraint Decision

According to one aspect of the technology, when using permeable speed constraints, the system no longer stays behind all constraint states (yielding) or ahead of all of them (passing). Here, the system would no longer use the constraint decision to determine whether to yield or pass to a constraint state. This is because the system can yield to some constraint states and pass others and drive through some constraint states in between. Nonetheless, the system will still have a decision for the constraint as a whole. This is necessary because there may be different constraint reactions for passing and yielding and the system needs to determine which one to apply.

The constraint decision may be determined based on whether the vehicle passes or yields to the first constraint sample. A pass (or yield) for a non-permeable constraint implies the speed profile is above all the left top (or below all the bottom right for yielding) corners of all the constraint states. For permeable constraints to be driven thru, the constraints may be lumped into the yield category. There is also the possibility of the vehicle driving through the first sample. The latter case may be selected to also be yielding to the constraint. Here, the system may only use the pass reaction for the constraint if the vehicle is properly passing the constraint, because the pass reaction is typically the one that includes a stronger reaction from the agent.

Figure 9A:
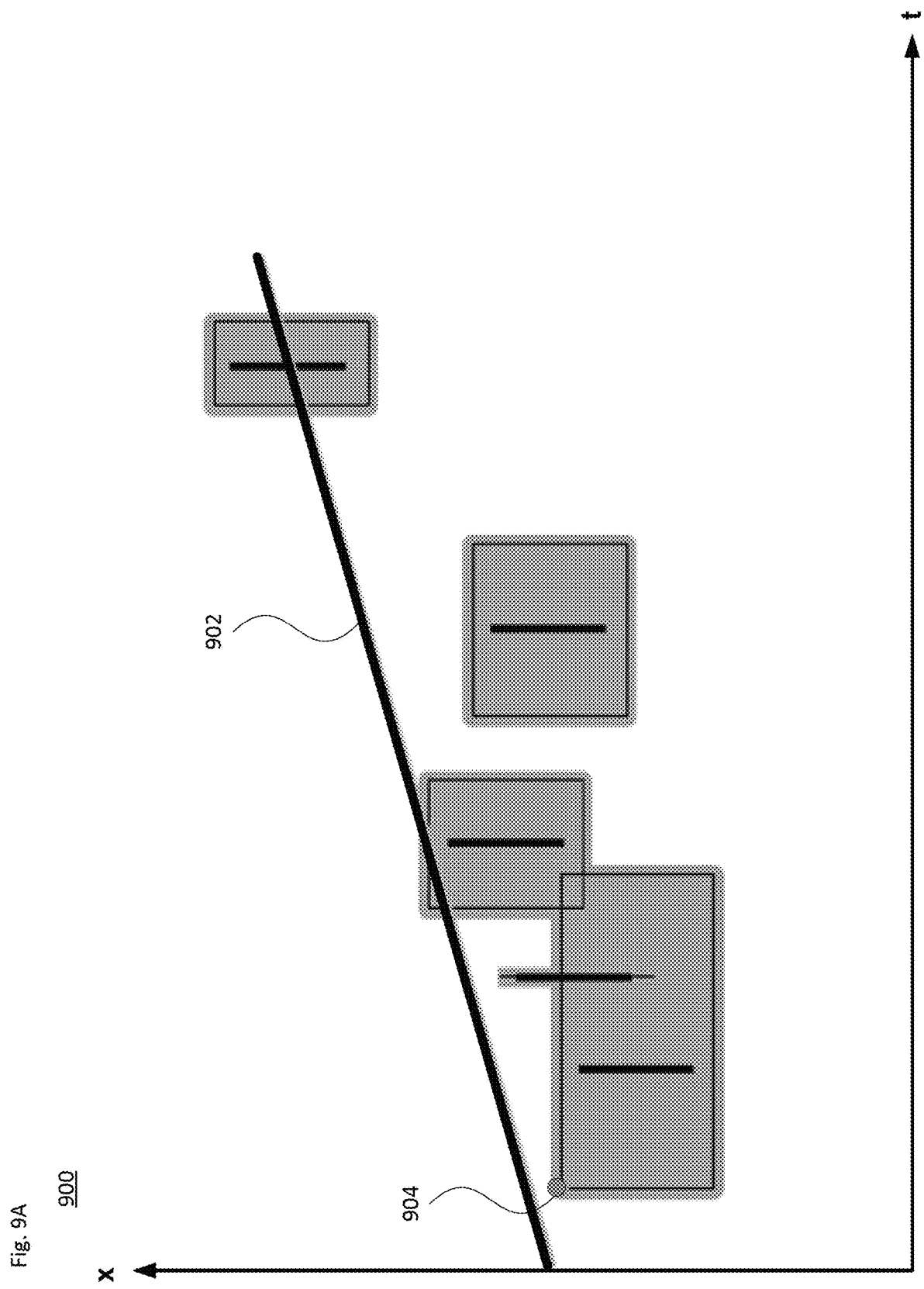
Figure 9C:
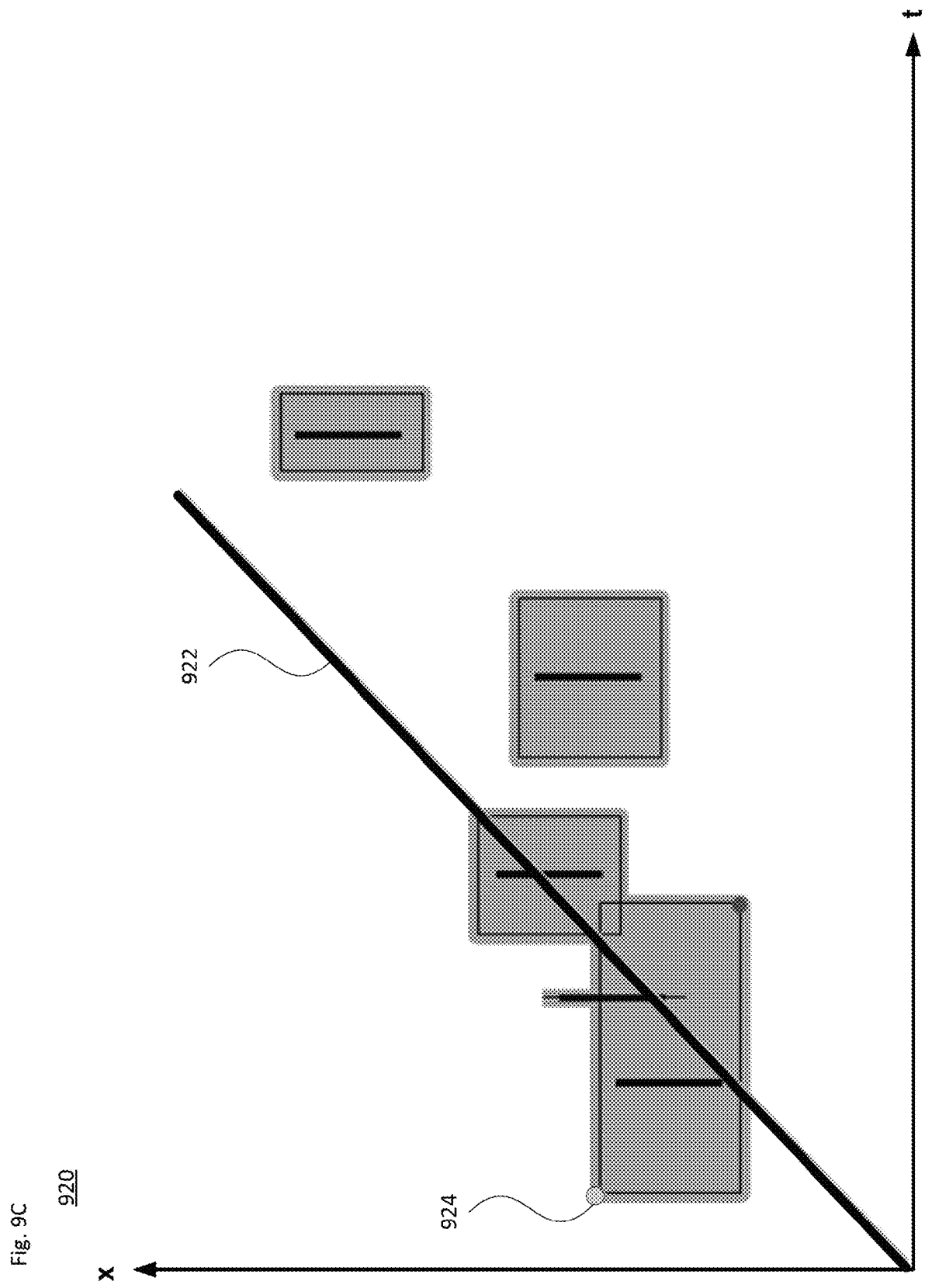

View 900 of FIG. 9A represents a pass decision for the constraint. The line 902 indicates the vehicle's speed profile, and the dot 904 is the top left corner of the first state of interest. Here, in order to pass all of the constraints, the speed profile would be adjusted to be above the rightmost constraint. Similarly views 910, 920 and 930 of FIGS. 9B, 9C and 9D, respectively, represent scenarios each having a yield decision for the constraint. As shown, each view has a respective speed profile 912, 922 and 932, and a dot 914, 924 and 934 at the top left corner of the first state of interest. All of these illustrate different ways the vehicle might drive through a constraint to indicate which situations are considered passing vs. yielding. In these scenarios, if the speed profile is above the dot as in FIG. 9A, the vehicle is considered to be passing the constraint. Otherwise, as shown in FIGS. 9B-9D, the vehicle is considered to be yielding to the constraint.

If a constraint has a pass (or undecided) decision, yielding to or driving through the first sample is considered a conflict even if the constraint is permeable. This forces the system to switch to a yield decision for the constraint. If a constraint has a yield decision, the system enforces the speed limit of the first sample even if the vehicle is passing the sample. Passing the first sample is not considered a conflict by itself even if the constraint has a yield decision. This is necessary because it is theoretically possible that the vehicle cannot pass the first sample of the constraint with a pass reaction applied, but then, when switching to a yield decision for the constraint and applying the yield reaction, the vehicle is able to pass the first sample. This can happen if the yield reaction is stronger than the pass reaction.

Figure 10:
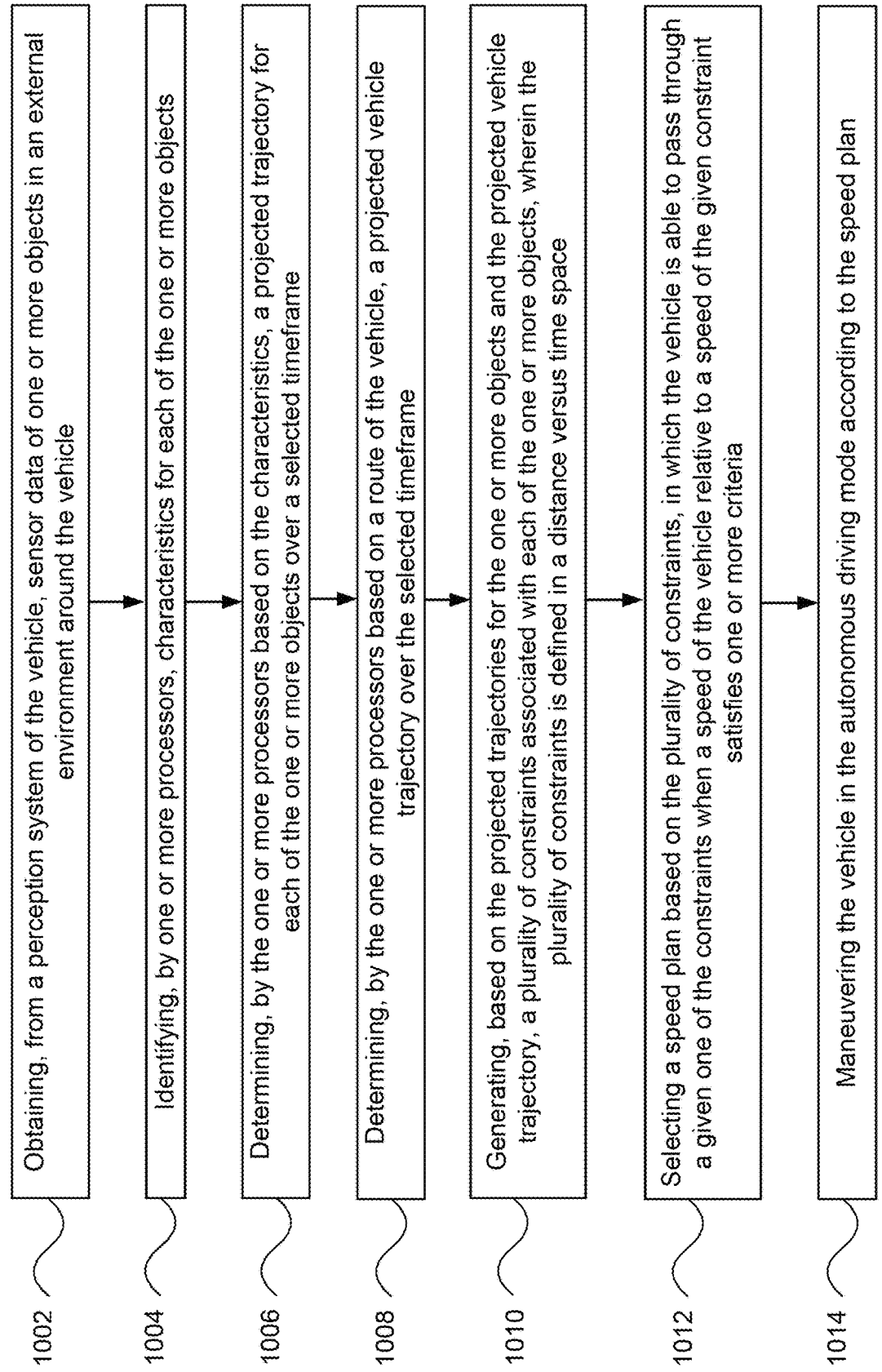
FIG. 10 illustrates an example method in accordance with aspects of the technology.

FIG. 10 illustrates a method of maneuvering a vehicle in an autonomous driving mode as shown in flow diagram 1000. At block 1002 the method includes obtaining, from a perception system of the vehicle, sensor data of one or more objects in an external environment around the vehicle. At block 1004, the method identifies characteristics for each of the one or more objects. At block 1006 the method determines, based on the characteristics, a projected trajectory for each of the one or more objects over a selected timeframe. At block 1008 the method includes determining, based on a route of the vehicle, a projected vehicle trajectory over the selected timeframe. At block 1010, the method includes generating, based on the projected trajectories for the one or more objects and the projected vehicle trajectory, a plurality of constraints associated with each of the one or more objects. The plurality of constraints is defined in a distance versus time space. At block 1012, the method includes selecting a speed plan based on the plurality of constraints, in which the vehicle is able to pass through a given one of the constraints when a speed of the vehicle relative to a speed of the given constraint satisfies one or more criteria. And at block 1014, the method includes maneuvering the vehicle in the autonomous driving mode according to the speed plan.

Speed Limit Functionality and Speed Optimization

An optimizer (e.g., an optimizer module of the planner) may use the information from the speed finder to "smooth out" the speed plan. According to one aspect of the technology, if the speed finder completely passes or completely yields to a permeable constraint, the optimizer treats the constraint like a regular hard constraint. Here, if the speed finder decides to drive through the constraint, then it acts as a permeable constraint in the optimizer and the speed limit used is one that corresponds to an imposed discomfort selected by the speed finder for this constraint. In one aspect, the optimizer places permeable variants of static range and barrier potentials that depend on both start and end position values of a constraint state, and on constraint speed limits.

Figure 11B:
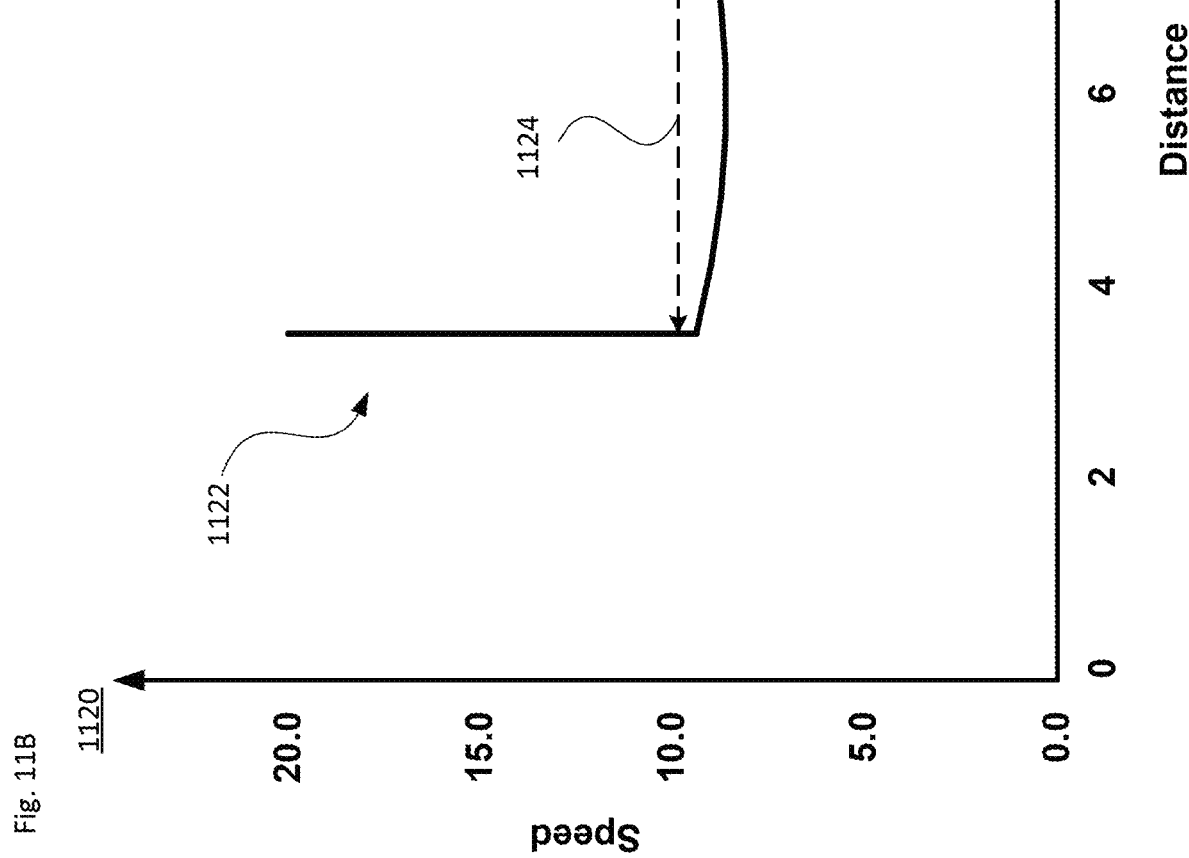

In one scenario, the same potentials for both permeable static ranges and permeable barriers are employed. Here, they would only differ in their parametric values (gains). Two candidate formulations for such potentials are shown in FIGS. 11A and 11B.

In the example 1100 of FIG. 11A, the system uses existing proximity speed potentials, formulating these as constraints on speed that are relaxed as constraints on distance. In this example, the figure is a distance v. speed plot showing the shape of a non-zero potential region 1102. It is noted how the region fans out as speed increases (the arcuate vertical sides on either side of section 1104), which means larger ranges of x are blocked than desired at higher values of speed. Here, in the limit when the maximum vehicle speed goes to zero, the system does not end up with constraints on distance (like static range and barriers). In this example, the gains for static range do not carry over. Also, the non-zero potential region may be larger than what is wanted to enforce as indicted by the fanning out in the figure, but this would likely not affect solution quality, since the system can set the fanning out to be sufficiently narrow.

The concept for the approach in example 1100 is to introduce a speed limit with an added slack term that is increased as a function of how far the progress variable x is from the range the constraint is to be imposed $[x_l, x_u]$:

$$v < v_{max} + K_x \cdot [(\max(0, x-x_u))^2 + (\max(0, x_l-x))^2].$$

Thus, ensuring the speed limit is only active when $x \in [x_l, x_u]$. One can similarly formulate a speed lower bound version:

$$v > v_{min} - K_x \cdot [(\max(0, x-x_u))^2 + (\max(0, x_l-x))^2].$$

Such a relaxation formulation empirically leads to improved optimizer convergence compared to potentials formed by taking products of individual potentials on x (distance) and velocity as described above. One approach is to use the same form of potential with adjusted/increased gains for permeable constraints.

In the example 1120 of FIG. 11B, the system relaxes constraints on x with slack terms that depend on (the optimization variables) speed and position. In this example, the figure is a distance v. speed plot showing the shape of a non-zero potential region 1122. It is noted that the base of the region is arcuate (instead of straight as in FIG. 11A), while the sidewalls are vertically straight instead of fanning out. Here, since existing static range and barriers are constraints on distance, the potential landscape with this approach would look close to the current potentials applied only when the velocity is greater than the maximum vehicle speed. The relaxation terms may be more complicated as they are a mix of position and speed dependent terms, so they might lead to timing regression and convergence regressions. In addition, this approach may also apply potentials for some speeds below the maximum vehicle speed, which can be used to ensure the non-zero potential region of permeable barrier is strict subset of the non-zero potential region of permeable static range.

The concept for the approach in example 1120 is similar to the one used in proximity speed constraints, except with the role of x and velocity (v) reversed. Here, the system imposes barriers on x that are relaxed by slack terms that are functions of velocity and x:

$$x < x_l + 0.5 \cdot K_v \cdot (\max(0, v_{max}-v))^2 + 0.5 \cdot K_x \cdot (\max(0, x-x_m))^2$$
(permeable yield), $$x > x_u - 0.5 \cdot K_v \cdot (\max(0, v_{max}-v))^2 - 0.5 \cdot K_x \cdot (\max(0, x_m-x))^2$$
(permeable pass), where $x_m = 0.5 \cdot (x_l + x_u)$.

What happens by ignoring the x-dependent slack terms? For $x \in [x_l, x_u]$, the v-dependent slack term is positive when $v < v_{max}$ and relaxes the corresponding constraint. Consequently, there is a low contribution to the potential in this region. However, for $v > v_{max}$, this slack term is zero relaxation term is zero and there is a large potential due to violation of both of the inequality constraints.

The x-dependent slack terms are added to relax the constraints outside $[x_l, x_u]$. Consider the yield constraint $x < x_l$ for example. There is a large potential due to violation of this constraint in the region $x > x_u$ (which is permissible under permeable pass). So the concept here is to enforce the yield constraint $x < x_l$ only for $x < x_m$ and pass constraint $x > x_u$ only for $x > x_m$.

One advantage to this approach is that speed is penalized strictly in $[x_l, x_u]$, which represent the starting and ending x for the constraint sample. Also, the constraints continuously transform into existing versions of barrier potential (and similarly potentials) as $v_{max} \to 0$. In addition, the shape of the potential for $v < v_{max}$ prevents the possibility of "violating the constraint at zero speed" described above. One aspect of this approach is that it imposes a stricter limit on v than $v_{max}$. Of course, as $K_v \to \infty$, there would be perfect enforcement, but this gain can be computed such that the extra limit enforced is within a specified tolerance.

Since the objective of the x-dependent slack terms is selective enforcement across the x-axis, the gain $K_x$ needs to be chosen with this consideration. Consider the permeable pass constraint for example. It is important to ensure that the effects of this potential are not felt for $x<x_l$. If there were contributions from the v-dependent slack term, then:

$$x_l > x_u - 0.5 \cdot K_x \cdot (x_m - x_l)^2$$

$$\Rightarrow (x_u - x_l) < 0.5 \cdot K_x \cdot (x_u - x_l)^2 / 4$$

$$\Rightarrow K_x > 8/(x\_u - x\_l).$$

In order to limit the "spillover" of the potential for $v<v_{max}$, consider the point $(x_m, v_{max}-\Delta v)$. In order to satisfy the permeable pass constraint at this point:

$$x_m > x_u - 0.5 \cdot K_u \cdot \Delta V^2$$

$$K_v > (x_u - x_l)/\Delta V^2.$$

In some scenarios, instead of using the 0.5 multiplier in the quadratic cost, so such limits could be half of their values.

Figure 11C:
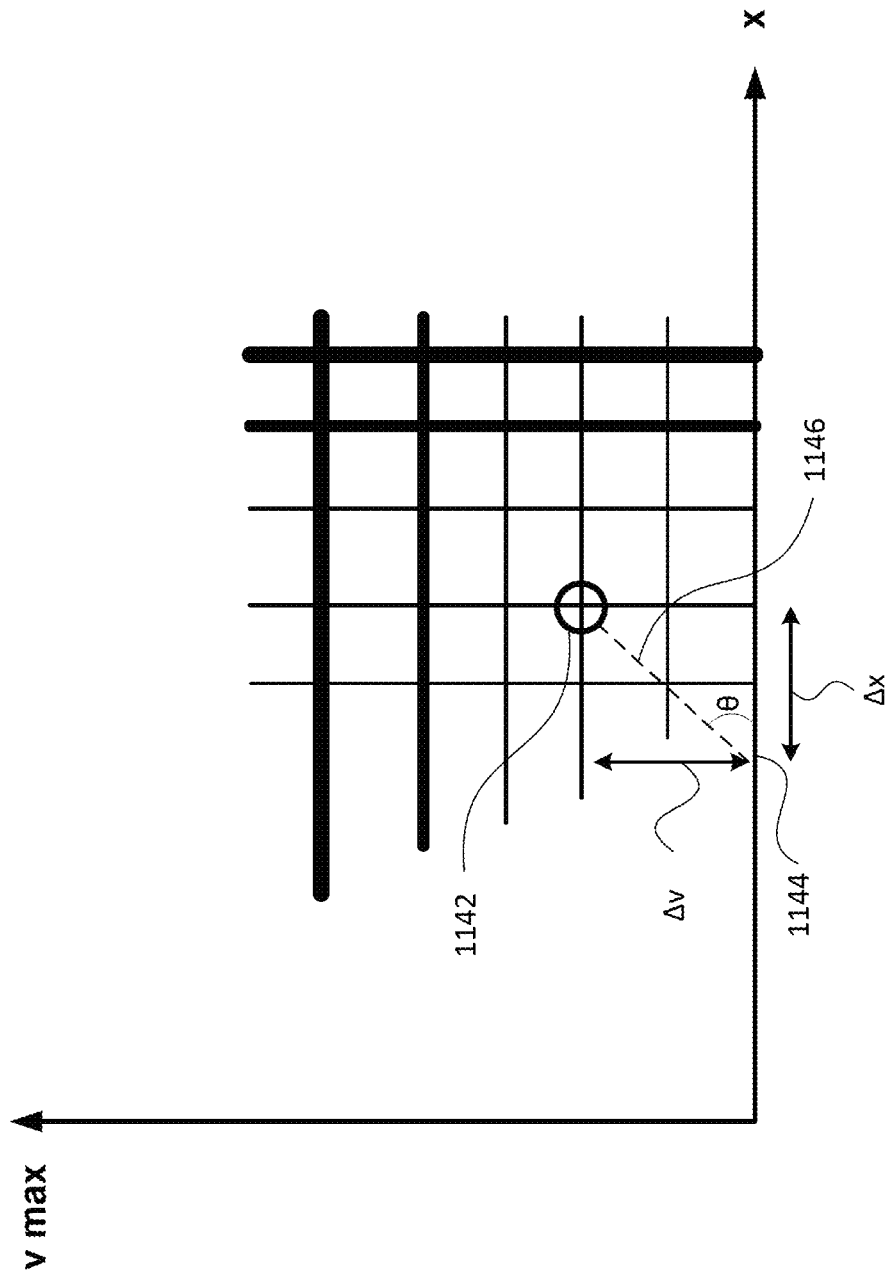

According to one aspect, gain selection can be performed as follows. FIG. 11C illustrates an example 1140 comparing an ordinary static range potential (e.g., a yield) and the permeable constraint potential. As shown in this figure, the vertical lines are contours of an ordinary static range/barrier yield. The selected location 1142 matches the potentials. Point 1144 is a point in which start$_x$–static start$_x$ buffer. Dotted line 1146 from the selected location 1142 to the point 1144 has an angle θ associated with it.

Since the static range potential and the permeable constraint potential are qualitatively different, the system may try to only match them at a single location 1142 in the (x,v) plane to determine the appropriate gain value for the permeable potential. The chosen point is in the intersection of the non-zero regions of both the potentials as shown in the figure. Equating the two potentials at this point:

$$k_{permeable} * \Delta v^2 = k_{ordinary} * \Delta x^2 \Rightarrow k_{permeable} = k_{ordinary} *$$
$$(\Delta x / \Delta v)^2 = k_{ordinary}/\tan(\theta)^2.$$

The horizontal lines are the permeable constraint potentials. The bolded lines (both horizontal and vertical) represent the magnitude of the cost increasing. Static start$_x$ buffer is an additional parameter associated with a range potential (vertical line) representing an extra "safety buffer" from the location of the range potential (start$_x$).) $\Delta x$ represents the static start$_x$ buffer, which is an extra distance offset offered by this safety buffer. $\Delta y$ is the difference (in y) between the location where the original permeable (y) and range (x) potentials intersected (at 1142 in FIG. 11C) and where the permeable potential intersects the range potential including its buffer. This approach may be conducted done to help extract the angle θ, which acts as a parameter that scales the gain on the permeable constraint for empirically desirable behavior in the optimizer.

When selectively enforcing pass or yield in the limit, notice that in the limit $v_{max} \rightarrow 0$, the system ends up with constraints for both pass and yield being created in the optimizer. The system could always decide to switch to a pass or yield constraint (i.e., non permeable one) at this point. However, improving upon this and having a truly continuous transformation from a permeable to a hard constraint can be done by modifying the formulation. Here, as $v_{max} \rightarrow 0$, the finder communicates to the optimizer whether it's leaning towards a yield or pass. Then the constraints can be modified as follows:

$$x < x_l + k_v \cdot (\max(0, v_{max} - v))^2 + (1-\lambda) \cdot K_x \cdot (\max(0, x - x_m))^2 + L \cdot e^{-\alpha} \text{ (permeable yield)}$$

$$x > x_u - K_v \cdot (\max(0, v_{max} - v))^2 - \lambda \cdot K_x \cdot (\max(0, x_m - x))^2 - L \cdot e^{-\alpha(1-\lambda)} \text{(permeable pass)}.$$

As $v_{max} \rightarrow 0$, the optimizer (or finder) sets $\lambda \rightarrow 1$ or $\lambda \rightarrow 0$ for a yield or pass, respectively. Examining the two constraints reveals that only one of the two is active in the limit and this ensures a continuous transition from a permeable constraint to either a pass or yield barrier on x.

Figure 12A:
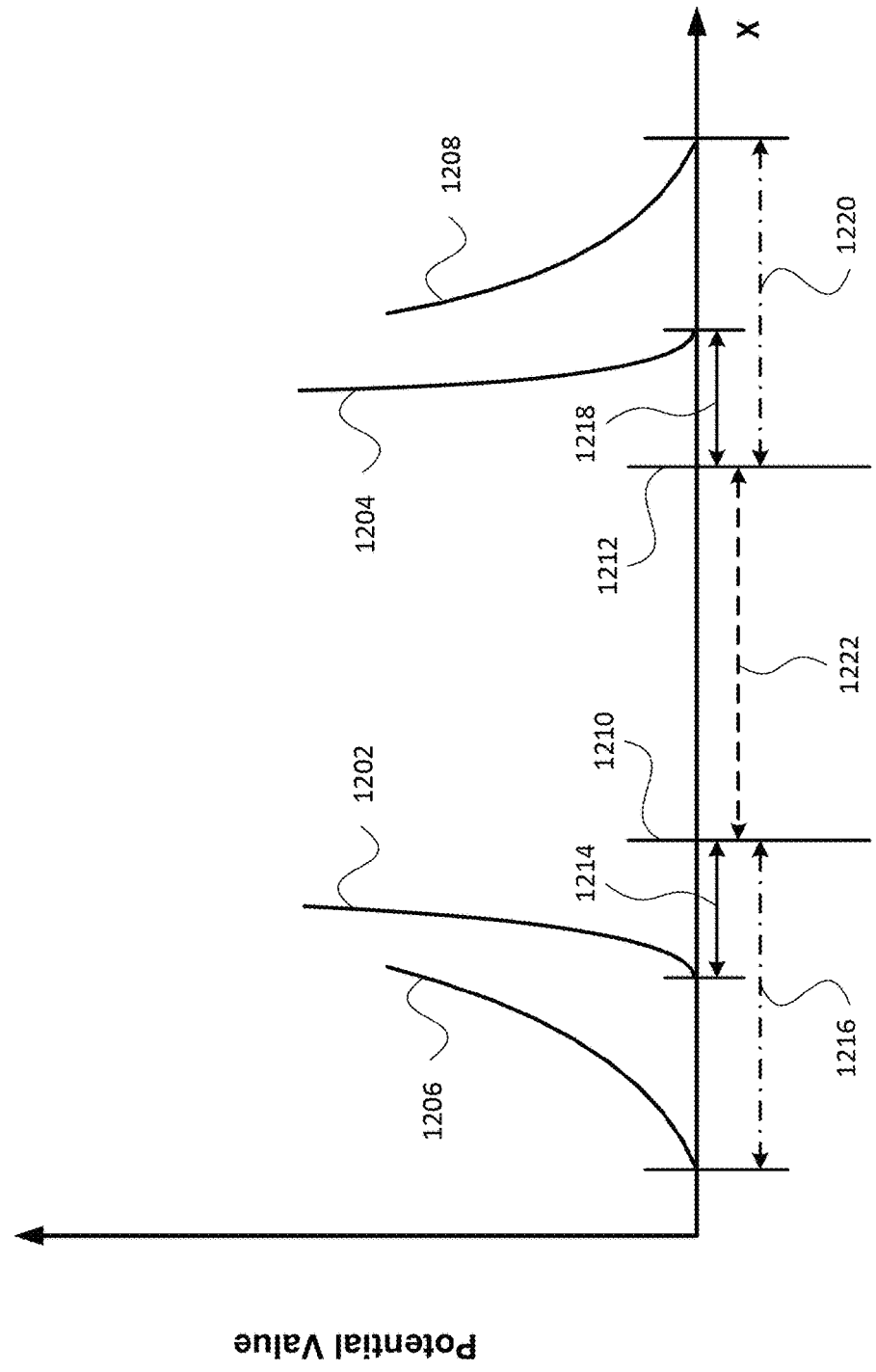
FIGS. 12A-C illustrate optimized potential placement situations in accordance with aspects of the technology.

FIG. 12A illustrates an example view 1200 regarding placement of non-permeable potentials. This view shows placement of static range and barrier potentials for (non-permeable) constraint states. Of course, for non-permeable constraints only potentials corresponding to either pass or yield decision are placed, not both. 1202 is a yield barrier, while 1204 is a pass barrier. 1206 represents a yield static range and 1208 represents a pass static range. 1210 represents a constraint state starting point (start$_x$) and 1212 represents a constraint state ending point (end$_x$). Spacing 1214 represents a yield minimum range and spacing 1216 represents the yield minimum range plus a front bumper. Spacing 1218 represents a pass minimum range and spacing 1220 represents the pass minimum range plus a tail bumper. And spacing 1222 represents a constraint distance. Here, such constraint states are associated with finding the extremal constraint states that apply for a given constraint at a given location. This is done because constraint states may be overlapping and multiple sets of potentials should not be applied at the same location (since optimizer cost is additive, this could lead to unintentionally multiplying the effect of these potentials). So the system finds the most difficult constraint states for pass and yield at any given location and act as if they were the only constraint states for the purposes of adding potentials. The "constraint distance" corresponds to the distance between the chosen pass constraint state location, and the chosen yield constraint state location.

Instead of only applying potentials for start or end of constraint states (depending on yield or pass decisions), for permeable constraints the system can place permeable variants of static range. In this situation, a member variable maximum vehicle speed (and later minimum vehicle speed) or a constraint class that includes this variable can be utilized. Here, when interpolating two sample states, a linear interpolation is applied to the maximum vehicle speed variable, as this continuously transforms between any combinations of permeable and non-permeable states. The system determines whether to place non permeable or permeable potentials in the evaluation loop that processes constraints in order to determine where to place potentials for each time sample. When the constraint permeable speed limit maximum vehicle speed for a sample callback corresponding to static range or barrier potentials is positive, the system switches to placing the permeable static range or permeable barrier instead. The same buffer values are applied to computing the relevant offsets to the constraint starting point 1210 (start_x) and constraint ending point 1212 (end_x). For each time sample, the loop may operate as follows:

```
if (max_sdc_speed > 0)
    Place permeable(start_x, end_x, maximum vehicle speed)
else if (profile_x > end_x)
    Place pass-potentials(end_x)
else if (profile_x < start_x)
    Place yield-potentials(start_x)
else
    Initial profile violated hard constraint!
```

Figure 12B:
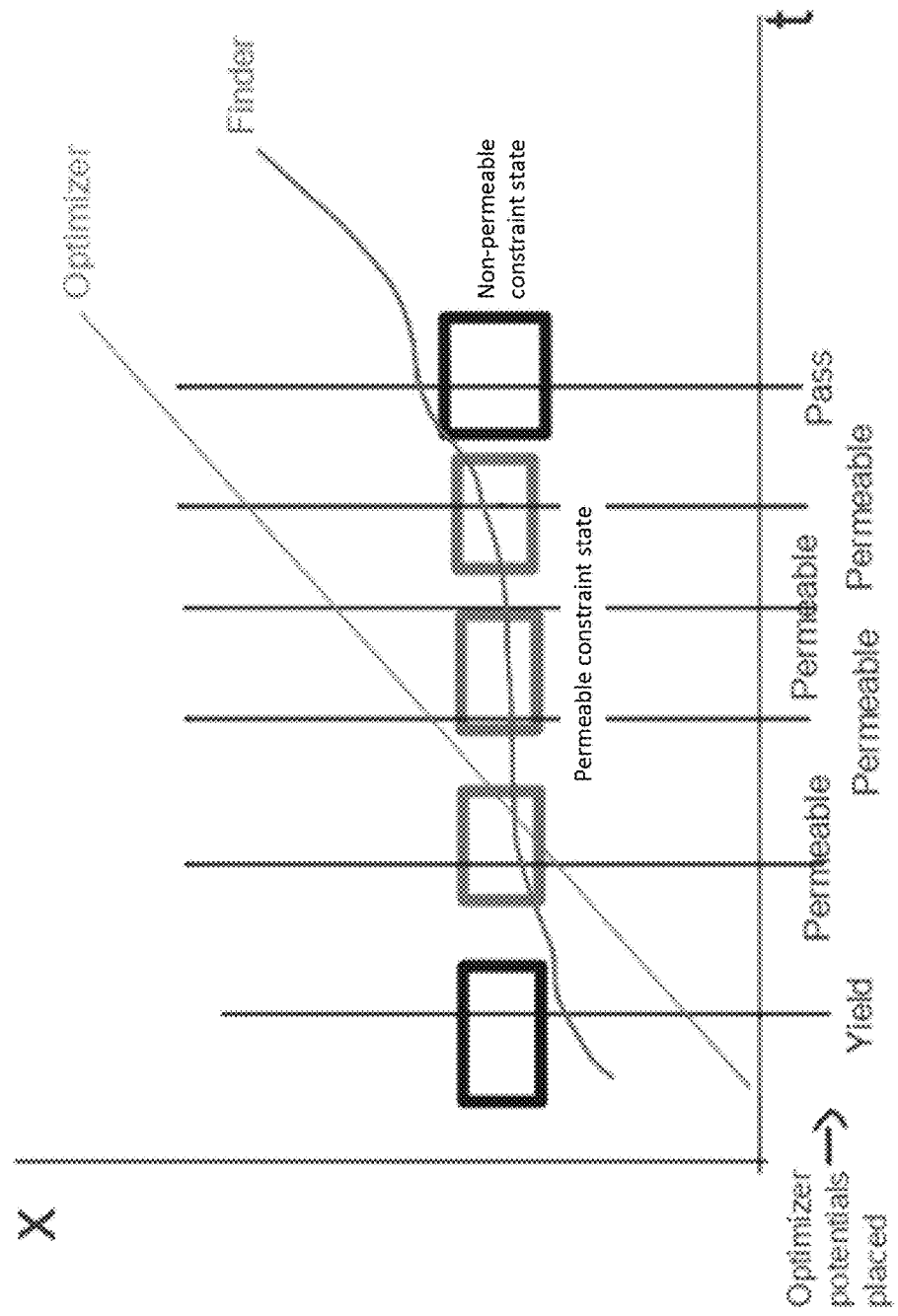
Figure 12C:
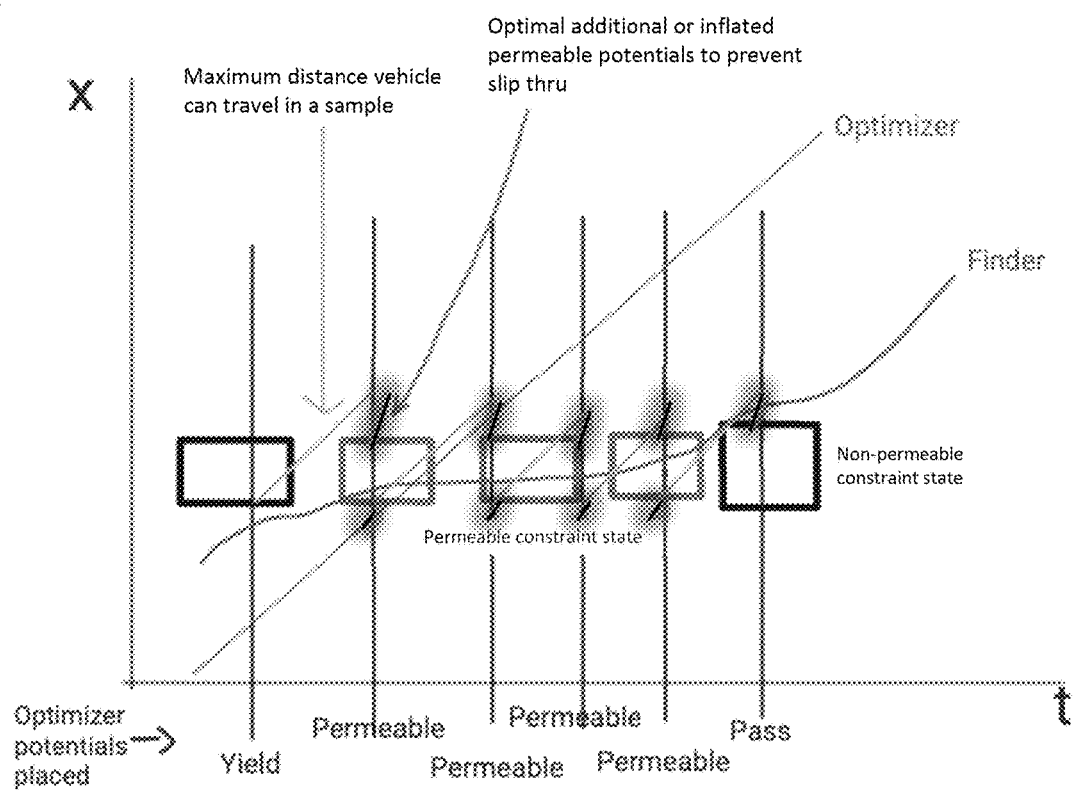

However, as shown in example 1220 of FIG. 12B, there is a possibility that the optimizer slips past a permeable constraint without abiding by the speed limit, if some the constraint states are small enough. To protect against this occurrence, the system (conditionally) places additional permeable potentials for each time sample where a maximum vehicle speed is greater than 0 and the very next sample. This is shown in view 1240 of FIG. 12C.

Another potential situation that can come up when placing potentials is when the vehicle drives through a permeable constraint, the system may need to place (non-permeable) yield, and permeable and (non-permeable) pass potentials for the same constraint. This means the system would need to make this decision for each time sample. To avoid make opposing decisions (like place a pass barrier and yield static range) at the same time sample, the system may populate a vector of per sample decisions before placing any potentials and populate them by comparing the finder profile against the midpoints of each constraint sample (using the buffers for static range). Here, if the finder profile is ahead of the midpoint, then it would be considered as a pass, otherwise as a yield. This vector is used in placing barriers, static ranges and, for the non-permeable samples in the constraints, dynamic ranges.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method of maneuvering a vehicle in an autonomous driving mode, the method comprising:
   obtaining, from a perception system of the vehicle, sensor data of one or more objects in an external environment around the vehicle;
   identifying, by one or more processors, characteristics for each of the one or more objects;
   determining, by the one or more processors based on the characteristics, a projected trajectory for each of the one or more objects over a selected timeframe;
   determining, by the one or more processors based on a route of the vehicle, a projected vehicle trajectory over the selected timeframe;
   generating, by the one or more processors based on the projected trajectories for the one or more objects and the projected vehicle trajectory, a plurality of constraints associated with each of the one or more objects, wherein the plurality of constraints is defined in a distance versus time space;
   selecting, by the one or more processors, a speed plan based on the plurality of constraints, in which the vehicle is able to pass through a given permeable one of the constraints when a speed of the vehicle relative to a speed of the given permeable constraint satisfies one or more criteria; and
   maneuvering, by the one or more processors, the vehicle in the autonomous driving mode according to the speed plan.

2. The method of claim 1, wherein the speed plan limits a duration that the vehicle spends inside the given constraint.

3. The method of claim 2, wherein at least one of a speed of the speed plan and the duration that the vehicle spends inside the given constraint is variable according to a discomfort level.

4. The method of claim 1, wherein the given constraint correlates to a given one of the one or more objects, and at least one of the characteristics of the given object indicate that the given constraint can be driven through.

5. The method of claim 1, wherein the given constraint correlates to a given one of the one or more objects, and a lateral gap between the given object and the vehicle is below a minimum threshold.

6. The method of claim 1, wherein the given constraint is a binary constraint.

7. The method of claim 1, wherein each projected trajectory for the one or more objects includes a list of agent states representing at least one of a position or speed of a corresponding one of the objects.

8. The method of claim 1, wherein the given constraint has a set of constraint states over the selected timeframe.

9. The method of claim 8, wherein selecting the speed plan includes evaluating speed across the set of constraint states.

10. The method of claim 9, wherein evaluating speed across the set of constraint states includes interpolating between at least one pair of adjacent constraint states.

11. The method of claim 10, wherein the interpolating is done based time boundaries of the at least one pair of adjacent constraint states.

12. The method of claim 1, further comprising:
   prior to maneuvering the vehicle, the one or more processors optimizing the speed plan according to at least one permeable variant of a static range or barrier potential;
   wherein maneuvering the vehicle in the autonomous driving mode according to the speed plan is performed based on the optimized speed plan.

13. The method of claim 1, further comprising, prior to maneuvering the vehicle, the one or more processors optimizing the speed plan by formulating one or more existing proximity speed potentials as constraints on vehicle speed that are relaxed as constraints on distance.

14. The method of claim 1, further comprising, prior to maneuvering the vehicle, the one or more processors optimizing the speed plan by creating constraints for both passing and yielding.

15. A vehicle configured to operate in an autonomous driving mode, the vehicle comprising:
   a perception system including one or more sensors, the one or more sensors being configured to obtain sensor data associated with objects in an external environment around the vehicle;
   a driving system including a steering subsystem, an acceleration subsystem and a deceleration subsystem to control driving of the vehicle;
   a positioning system configured to determine a current position of the vehicle; and
   a control system including one or more processors, the control system operatively coupled to the driving system, the perception system and the positioning system, the control system being configured to:
      obtain, from the perception system, the sensor data of one or more objects in the external environment;
      identify, characteristics for each of the one or more objects;
      determine, based on the characteristics, a projected trajectory for each of the one or more objects over a selected timeframe;
      determine, based on a route of the vehicle, a projected vehicle trajectory over the selected timeframe;

generate, based on the projected trajectories for the one or more objects and the projected vehicle trajectory, a plurality of constraints associated with each of the one or more objects, wherein the plurality of constraints is defined in a distance versus time space;

select a speed plan based on the plurality of constraints, in which the vehicle is able to pass through a given permeable one of the constraints when a speed of the vehicle relative to a speed of the given permeable constraint satisfies one or more criteria; and control the driving system to maneuver the vehicle in the autonomous driving mode according to the speed plan.

16. The vehicle of claim 15, wherein the speed plan limits a duration that the vehicle spends inside the given constraint.

17. The vehicle of claim 15, wherein the given constraint correlates to a given one of the one or more objects, and:

at least one of the characteristics of the given object indicate that the given constraint can be driven through; or a lateral gap between the given object and the vehicle is below a minimum threshold.

18. The vehicle of claim 15, wherein:

the given constraint has a set of constraint states over the selected timeframe; and selection of the speed plan includes evaluating speed across the set of constraint states.

19. The vehicle of claim 15, wherein the control system is further configured to:

prior to maneuvering the vehicle, optimize the speed plan according to at least one permeable variant of a static range or barrier potential;

wherein maneuvering the vehicle in the autonomous driving mode according to the speed plan is performed based on the optimized speed plan.

20. The vehicle of claim 15, wherein the control system is further configured to:

prior to maneuvering the vehicle, optimize the speed plan by formulating one or more existing proximity speed potentials as constraints on vehicle speed that are relaxed as constraints on distance.

\* \* \* \* \*